United States Patent
Hayakawa et al.

(10) Patent No.: US 9,251,426 B2
(45) Date of Patent: Feb. 2, 2016

(54) THREE-DIMENSIONAL OBJECT DETECTION DEVICE, THREE-DIMENSIONAL OBJECT DETECTION METHOD

(71) Applicant: Nissan Motor Co., Ltd., Yokohama-shi, Kanagawa (JP)

(72) Inventors: Yasuhisa Hayakawa, Yokohama (JP); Osamu Fukata, Commerce Township, MI (US); Daisuke Oiki, Zama (JP); Yukinori Nishida, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/409,494

(22) PCT Filed: Jul. 24, 2013

(86) PCT No.: PCT/JP2013/070006
§ 371 (c)(1),
(2) Date: Dec. 19, 2014

(87) PCT Pub. No.: WO2014/017517
PCT Pub. Date: Jan. 30, 2014

(65) Prior Publication Data
US 2015/0186733 A1  Jul. 2, 2015

(30) Foreign Application Priority Data
Jul. 27, 2012  (JP) ................. 2012-166496

(51) Int. Cl.
| | |
|---|---|
| G06K 9/00 | (2006.01) |
| G08G 1/16 | (2006.01) |
| G06K 9/46 | (2006.01) |
| H04N 5/225 | (2006.01) |
| H04N 7/18 | (2006.01) |

(52) U.S. Cl.
CPC ........ *G06K 9/00791* (2013.01); *G06K 9/00805* (2013.01); *G06K 9/00812* (2013.01); *G06K 9/46* (2013.01); *G08G 1/166* (2013.01); *G08G 1/167* (2013.01); *H04N 7/183* (2013.01)

(58) Field of Classification Search
CPC .............. G06K 9/00; G08G 1/00; H04N 7/00
USPC ........... 382/103, 104, 236; 348/46, 169–172, 348/352; 340/435
See application file for complete search history.

(56) References Cited

U.S. PATENT DOCUMENTS 5,757,472 A * 5/1998 Wangler .............. A01M 7/0089
356/398
7,233,233 B2 * 6/2007 Taniguchi .......... G06K 9/00362
340/435

(Continued)

FOREIGN PATENT DOCUMENTS

| CN | 102476619 A | 5/2012 |
|---|---|---|
| EP | 1826648 A2 | 8/2007 |

(Continued)

*Primary Examiner* — Abolfazl Tabatabai
(74) *Attorney, Agent, or Firm* — Global IP Counselors, LLP

(57) ABSTRACT

A three-dimensional object detection device is provided with an image capturing device, a three-dimensional object detection unit, a rainfall state detection unit, a three-dimensional object assessment unit and a controller. The image capturing device captures an area rearward of a vehicle. The three-dimensional object detection unit detects a three-dimensional object rearward of the vehicle and calculating a traveling speed of the three-dimensional object, based on images obtained by the image capturing device. The rainfall state detection unit detects a state of rainfall including cases of rainfall or formation of a water film on a road surface due to rainfall. The three-dimensional object assessment unit accesses the three-dimensional object to be another vehicle when the traveling speed of the detected three-dimensional object lies within a preset setting range. The controller changes the traveling speed setting range to be narrower when the rainfall state detection unit has detected a rainfall state.

18 Claims, 39 Drawing Sheets

(56) References Cited

U.S. PATENT DOCUMENTS

| | | |
|---|---|---|
| 2011/0228980 A1 | 9/2011 | Ichikawa et al. |
| 2013/0141542 A1 | 6/2013 | Tsuchiya et al. |

FOREIGN PATENT DOCUMENTS

| | | |
|---|---|---|
| EP | 1964719 A2 | 9/2008 |
| JP | 2002-22827 A | 1/2002 |
| JP | 2005-162168 A | 6/2005 |
| JP | 2005-225250 A | 8/2005 |
| JP | 2006-268677 A | 10/2006 |
| JP | 2007-228448 A | 9/2007 |
| JP | 2008-219063 A | 9/2008 |
| JP | 2012-3662 A | 1/2012 |
| WO | 2011/043006 A1 | 4/2011 |
| WO | 2012/023412 A1 | 2/2012 |

* cited by examiner

THREE-DIMENSIONAL OBJECT DETECTION DEVICE, THREE-DIMENSIONAL OBJECT DETECTION METHOD

CROSS-REFERENCE TO RELATED APPLICATIONS

This application is a U.S. National stage application of International Application No. PCT/JP2013/070006, filed Jul. 24, 2013, which claims priority to Japanese Patent Application No. 2012-166496 filed in Japan on Jul. 27, 2012. The entire disclosure of Japanese Patent Application No. 2012-166496 is hereby incorporated herein by reference.

BACKGROUND

1. Field of the Invention

The present invention relates to a three-dimensional object detection device and a three-dimensional object detection method.

2. Background Information

From the standpoint of using a single camera to monitor vehicle environs and detect raindrops, vehicle monitoring devices are known which monitor the environs of a vehicle based on images captured by a camera provided with a lens capable of image capture with a first focal distance for short distances to capture raindrops adhering to the vehicle and of image capture with a second focal distance for long distances to capture the vehicle surroundings (Japanese Laid-Open Patent Application No. 2005-225250).

SUMMARY

From the standpoint of reducing costs, in the prior art, monitoring of the vehicle environs and detection of raindrops are performed by a single camera, but when the focal distance is made short and raindrops are being detected, detection of other vehicles present in the vehicle environs cannot be performed. This creates the problem that the precision of detecting other vehicles is reduced.

The present invention addresses the problem of providing a three-dimensional object detection device that can detect another vehicle traveling in an adjacent lane with high precision without creating non-detection time by continuously controlling the detection of three-dimensional objects without interruption in accordance with the environment, even during rainy weather in cases where rainwater spray that has been splashed by the host vehicle adheres to a lens or cases where light is reflected by a puddle in the road surface, when detecting other vehicles traveling in an adjacent lane next to the lane of travel of the host vehicle based on differential waveform information or edge information.

The present invention solves the above problem by changing a setting range, which is a threshold value of the traveling speed applied when assessing whether a three-dimensional object is another vehicle, to be narrower in a case where a rainfall state is detected, including rainfall or a case where a water film is formed on the road surface due to rainfall.

In the present invention, during rainy weather in which a state occurs in which rainwater spray that has been splashed by the host vehicle adheres to a lens or light is reflected by a puddle in the road surface, a setting range, which is a threshold value of the traveling speed applied when assessing whether a three-dimensional object is another vehicle, is changed to be narrower, and therefore erroneous detection of rainwater adhering to the lens or an image reflected by a puddle as an image of another vehicle traveling in an adjacent lane adjacent to the lane of travel of the host vehicle can be prevented. As a result, a three-dimensional object detection device can be provided that detects with high precision another vehicle traveling in an adjacent lane adjacent to the lane of travel of the host vehicle.

BRIEF DESCRIPTION OF THE DRAWINGS

Referring now to the attached drawings which form a part of this original disclosure.

DETAILED DESCRIPTION OF THE EMBODIMENTS

Figure 1:
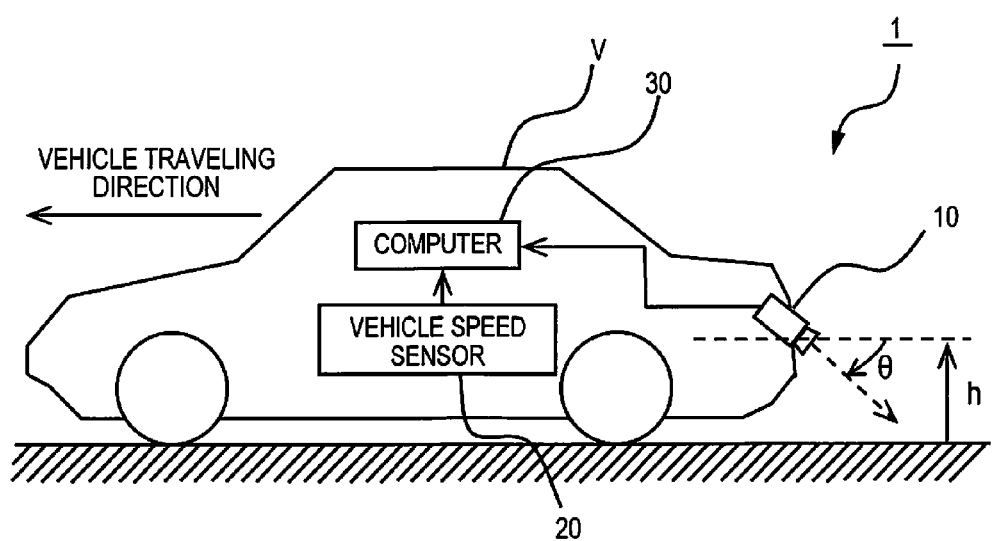
FIG. 1 is a schematic overview of a vehicle according to an embodiment to which a three-dimensional object detection device of the present invention is applied.

FIG. 1 is a schematic overview of a vehicle of an embodiment to which a three-dimensional object detection device 1 according to the present invention is applied. The three-dimensional object detection device 1 of the present example is a device for detecting, as an obstacle, another vehicle to which the driver of a host vehicle should pay attention during driving, such as for example another vehicle which could make contact when the host vehicle V is changing lanes. In particular, the three-dimensional object detection device 1 of the present example detects another vehicle traveling in an adjacent lane adjacent to the lane in which the host vehicle is traveling (hereafter also simply called an adjacent lane). Further, the three-dimensional object detection device 1 of the present example can calculate the travel distance and traveling speed of a detected other vehicle. Hence the example described below is an example in which the three-dimensional object detection device 1 is mounted on the host vehicle V, and among three-dimensional objects detected in the surroundings of the host vehicle, another vehicle traveling in an adjacent lane adjacent to the lane in which the host vehicle V is traveling is detected. As illustrated in the drawing, the three-dimensional object detection device 1 of the present example is provided with a camera 10, a vehicle speed sensor 20, a computer 30, a raindrop sensor 50, a wiper 60, and a navigation device 70 provided with a communication device 71 and a GPS device 72.

The camera 10 is attached to the host vehicle V so that the optical axis is at an angle downward from the horizontal in a location at a height h at the rear of the host vehicle V, as illustrated in FIG. 1. From this position, the camera 10 captures a predetermined area of the surrounding environment of the host vehicle V. The camera 10 is provided with a lens 11 for forming an image. In the present embodiment, one camera 10 is provided for detection of three-dimensional objects at the rear of the host vehicle V, but other cameras to acquire images of the vehicle surroundings, for example, can be provided for other applications. The vehicle speed sensor 20 detects the speed of travel of the host vehicle V, and for example calculates the vehicle speed from the vehicle wheel speed detected by a wheel speed sensor for detecting the rate of rotation of the vehicle wheels. The computer 30 detects a three-dimensional object rearward of the vehicle, and in the present example, calculates the travel distance and traveling speed of the three-dimensional object. The raindrop sensor 50, wiper 60, and navigation device 70 detect information relating to rainfall, and send the detection results to a rainfall state detection unit 41, described below.

The rainfall state detection unit 41 detects the rainfall state, including whether there is rainfall, the amount of rainfall, and cases in which a water film is formed on the road surface due to rainfall. The rainfall state detection unit 41 detects the "presence/absence of rainfall" based on the presence or absence of raindrops or the amount of raindrops adhering to the host vehicle V as detected by the raindrop sensor 50, driving information for the wiper 60, weather information at the travel site acquired via the navigation device 70, or the like. The rainfall state detection unit 41 detects the amount of rainfall at the travel site of the host vehicle V based on the amount of raindrops detected by the raindrop sensor 50, the driving speed, driving period or other driving information of the wiper 60, the amount of rainfall at the travel site acquired via the navigation device 70, and the like. The rainfall state detection unit 41 can detect "whether a water film is formed on the road surface due to rainfall" based on the presence or absence of rainfall and the amount of rainfall, and the time from the start of rainfall. The present detection is based on the assessment that, if the amount of rainfall is equal to or greater than a predetermined amount, and the time that has passed since the rain ended is within a predetermined time, the possibility that a water film is formed on the road surface is high. For example, when the amount of raindrops detected by the raindrop sensor 50 is equal to or greater than a predetermined amount, and the time that has passed since the raindrop sensor 50 detected that raindrops are not present is within a predetermined time, the wiper 60 is driven with a frequency equal to or greater than a predetermined value (a period of less than a predetermined value), and when the time that has passed since driving of the wiper 60 stopped is within a predetermined time, and when the time that has passed from acquisition of the end of rainfall at the travel site by the navigation device 70 is within a predetermined time, a rainfall state in which a water film is formed on the road surface due to rainfall can be detected. The raindrop sensor 50, wiper 60, and navigation device 70 can constitute a portion of the rainfall state detection unit 41. Each of the devices is described in detail below.

Figure 2:
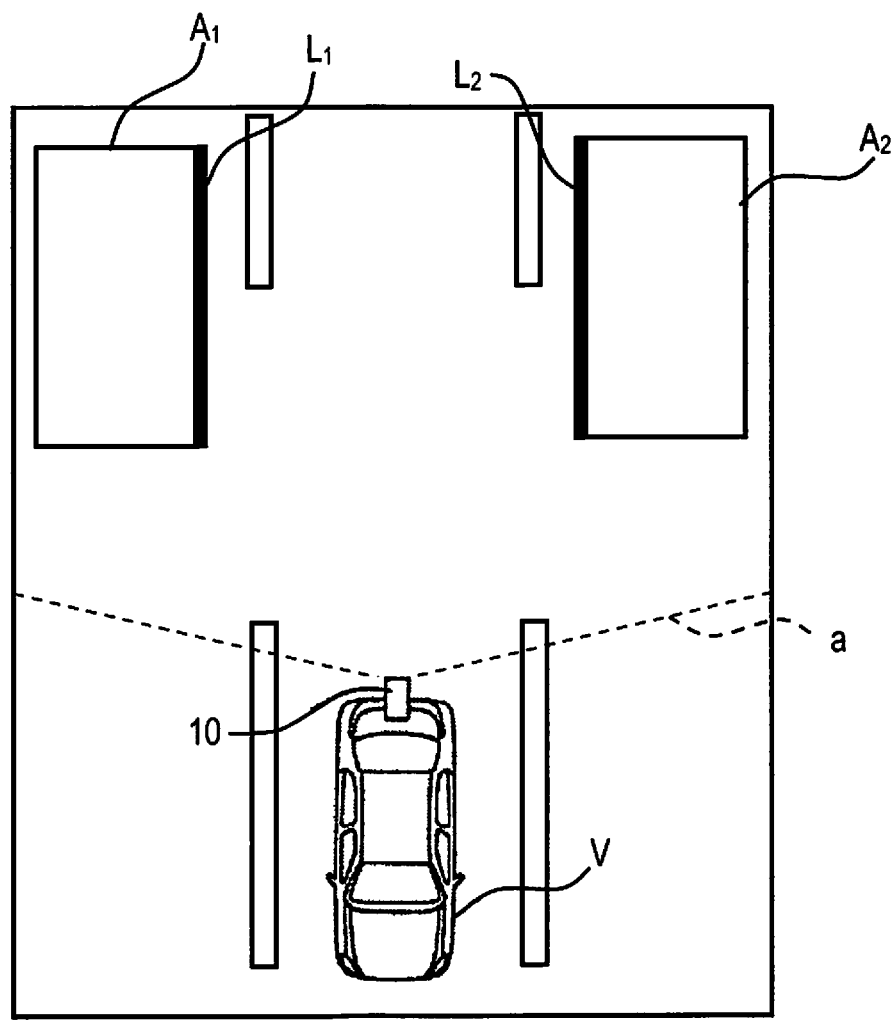
FIG. 2 is a plan view illustrating the state of travel of the vehicle in FIG. 1 (three-dimensional object detection using differential waveform information).

FIG. 2 is a plan view illustrating the state of travel of the host vehicle V in FIG. 1. As illustrated in the drawing, the camera 10 captures rearward of the vehicle at a predetermined view angle a. At this time, the view angle a of the camera 10 is set to a view angle that allows the left and right lanes to be captured in addition to the lane in which the host vehicle V is traveling. The area that can be captured is the rear of the host vehicle V, and includes the areas to be detected A1, A2 in the adjacent lanes that are adjacent on the right and left to the lane of travel of the host vehicle V. In the present embodiment, rearward of the vehicle includes not only the direct rear of the vehicle, but also the rearward side of the vehicle. The area captured rearward of the vehicle is set according to the view angle of the camera 10. As one example, when the direct rear of the vehicle along the vehicle length direction is made zero degrees, a setting can be made so as to include an area that is from 0° to 90° on the right and left from the direct rear direction, and preferably from 0° to 70° or the like.

Figure 3:
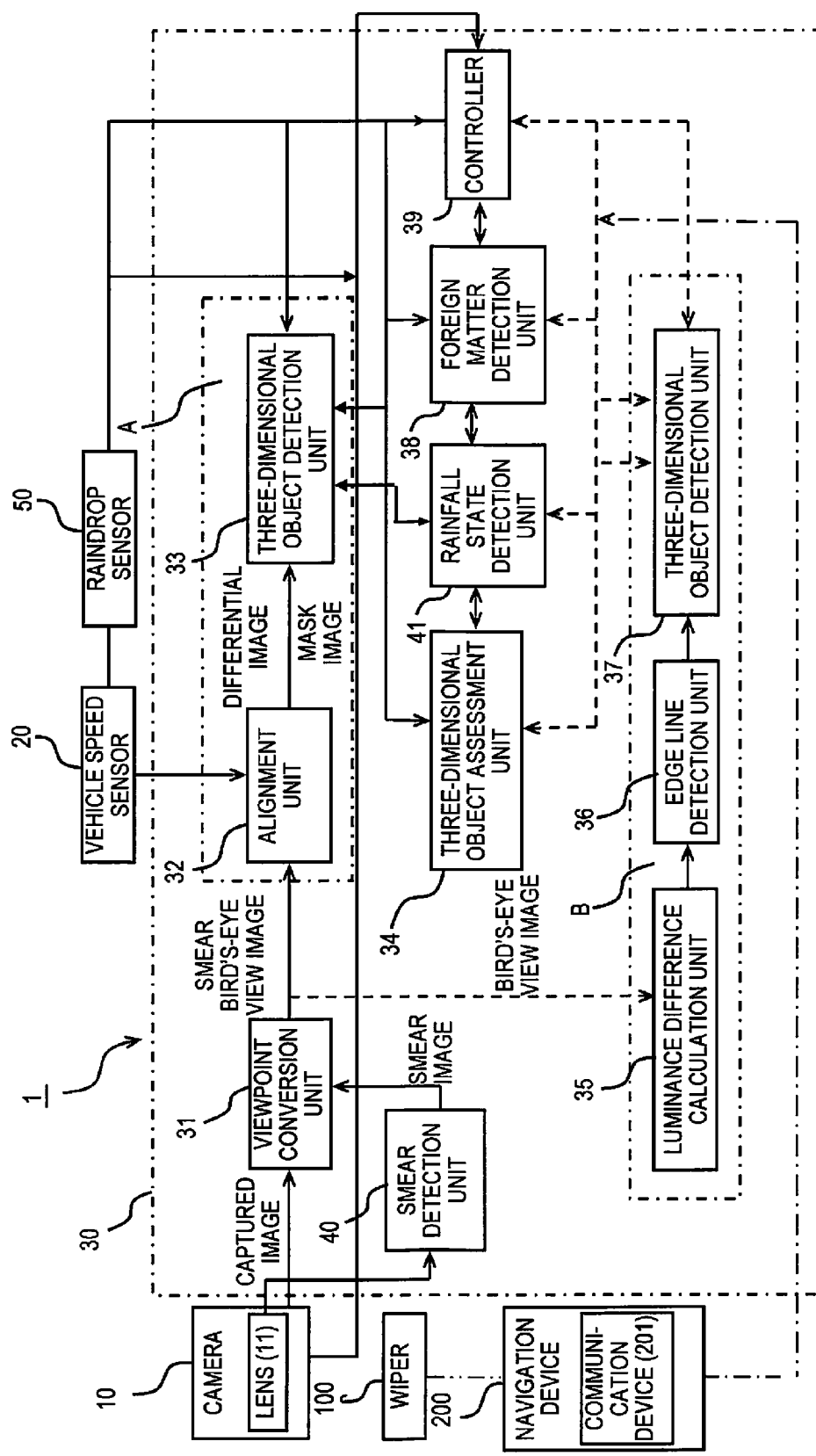
FIG. 3 is a block diagram illustrating details of the computer of FIG. 1.

FIG. 3 is a block view illustrating details of the computer 30 of FIG. 1. In FIG. 3, the camera 10, vehicle speed sensor 20, raindrop sensor 50, wiper 60, and navigation device 70 are also illustrated in order to clarify connection relationships. The vehicle speed sensor 20, raindrop sensor 50, wiper 60, and navigation device 70 are mounted on the vehicle, and can transmit and receive information to and from the computer 30 via a controller area network (CAN) or other onboard communication network.

As illustrated in FIG. 3, the computer 30 is provided with a viewpoint conversion unit 31, alignment unit 32, three-dimensional object detection unit 33, three-dimensional object assessment unit 34, foreign matter detection unit 38, rainfall state detection unit 41, controller 39, and smear detection unit 40. The computer 30 of the present embodiment has a configuration related to a block for detecting three-dimensional objects using differential waveform information. The computer 30 of the present embodiment can have a configuration related to a block for detecting three-dimensional objects using edge information. In this case, among the configuration illustrated in FIG. 3, the block configuration A configured from the alignment unit 32 and the three-dimensional object detection unit 33 can be replaced with the block configuration B, surrounded by a dot-dash line, and configured from a luminance difference calculation unit 35, edge line detection unit 36, and three-dimensional object detection unit 37. As shall be apparent, both the block configuration A and the block configuration B can be provided such that both detection of three-dimensional objects using differential waveform information and detection of three-dimensional objects using edge information can be performed. When both the block configuration A and the block configuration B are provided, one among the block configuration A and the block configuration B can be made to operate according to, for example, the brightness or other environmental factors. Below, each of the configurations is described.

Detection of Three-Dimensional Objects Using Differential Waveform Information

The three-dimensional object detection device 1 of the present embodiment detects three-dimensional objects present in the right-side detection area or left-side detection area rearward of the vehicle based on image information obtained by the single-lens camera 1 that captures rearward of the vehicle.

Captured image data of the predetermined area obtained by capturing carried out by the camera 10 is inputted to the viewpoint conversion unit 31, which converts the viewpoint of the captured image data thus inputted to bird's-eye view image data, which is a bird's-eye view state. A bird's-eye view state is a state of viewing from a viewpoint of an imaginary camera that is looking down from above, e.g., vertically downward. Viewpoint conversion can be carried out in the manner described in, e.g., Japanese Laid-Open Patent Application No. 2008-219063. The reason that the viewpoint of captured image data is converted to bird's-eye view image data is based on the principle that vertical edges unique to a three-dimensional object are converted to a straight-line group that passes through a specific fixed point by viewpoint conversion to bird's-eye view image data, and utilizing this principle allows a planar object and a three-dimensional object to be differentiated. The result of image conversion processing by the viewpoint conversion unit 31 is also used in detection of three-dimensional objects using edge information, described below.

Figure 4:
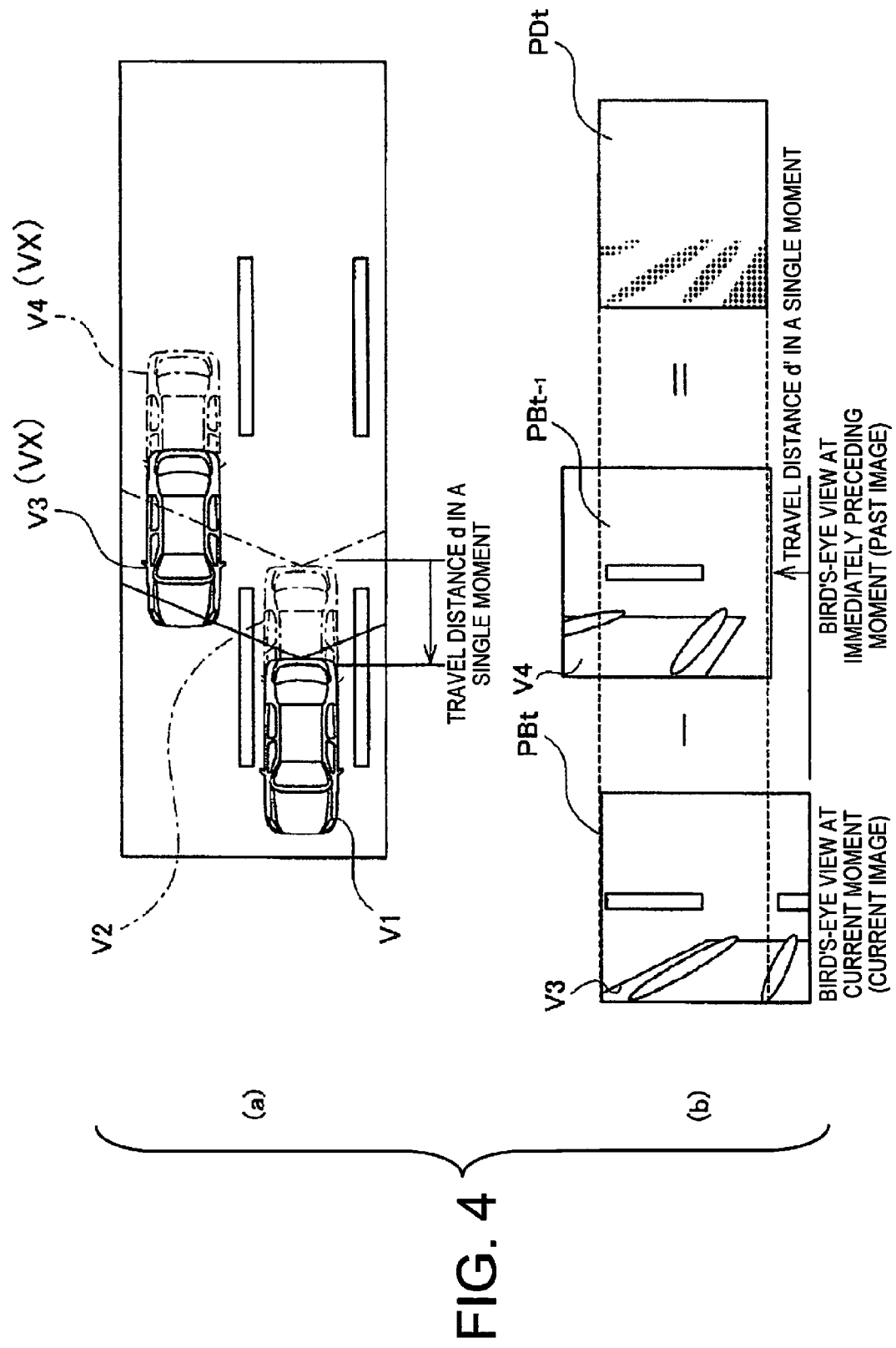
FIG. 4 is a view for describing the general overview of the processing of the alignment unit in FIG. 3, with part (a) illustrating the movement state of the vehicle, and part (b) illustrating a general overview of alignment.

The bird's-eye view image data obtained by viewpoint conversion carried out by the viewpoint conversion unit 31 is sequentially inputted to the alignment unit 32, which aligns the positions of the inputted bird's-eye view image data at different times. FIG. 4 is a view for describing the general overview of the processing of the alignment unit 32, part (a) of FIG. 4 is a plan view illustrating the movement state of the host vehicle V, and part (b) of FIG. 4 is an image illustrating a general overview of alignment.

As illustrated in part (a) of FIG. 4, the host vehicle V at the current moment is positioned at V1, and the host vehicle V at a single moment prior is positioned at V2. It is assumed that another vehicle VX is positioned in the rear-side direction of the host vehicle V and is travelling parallel to the host vehicle V, and that the other vehicle VX at the current moment is positioned at V3, and the other vehicle VX at a single moment prior is positioned at V4. Also, it is assumed that the host vehicle V has moved a distance d in a single moment. The phrase "at a single moment prior" may be a moment in the past by a time determined in advance (e.g., a single control cycle) from the current moment, or may be a moment in the past by an arbitrary time.

In such a state, a bird's-eye view image PBt at the current moment is as illustrated in part (b) of FIG. 4. The white lines drawn on the road surface are rectangular in this bird's-eye view image PBt and are relatively accurate in a planar view, but the other vehicle VX at position V3 is collapsed. The same applies to the bird's-eye view image PBt−1 at a single moment prior; the white lines drawn on the road surface are rectangular and are relatively accurate in a planar view, but the other vehicle VX at position V4 is collapsed. As previously described, this is because vertical edges of a three-dimensional object (edges that do not stand erect in three-dimensional space from the road surface in a strict meaning of vertical edge are also included) appear as a straight-line group along a collapsing direction due to the process for converting the viewpoint to bird's-eye view image data, but because a planar image on the road surface does not include vertical edges, such collapsing does not occur even when the viewpoint has been converted.

The alignment unit 32 aligns the bird's-eye view images PBt and PBt−1, such as those described above, in terms of data. When this is carried out, the alignment unit 32 offsets the bird's-eye view image PBt−1 at a single moment prior, and matches the position with the bird's-eye view image PBt at the current moment. The left-side image and the center image in part (b) of FIG. 4 illustrate the offset state by a travel distance d'. The offset amount d' is the amount of movement in the bird's-eye view image data that corresponds to the actual travel distance d of the host vehicle V illustrated in part (a) of FIG. 4, and is decided based on a signal from the vehicle speed sensor 20 and the time from a single moment prior to the current moment.

After alignment, the alignment unit 32 obtains the difference between the bird's-eye view images PBt and PBt−1, and generates data of a difference image PDt. The pixel values of the difference image PDt may be the absolute values of differences in the pixel values of the bird's-eye view images PBt and PBt−1, or in order to correspond to the illumination environment, may take the value "1" when the absolute value exceeds a predetermined threshold value p and the value "0" otherwise. The image on the right side in part (b) of FIG. 4 is a difference image PDt. The threshold value p may be set in advance, or may change according to a control command generated by the controller 39 described below.

Returning to FIG. 3, the three-dimensional object detection unit 33 detects a three-dimensional object based on the difference image PDt data illustrated in part (b) of FIG. 4. In this case, the three-dimensional object detection unit 33 of the present example calculates the travel distance of the three-dimensional object in real space. The three-dimensional object detection unit 33 first generates a differential waveform when the three-dimensional object is detected and the travel distance is to be calculated. The travel distance per unit time of the three-dimensional object is used in calculation of the traveling speed of the three-dimensional object. The traveling speed of the three-dimensional object can be used in assessing whether the three-dimensional object is a vehicle.

In generating the differential waveform, the three-dimensional object detection unit 33 of the present embodiment sets a detection area in the difference image PDt. The three-dimensional object detection device 1 of the present example detects, as an object to be detected, another vehicle to which the driver of the host vehicle V should pay attention, and in particular, another vehicle traveling in a lane adjacent to the lane in which the host vehicle V is traveling and with which contact may be possible when the host vehicle V changes lanes. Therefore in the present example in which three-dimensional objects are detected based on image information, two detection areas are set on the right side and on the left side of the host vehicle V in the images obtained by the camera 10. More specifically, in the present embodiment, rectangular detection areas A1, A2 are set on the left side and on the right side rearward of the host vehicle V, as illustrated in FIG. 2. Another vehicle detected in the detection areas A1, A2 is detected as an obstacle traveling in an adjacent lane adjacent to the lane in which the host vehicle V is traveling. Such detection areas A1, A2 may be set from positions relative to the host vehicle V, or may be set with reference to the positions of white lines. When set with reference to the positions of white lines, the travel distance detection device 1 may, for example, use a known white line recognition technique.

The three-dimensional object detection unit 33 recognizes as ground lines L1, L2 (FIG. 2) the borders of the detection areas A1, A2 thus set, on the host vehicle V side (side along the traveling direction). Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the original ground line determined from the position of the other vehicle VX is not exceedingly great as determined by experience, and there is no problem in actuality.

Figure 5:
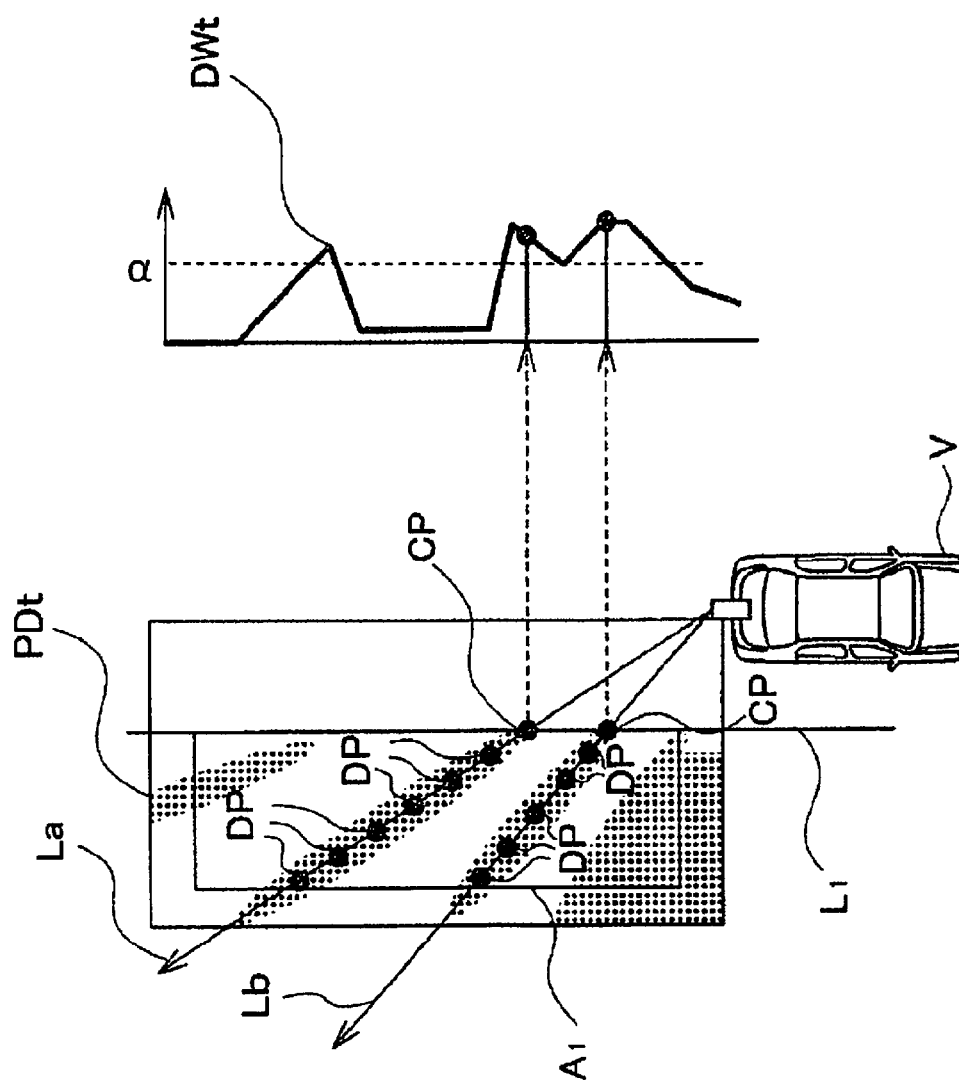
FIG. 5 is a schematic view illustrating the manner in which a differential waveform is generated by the three-dimensional object detection unit of FIG. 3.

FIG. 5 is a schematic view illustrating the manner in which the differential waveform is generated by the three-dimensional object detection unit 33 illustrated in FIG. 3. As illustrated in FIG. 5, the three-dimensional object detection unit 33 generates a differential waveform DWt from the portion that corresponds to the detection areas A1, A2 in the difference image PDt (drawing on the right in part (b) of FIG. 4) calculated by the alignment unit 32. In this case, the three-dimensional object detection unit 33 generates a differential waveform DWt along the collapsing direction of the three-dimensional object by viewpoint conversion. In the example illustrated in FIG. 5, only the detection area A1 will be described for the sake of convenience, but the differential waveform DWt is generated for the detection area A2 as well using the same procedure.

More specifically, the three-dimensional object detection unit 33 defines a line La in the direction in which the three-dimensional object collapses in the data of the difference image DWt. The three-dimensional object detection unit 33 then counts the number of difference pixels DP indicating a predetermined difference on the line La. When the pixel values of the difference image DWt are absolute values of the differences of pixel values in the bird's-eye view images PBt, PBt−1, the difference pixels DP indicating the predetermined difference are pixels exceeding the predetermined threshold value, and when the pixel values of the difference image DWt are represented by "0" and "1," the difference pixels DP indicating the predetermined difference are pixels indicating "1."

The three-dimensional object detection unit 33 counts the number of difference pixels DP, and thereafter determines the crossing point CP of the line La and the ground line L1. The three-dimensional object detection unit 33 then correlates the crossing point CP and the count number, decides horizontal-axis position, i.e., the position on the axis in the vertical direction in the drawing on the right in FIG. 5, based on the position of the crossing point CP, decides the vertical-axis position, i.e., the position on the axis in the lateral direction in the drawing on the right in FIG. 5, from the count number, and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a differential waveform DWt, as illustrated in the drawing on the right in FIG. 5.

The lines La, Lb in the direction in which the three-dimensional object collapses have different distances that overlap the detection area A1, as illustrated in the drawing on the left in FIG. 5. Accordingly, the number of difference pixels DP is greater on the line La than on the line Lb when it is assumed that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is decided from the count number of the difference pixels DP. In a specific example, there are six difference pixels DP on the line La and there are five difference pixels DP on the line Lb in the drawing on the left in FIG. 5. Accordingly, when the vertical-axis position is decided from the count number in FIG. 5, the three-dimensional object detection unit 33 divides the count number by the overlapping distance or performs normalization in another manner. The values of the differential waveform DWt that correspond to the lines La, Lb in the direction in which the three-dimensional object collapses are thereby made substantially the same, as illustrated in the differential waveform DWt.

After the differential waveform DWt has been generated, the three-dimensional object detection unit 33 calculates the travel distance by comparing with the differential waveform DWt−1 at a single moment prior. In other words, the three-dimensional object detection unit 33 calculates the travel distance from the change in time of the differential waveforms DWt and DWt−1.

Figure 6:
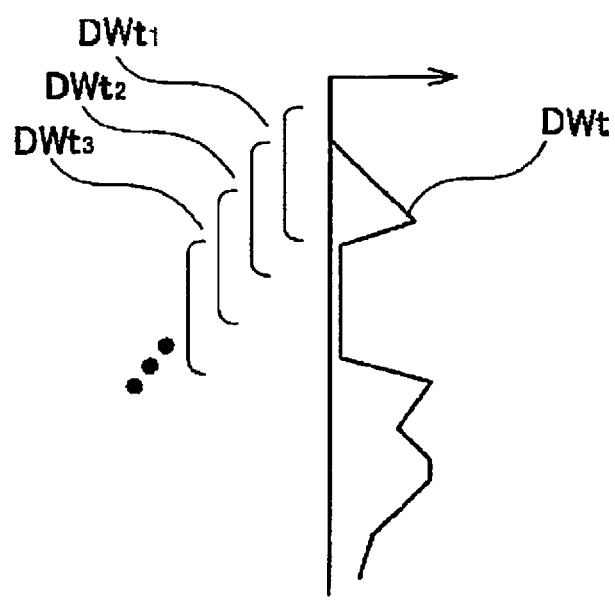
FIG. 6 is a view illustrating small areas divided by the three-dimensional object detection unit of FIG. 3.

More specifically, the three-dimensional object detection unit 33 divides the differential waveform DWt into a plurality of small areas DWt1 to DWtn (where n is an arbitrary integer equal to or greater than 2), as illustrated in FIG. 6. FIG. 6 is a view illustrating the small areas DWt1 to DWtn obtained by the three-dimensional object detection unit 33 by dividing. The small areas DWt1 to DWtn are divided so as to be mutually overlapping, as illustrated in, e.g., FIG. 6. For example, the small area DWt1 and the small area DWt2 overlap each other, and the small area DWt2 and the small area DWt3 overlap each other.

Next, the three-dimensional object detection unit 33 determines the offset amount (the amount of movement in the horizontal-axis direction (vertical direction in FIG. 6) of the differential waveform) for each of the small areas DWt1 to DWtn. Here, the offset amount is determined from the difference (distance in the horizontal-axis direction) between the differential waveform DWt−1 at a single moment prior and the differential waveform DWt at the current moment. In this case, the three-dimensional object detection unit 33 moves the differential waveform DWt−1 at a single moment prior in the horizontal-axis direction for each of the small areas DWt1 to DWtn, and thereupon determines the position (the position in the horizontal-axis direction) in which the error from the differential waveform DWt at the current moment is at a minimum, and determines as the offset amount the movement amount in the horizontal-axis direction at the position in which the error from the original position of the differential waveform DWt−1 is at a minimum. The three-dimensional object detection unit 33 then counts the offset amount determined for each of the small areas DWt1 to DWtn and forms a histogram.

Figure 7:
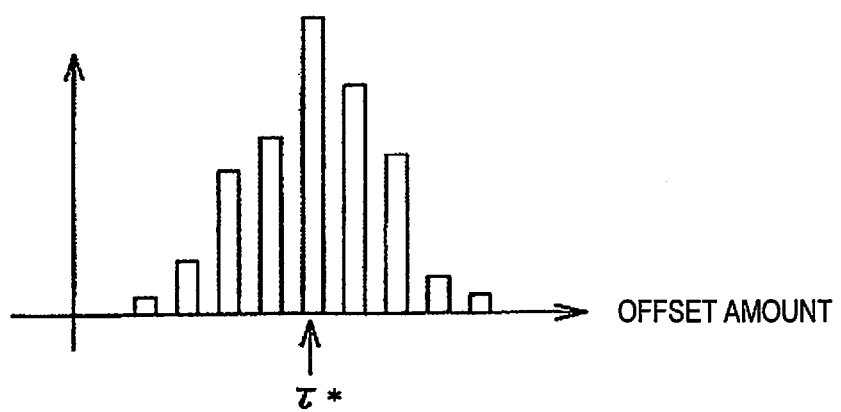
FIG. 7 is a view illustrating an example of a histogram obtained by the three-dimensional object detection unit of FIG. 3.

FIG. 7 is a view illustrating an example of the histogram obtained by the three-dimensional object detection unit 33. As illustrated in FIG. 7, some amount of variability occurs in the offset amount, which is the travel distance in which the error between the small areas DWt1 to DWtn and the differential waveform DWt−1 at a single moment prior is at a minimum. Accordingly, the three-dimensional object detection unit 33 forms the offset amounts including the variability into a histogram and calculates the travel distance from the histogram. At this point, the three-dimensional object detection unit 33 calculates the travel distance of the three-dimensional object from the maximum value in the histogram. In other words, in the example illustrated in FIG. 7, the three-dimensional object detection unit 33 calculates the offset amount indicating the maximum value of the histogram as the travel distance $\tau^*$. The travel distance $\tau^*$ is the travel distance of the other vehicle VX relative to the host vehicle V. Accordingly, the three-dimensional object detection unit 33 calculates the absolute travel distance based on the travel distance $\tau^*$ thus obtained and the signal from the vehicle speed sensor 20 when the absolute travel distance is to be calculated.

Figure 8:
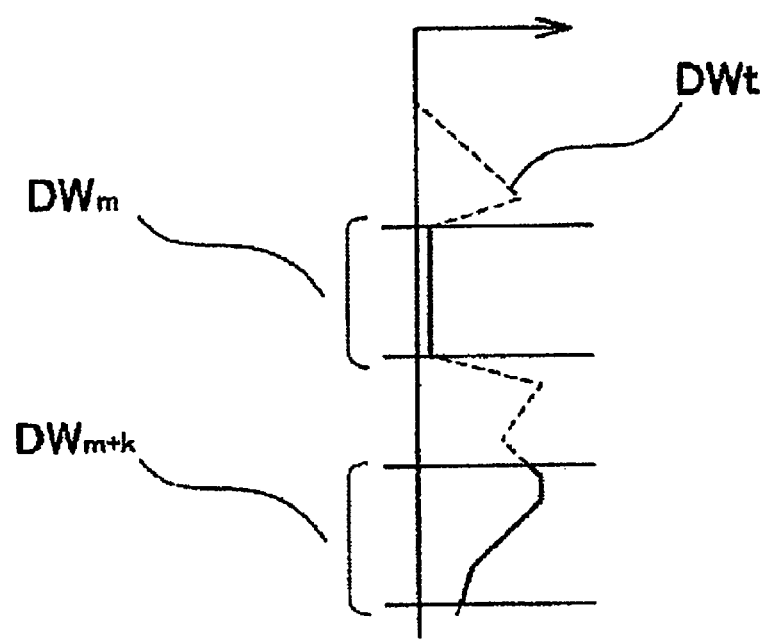
FIG. 8 is a view illustrating weighting by the three-dimensional object detection unit of FIG. 3.

When a histogram is to be formed, the three-dimensional object detection unit 33 may impart a weighting to the plurality of small areas DWt1 to DWtn, and count the offset amounts determined for each of the small areas DWt1 to DWtn in accordance with the weighting to form a histogram. FIG. 8 is a view illustrating the weighting used by the three-dimensional object detection unit 33.

As illustrated in FIG. 8, a small area DWm (where m is an integer equal to or greater than 1 and equal to or less than n−1) is flat. In other words, in the small area DWm, there is little difference between the maximum and minimum values of the count of number of pixels indicating a predetermined difference. The three-dimensional object detection unit 33 reduces the weighting of this type of small area DWm. This is because the flat small area DWm lacks a characteristic and there is a high possibility that an error will be magnified when the offset amount is calculated.

On the other hand, a small area DWm+k (where k is an integer equal to or less than n−m) has abundant undulation. In other words, in the small area DWm, there is considerable difference between the maximum and minimum values of the count of number of pixels indicating a predetermined difference. The three-dimensional object detection unit 33 increases the weighting of this type of small area DWm. This is because the small area DWm+k abundant in undulation is characteristic and there is a high possibility that the offset amount will be accurately calculated. Weighting the small areas in this manner makes it possible to enhance the precision of calculation of the travel distance.

The differential waveform DWt is divided into a plurality of small areas DWt1 to DWtn in the present embodiment in order to enhance the precision for calculating the travel distance, but division into the small areas DWt1 to DWtn is not required when there is not such a great need for precision when calculating the travel distance. In this case, the three-dimensional object detection unit 33 calculates the travel distance from the offset amount of the differential waveform DWt when the error between the differential waveform DWt and the differential waveform DWt−1 is at a minimum. In other words, the method for determining the offset amount between the differential waveform DWt−1 at a single moment prior and the differential waveform DWt at the current moment is not limited to the details described above.

Returning to FIG. 3, the computer 30 is provided with the smear detection unit 40. The smear detection unit 40 detects an area of occurrence of a smear from captured image data obtained by image capture by the camera 10. A smear is a whiteout phenomenon occurring in, e.g., CCD image sensors, and therefore the smear detection unit 40 may be omitted when using a camera 10 with a CMOS image sensor or the like in which smears do not occur.

Figure 9:
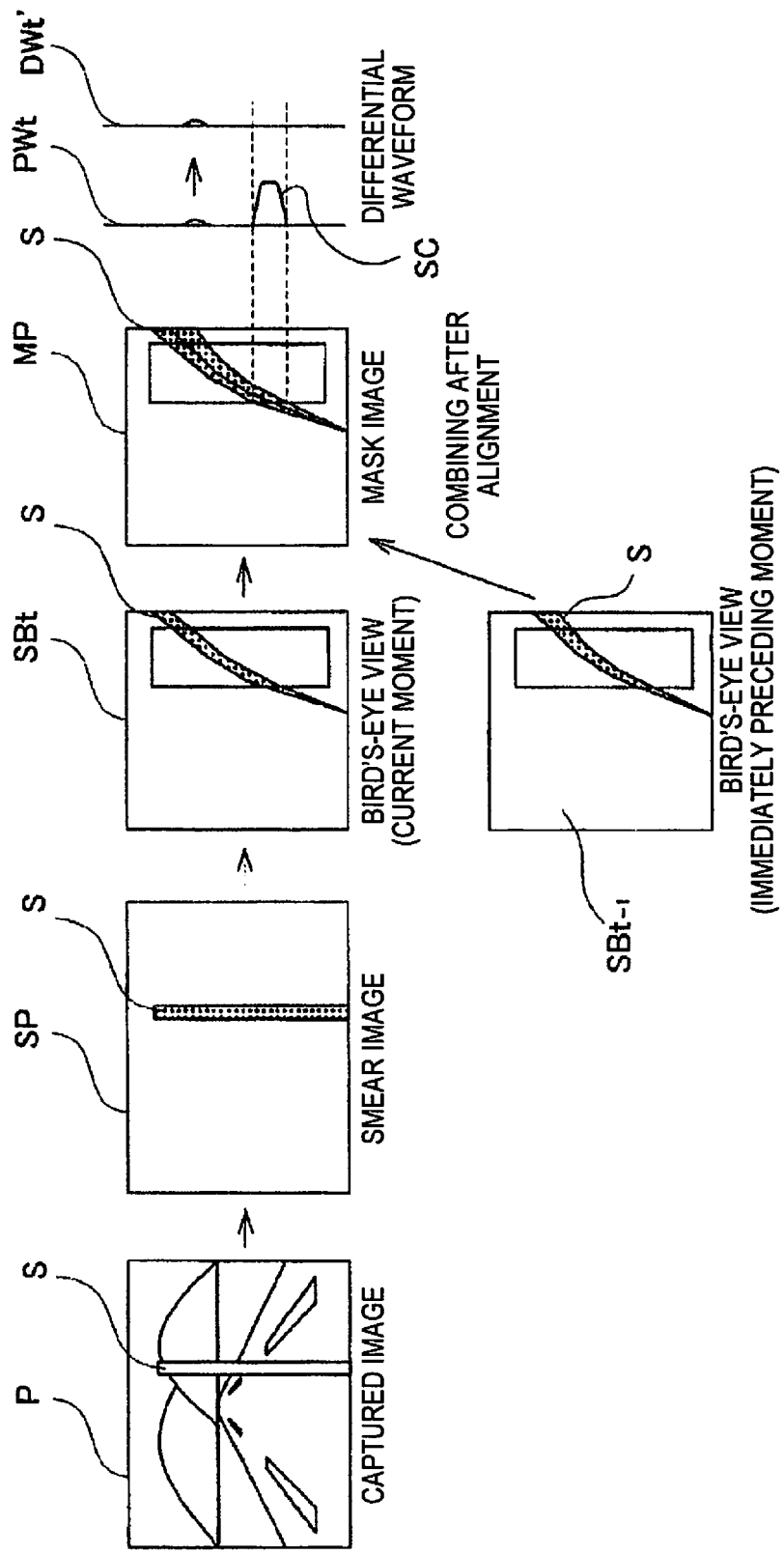
FIG. 9 is a view illustrating processing by the smear detection unit of FIG. 3 and processing by same to calculate a differential waveform.

FIG. 9 is an image view for describing processing by the smear detection unit 40 and processing to calculate the differential waveform DWt thereby. First, it is assumed that data of a captured image P in which a smear S is present is inputted to the smear detection unit 40. The smear detection unit 40 then detects the smear S from the captured image. There are various methods for detecting the smear S; for example, when a general charge-coupled device (CCD) camera is used, a smear S occurs in the downward direction in the image from a light source. Hence in the present embodiment a search is performed for an area having a luminance value equal to or greater than a predetermined value from the lower side of the image towards upwards in the image, and moreover which is continuous in the vertical direction, and such an area is specified as the area of occurrence of the smear S.

The smear detection unit 40 generates data of a smear image SP in which the values of pixels at the location of occurrence of the smear S are set to "1," and the values at other locations are set to "0." After generation, the smear detection unit 40 transmits the data of the smear image SP to the viewpoint conversion unit 31. The viewpoint conversion unit 31, to which the data of the smear image SP has been inputted, performs viewpoint conversion of the data to a bird's-eye view, and thereby generates data of a smear bird's-eye view image SBt. After generation, the viewpoint conversion unit 31 transmits the data of the smear bird's-eye view image SBt to the alignment unit 32. The viewpoint conversion unit 31 transmits the data of the smear bird's-eye view image at a single moment prior SBt−1 to the alignment unit 32.

The alignment unit 32 executes data alignment of the smear bird's-eye view images SBt, SBt−1. The specific alignment is similar to when executing data alignment of the bird's-eye view images PBt, PBt−1. After alignment, the alignment unit 32 takes the logical sum of the area of occurrence of the smear S in the smear bird's-eye view images SBt, SBt−1, and thereby generates the data of a mask image MP. After generation, the alignment unit 32 transmits the data of the mask image MP to the three-dimensional object detection unit 33.

The three-dimensional object detection unit 33 sets the count number of the frequency distribution to zero for the location corresponding to the area of occurrence of the smear S in the mask image MP. In other words, when a differential waveform DWt such as that illustrated in FIG. 9 is generated, the three-dimensional object detection unit 33 sets to zero the count number SC for the smear S, and generates a corrected differential waveform DWt'.

The three-dimensional object detection unit 33 of the present embodiment determines the traveling speed of the vehicle V (camera 10), and determines the offset amount for a stationary object from the traveling speed thus determined. After determining the offset amount of the stationary object, the three-dimensional object detection unit 33 ignores the offset amount corresponding to the stationary object in the maximum value of the histogram, and calculates the travel distance of the three-dimensional object.

Figure 10:
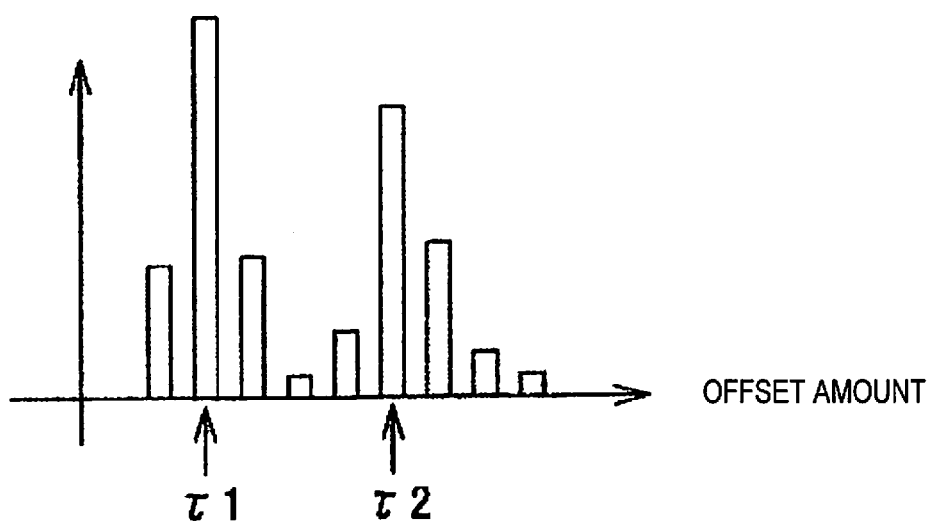
FIG. 10 is a view illustrating another example of a histogram obtained from the three-dimensional object detection unit of FIG. 3.

FIG. 10 is a view illustrating another example of a histogram obtained by the three-dimensional object detection unit 33. When a stationary object is present in addition to another vehicle VX within the view angle of the camera 10, two maximum values $\tau1$, $\tau2$ appear in the histogram obtained. In this case, one among the two maximum values $\tau1$, $\tau2$ is the offset amount of the stationary object. Therefore the three-dimensional object detection unit 33 determines the offset amount for the stationary object from the traveling speed, ignores the maximum value corresponding to the offset amount, and uses the remaining maximum value to calculate the travel distance of the three-dimensional object.

Even if the offset amount corresponding to the stationary object is ignored, when there are a plurality of maximum values, a plurality of other vehicles VX may be present within the view angle of the camera 10. However, the presence of a plurality of other vehicles VX within the detection areas A1, A2 is extremely rare. Accordingly, the three-dimensional object detection unit 33 stops calculating the travel distance.

Figure 11:
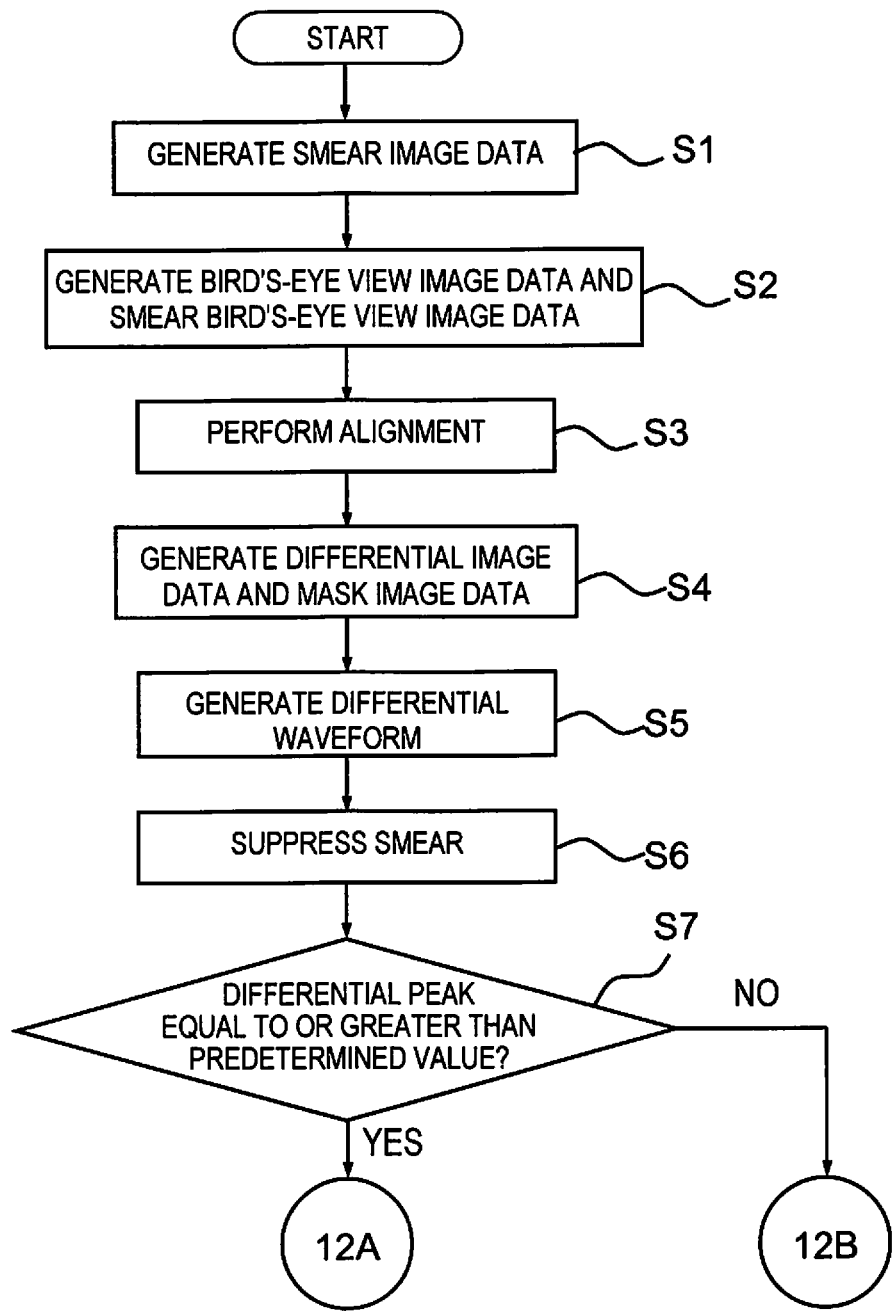
FIG. 11 is a first part of a flowchart illustrating the three-dimensional object detection method in which differential waveform information is used, the method being executed by the viewpoint conversion unit, alignment unit, and smear detection unit of FIG. 3.
Figure 12:
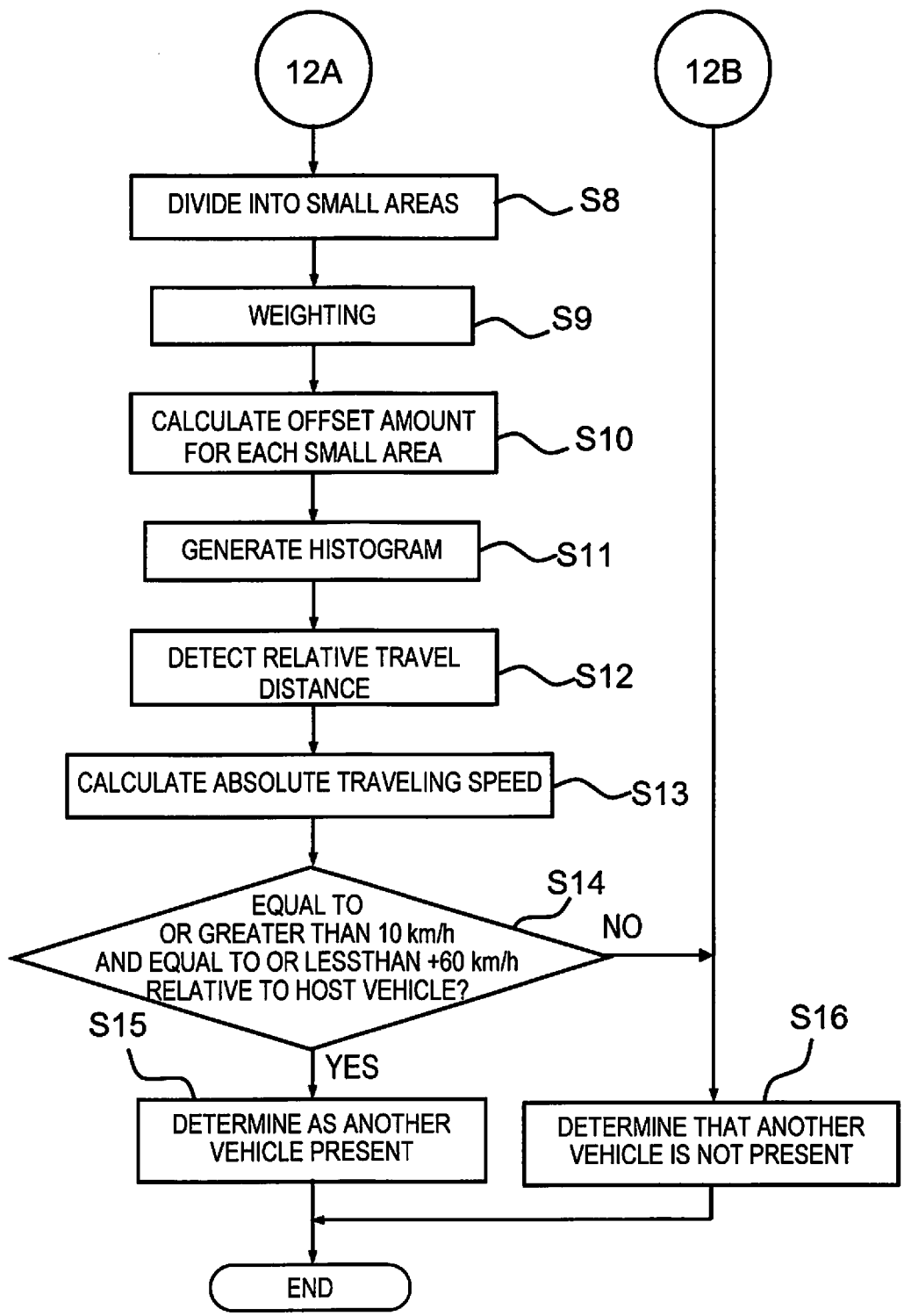
FIG. 12 is a second part of a flowchart illustrating the three-dimensional object detection method in which differential waveform information is used, the method being executed by the viewpoint conversion unit, alignment unit, and smear detection unit of FIG. 3.

Next, the procedure for three-dimensional object detection using differential waveform information is described. FIG. 11 and FIG. 12 are flowcharts illustrating the procedure for three-dimensional object detection of the present embodiment. As illustrated in FIG. 11, first the computer 30 inputs data of an image P captured by the camera 10, and the smear detection unit 40 generates a smear image SP (S1). Then, the viewpoint conversion unit 31 generates data of a bird's-eye view image PBt from data of the captured image P from the camera 10, and generates data of a smear bird's-eye view image SBt from the data of the smear image SP (S2).

The alignment unit 32 aligns the data of the bird's-eye view image PBt and the data of the bird's-eye view image at a single moment prior PBt−1, and aligns the data of the smear bird's-eye view image SBt and the data of the smear bird's-eye view image at a single moment prior SBt−1 (S3). After alignment, the alignment unit 32 generates data of the difference image PDt and generates data of the mask image MP (S4). Then, the three-dimensional object detection unit 33 generates the differential waveform DWt from data of the difference image PDt and data of the difference image at a single moment prior PDt−1 (S5). After generating the differential waveform DWt, the three-dimensional object detection unit 33 sets to zero the count number corresponding to the area of occurrence of the smear S in the differential waveform DWt to suppress the effect of the smear S (S6).

Then, the three-dimensional object detection unit 33 determines whether the peak of the differential waveform DWt is equal to or greater than a first threshold value $\alpha$ (S7). The first threshold value $\alpha$ is set in advance, and can be changed according to a control command of the controller 39 illustrated in FIG. 3; details are described below. When the peak of the differential waveform DWt is not equal to or greater than the first threshold value $\alpha$, that is, when there is almost no difference, it is thought that a three-dimensional object is not present in the captured image P. Therefore when the peak of the differential waveform DWt is assessed as not equal to or greater than the first threshold value $\alpha$ (S7: NO), the three-dimensional object detection unit 33 determines that a three-dimensional object is not present and that another vehicle VX is not present as an obstacle (FIG. 12: S16). Then the processing illustrated in FIG. 11 and FIG. 12 ends.

When, however, the peak of the differential waveform DWt is assessed to be equal to or greater than the first threshold value $\alpha$ (S7: YES), the three-dimensional object detection unit 33 determines that a three-dimensional object is present, and divides the differential waveform DWt into a plurality of small areas DWt1 to DWtn (S8). Then the three-dimensional object detection unit 33 imparts weighting to each of the small areas DWt1 to DWtn (S9). Thereafter, the three-dimensional object detection unit 33 calculates the offset amount for each the small areas DWt1 to DWtn (S10), and generates a histogram with consideration given to the weightings (S11).

Based on the histogram, the three-dimensional object detection unit 33 then calculates the relative travel distance, which is the travel distance of the three-dimensional object with respect to the host vehicle V (S12). Next, the three-dimensional object detection unit 33 calculates the absolute traveling speed of the three-dimensional object from the relative travel distance (S13). The three-dimensional object detection unit 33 time-differentiates the relative travel distance to calculate the relative traveling speed, and adds the vehicle speed detected by the vehicle speed sensor 20 to calculate the absolute traveling speed.

Then the three-dimensional object detection unit 33 determines whether the absolute traveling speed of the three-dimensional object is 10 km/h or greater and moreover, whether the relative traveling speed of the three-dimensional object with respect to the host vehicle V is +60 km/h or less (S14). When both conditions are satisfied (S14: YES), the three-dimensional object detection unit 33 determines the three-dimensional object as another vehicle VX (S15). Then the processing illustrated in FIG. 11 and FIG. 12 ends. However, when either one of the conditions is not satisfied (S14: NO), the three-dimensional object detection unit 33 determines that another vehicle VX is not present (S16). Then the processing illustrated in FIG. 11 and FIG. 12 ends.

In the present embodiment, the detection areas A1, A2 are on the rearward side of the host vehicle V, and emphasis is placed on detecting another vehicle VX traveling in an adjacent lane adjacent to the lane of travel of the host vehicle, said vehicle VX being a vehicle to which attention should be paid during travel of the host vehicle V, and emphasis is placed in particular on the possibility of contact when the host vehicle V changes lanes. This is in order to assess the possibility of contact with another vehicle VX traveling in an adjacent lane adjacent to the lane of travel of the host vehicle when the host vehicle V changes lanes. For this reason, the processing of step S14 is executed. In other words, assuming that the system of the present embodiment is actuated on an expressway, when the speed of a three-dimensional object is less than 10 km/h, it would rarely be a problem even if another vehicle were present because the other vehicle would be positioned far behind the host vehicle V when a lane change is made. Similarly, when the relative traveling speed of a three-dimensional object exceeds +60 km/h in relation to the host vehicle V (i.e., when the three-dimensional object is moving at a speed 60 km/h greater than the speed of the host vehicle), it would rarely be a problem because the adjacent vehicle would be positioned ahead of the host vehicle when a lane change is made. Hence step S14 determines another vehicle VX which may result in a problem when a lane change is made.

In step S14, by assessing whether the absolute traveling speed of the three-dimensional object is 10 km/h or greater and moreover, whether the relative traveling speed of the three-dimensional object in relation to the host vehicle V is +60 km/h or less, the following advantageous effect is achieved. For example, a possible case is that the absolute traveling speed of a stationary object is detected to be several kilometers per hour depending on the attachment error of the camera 10. Accordingly, assessing whether the speed is 10 km/h or greater makes it possible to reduce the possibility that the stationary object will be assessed to be another vehicle VX. Also, it is possible that the relative speed of a three-dimensional object in relation to the host vehicle V is detected to be in excess of +60 km/h due to noise. Accordingly, assessing whether the relative speed is +60 km/h or less makes it possible to reduce the possibility of errant detection due to noise.

Further, in place of the processing of step S14, it may be assessed that the absolute traveling speed is not negative, or is not 0 km/h. In the present embodiment, emphasis is placed on whether there is the possibility of contact when the host vehicle V changes lanes, and therefore in step S15, when another vehicle VX is detected, a warning sound may be issued to the driver of the host vehicle, or a display corresponding to a warning may be displayed by a predetermined display device.

Thus according to the procedure for detection of three-dimensional objects using differential waveform information of the present example, the number of pixels indicating a predetermined difference in data of the difference image PDt is counted along the direction in which the three-dimensional object collapses due to viewpoint conversion, and by forming the frequency distribution, the differential waveform DWt is generated. Here, a pixel indicating a predetermined difference in the data of the difference image PDt is a pixel that has changed in the image at a different moment, or in other words, a location at which the three-dimensional object has been present. Hence by counting the number of pixels along the direction in which the three-dimensional object collapses at a location at which the three-dimensional object has been present and forming the frequency distribution, the differential waveform DWt is generated. In particular, the number of pixels is counted along the direction in which the three-dimensional object collapses, and therefore the differential waveform DWt is generated from height-direction information of the three-dimensional object. The travel distance of the three-dimensional object is then calculated from the time change in the differential waveform DWt including the height-direction information. Hence compared with a case in which movement of only a single point is considered, the detection location before the time change and the detection location after the time change are specified including height-direction information, and accordingly readily end up being the same location; the travel distance is calculated from the change in time at the same location; and the precision for calculating the travel distance can be improved.

The count number of the frequency distribution is set to zero for the location corresponding to the area of occurrence of the smear S in the differential waveform DWt, thereby removing the waveform part at which the smear S occurs in the differential waveform DWt, so that a situation in which the smear S is misidentified as a three-dimensional object can be prevented.

The travel distance of the three-dimensional object is calculated from the offset amount of the differential waveform DWt when the error of the differential waveform DWt generated for different points in time is at a minimum. Hence the travel distance is calculated from the offset amount of a waveform, which is one-dimensional information, and therefore the computation cost per calculation of the travel distance can be suppressed.

The differential waveforms DWt generated for different points in time are divided into a plurality of small areas DWt1 to DWtn. By thus dividing into a plurality of small areas DWt1 to DWtn, a plurality of waveforms, each expressing the location of the three-dimensional object, is obtained. The offset amount for which the error of the waveforms is at a minimum is determined for each of the small areas DWt1 to DWtn, and by counting the offset amounts determined for each of the small areas DWt1 to DWtn and forming a histogram, the travel distance of the three-dimensional object is calculated. Hence the offset amount is determined for each location of the three-dimensional object, and the travel distance is determined from the plurality of offset amounts, and therefore the precision of calculation of the travel distance can be enhanced.

Weighting is imparted to each of the plurality of small areas DWt1 to DWtn, the offset amounts determined for each of the small areas DWt1 to DWtn are counted according to the weighting, and a histogram is formed. Hence by increasing the weighting for characteristic areas and decreasing the weighting for areas without a characteristic, the travel distance can be calculated still more suitably. Therefore the precision of calculation of the travel distance can be further enhanced.

For each of the small areas DWt1 to DWtn of the differential waveform DWt, the greater the difference between the maximum value and the minimum value of the count of the number of pixels indicating the predetermined difference, the larger the weighting is made. Hence the larger the difference between the maximum value and minimum value of an area having a characteristic undulation, the greater is the weighting, while the weighting is small for a flat area having small undulation. With respect to shape, the offset amount can be determined more accurately for areas that have large undulations than for flat areas, and therefore by making the weighting greater for areas for which the difference between the maximum value and the minimum value is large, the precision of calculation of the travel distance can be further enhanced.

The travel distance of the three-dimensional object is calculated from the maximum value of the histogram obtained by counting offset amounts determined for each of the small areas DWt1 to DWtn. Hence even when there is variation in the offset amounts, the travel distance can be calculated more accurately from the maximum value.

The offset amount is determined for a stationary object and the offset amount is ignored, and therefore a situation in which the precision of calculation of the travel distance of the three-dimensional object is reduced due to a stationary object can be prevented. Further, having ignored the offset amount corresponding to the stationary object, when there is a plurality of maximum values, calculation of the travel distance of the three-dimensional object is stopped. Hence a situation in which the travel distance is calculated erroneously, such as when there is a plurality of maximum values, can be prevented.

In the above embodiment, the vehicle speed of the host vehicle V is assessed based on a signal from the vehicle speed sensor 20, but no limitation is imposed thereby, and the vehicle speed may be estimated from a plurality of images at different points in time. In this case, a vehicle speed sensor is unnecessary, and the configuration can be simplified.

In the above embodiment, the image captured at the current moment and the image captured at a single moment prior are converted into bird's-eye view images, and upon aligning the converted bird's-eye view images, a difference image PDt is generated, the generated difference image PDt is evaluated along the direction of collapsing (the direction of collapsing of the three-dimensional object when converting the captured image to the bird's-eye view image) to generate the differential waveform DWt, but no limitation is imposed thereby. For example, it is also possible to use a configuration in which only the image at a single moment prior is converted to a bird's-eye view, the converted bird's-eye view is aligned, then converted again to a captured image equivalent, a difference image is generated using this image and the image at the current moment, and the generated difference image is evaluated along the direction corresponding to the collapsing direction (i.e., the direction obtained by converting the collapsing direction to a direction in the captured image) to thereby generate the differential waveform DWt. In other words, a bird's-eye view is not expressly required to be generated as a necessity as long as the image at the current moment and the image at a single moment prior are aligned, a difference image PDt is generated from the difference between the two aligned images, and the difference image PDt can be evaluated along the collapsing direction of a three-dimensional object when the difference image PDt is converted to a bird's-eye view.

Detection of Three-Dimensional Objects Using Edge Information

Figure 13:
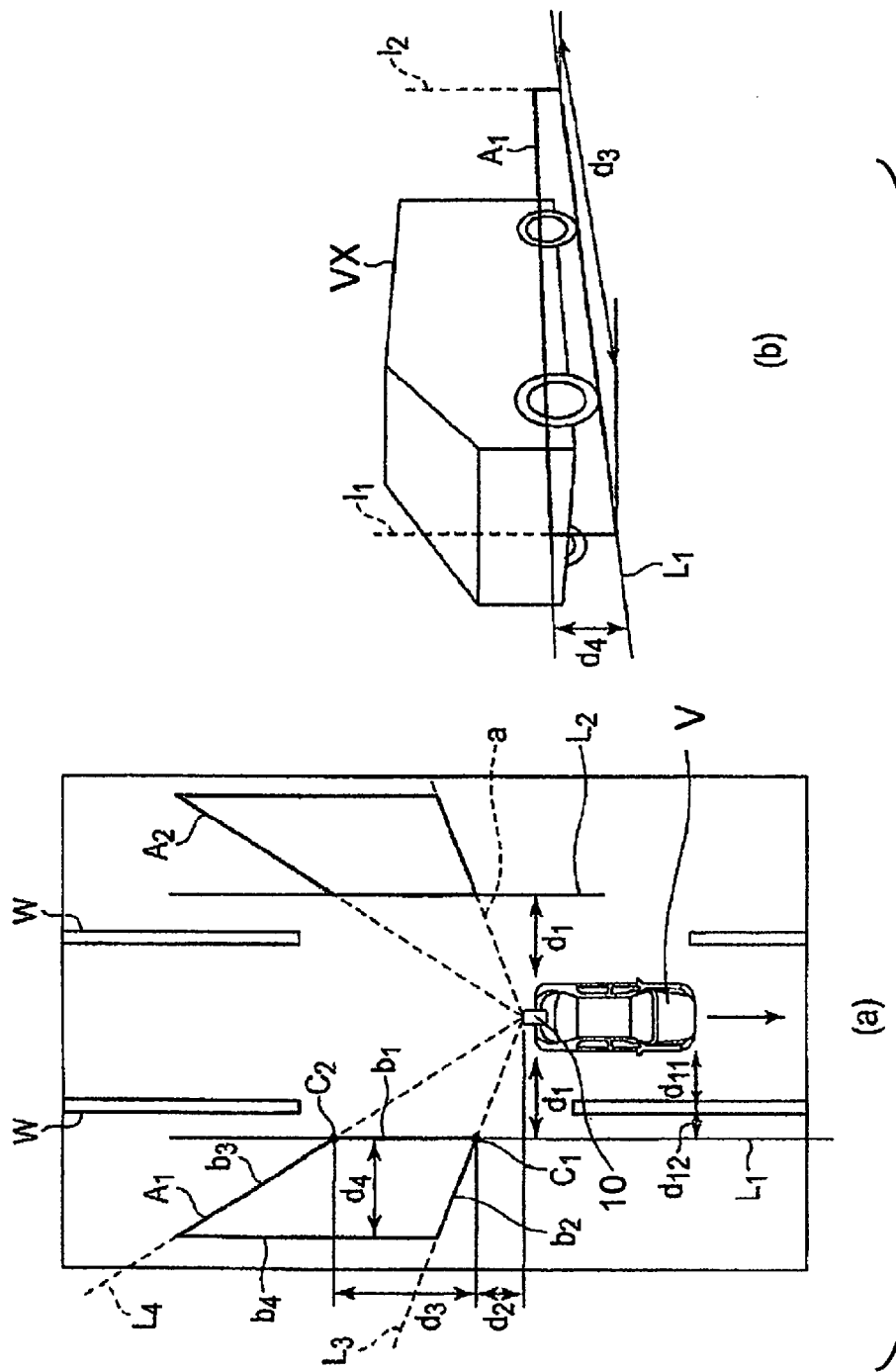
FIG. 13 is a view illustrating the traveling state of the vehicle of FIG. 1 (three-dimensional object detection using edge information), with part (a) being a plan view illustrating the positional relationship of detection areas and the like, and part (b) being a perspective view illustrating the positional relationship of detection areas and the like in real space.

Next, the three-dimensional object detection block B, which can be actuated in place of the three-dimensional object detection block A illustrated in FIG. 3, is described. The three-dimensional object detection block B detects a three-dimensional object using edge information formed by the luminance difference calculation unit 35, edge line detection unit 36, and three-dimensional object detection unit 37. FIG. 13 is a view illustrating the captured range of the camera 10 of FIG. 3, in which part (a) of FIG. 13 is a plan view and part (b) of FIG. 13 is a perspective view in real space of the rearward side of the host vehicle V. As illustrated in part (a) of FIG. 13, the camera 10 has a predetermined view angle a, and captures the rearward side of the host vehicle V included in the predetermined view angle a. The view angle a of the camera 10 is set so as to include adjacent lanes in addition to the lane in which the host vehicle V travels in the range of capture of the camera 10, similarly to the case illustrated in FIG. 2.

The detection areas A1, A2 in the present example are trapezoidal in a plan view (bird's-eye view state), and the position, size, and shape of the detection areas A1, A2 are decided based on distances d1 to d4. The detection areas A1, A2 of the example illustrated in FIG. 13 are not limited to being trapezoidal, and may also be rectangular or another shape in a bird's-eye view state, as illustrated in FIG. 2.

Here, the distance d1 is the distance from the host vehicle V to the ground lines L1, L2. The ground lines L1, L2 refer to a line at which a three-dimensional object, which is present in a lane adjacent to the lane in which the host vehicle V is traveling, is in contact with the ground. In the present embodiment, an object is to detect another vehicle VX or the like (including two-wheeled vehicles or the like) traveling in the left or right lane behind the host vehicle V and adjacent to the lane of the host vehicle V. Accordingly, the distance d1, which is the position of the ground lines L1, L2 of the other vehicle VX, can be decided so as to be substantially fixed from the distance d11 from the host vehicle V to a white line W and the distance d12 from the white line W to the position to which the other vehicle VX is predicted to travel.

The distance d1 is not limited to being fixedly decided, and may be variable. In this case, the computer 30 recognizes the position of the white line W in relation to the host vehicle V using a technique such as white line recognition or the like, and the distance d11 is decided based on the position of the recognized white line W. The distance d1 is thereby variably set using the decided distance d11. In the present embodiment described below, the position at which the other vehicle VX is travelling (the distance d12 from the white line W) and the position at which the host vehicle V is travelling (the distance d11 from the white line W) is mostly decided, and therefore the distance d1 is fixedly decided.

A distance d2 is the distance extending from the rear end part of the host vehicle V in the vehicle traveling direction. The distance d2 is decided so that the detection areas A1, A2 are accommodated within at least the view angle a of the camera 10. In the present embodiment in particular, the distance d2 is set so as to be in contact with a range partitioned within the view angle a. A distance d3 indicates the length of the detection areas A1, A2 in the vehicle traveling direction. The distance d3 is decided based on the size of the three-dimensional object to be detected. In the present embodiment, the object to be detected is the other vehicle VX or the like, and therefore the distance d3 is set to a length that includes another vehicle VX.

A distance d4 indicates a height, which has been set so that the tires of the other vehicle V2 or the like are included in real space, as illustrated in part (b) of FIG. 13. In a bird's-eye view image, the distance d4 is the length illustrated in part (a) of FIG. 13. The distance d4 may also be a length that does not include lanes further adjacent to the left and right adjacent lanes in the bird's-eye view image (i.e., adjacent-adjacent lanes two lanes away). This is because when the lanes two lanes away from the lane of the host vehicle V are included, it is no longer possible to distinguish whether another vehicle VX is present in the adjacent lanes to the left and right of the lane in which the host vehicle V is traveling, or whether another vehicle VX is present in an adjacent-adjacent lane two lanes away.

As described above, the distances d1 to d4 are decided, and the position, size, and shape of the detection areas A1, A2 are thereby decided. More specifically, the position of the top side b1 of the detection areas A1, A2 that form a trapezoid is decided by the distance d1. The starting position C1 of the top side b1 is decided by the distance d2. The end position C2 of the top side b1 is decided by the distance d3. The lateral side b2 of the detection areas A1, A2 that form a trapezoid is decided by a straight line L3 extending from the camera 10 toward the starting position C1. Similarly, the lateral side b3 of the detection areas A1, A2 that form a trapezoid is decided by a straight line L4 extending from the camera 10 toward the end position C2. The position of the lower side b4 of the detection areas A1, A2 that form a trapezoid is decided by the distance d4. In this manner, the areas surrounded by the sides b1 to b4 are the detection areas A1, A2. The detection areas A1, A2 are regular squares (rectangles) in real space rearward from the host vehicle V, as illustrated in part (b) of FIG. 13.

Returning to FIG. 3, the viewpoint conversion unit 31 accepts input of captured image data of a predetermined area captured by the camera 10. The viewpoint conversion unit 31 converts the viewpoint of the inputted captured image data into bird's-eye view image data, which is a bird's-eye view state. A bird's-eye view state is a state of viewing from the viewpoint of an imaginary camera that is looking down from above, e.g., vertically downward (or slightly obliquely downward). Viewpoint conversion can be carried out using the technique described in, e.g., Japanese Laid-Open Patent Application No. 2008-219063.

The luminance difference calculation unit 35 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 35 calculates, for each of a plurality of positions along a vertical imaginary line extending along the vertical direction in real space, the luminance difference between two pixels near each position. The luminance difference calculation unit 35 is capable of calculating the luminance difference by a method for setting a single vertical imaginary line extending in the vertical direction in real space, or a method for setting two vertical imaginary lines.

Described below is the specific method for setting two vertical imaginary lines. The luminance difference calculation unit 35 sets, in the bird's-eye view image that has undergone viewpoint conversion, a first vertical imaginary line that corresponds to a line segment extending in the vertical direction in real space, and a second vertical imaginary line that is different from the first vertical imaginary line and that corresponds to the line segment extending in the vertical direction in real space. The luminance difference calculation unit 35 determines the luminance difference between a point on the first vertical imaginary line and a point on the second vertical imaginary line in continuous fashion along the first vertical imaginary line and the second vertical imaginary line. The operation of the luminance difference calculation unit 35 is described in detail below.

Figure 14:
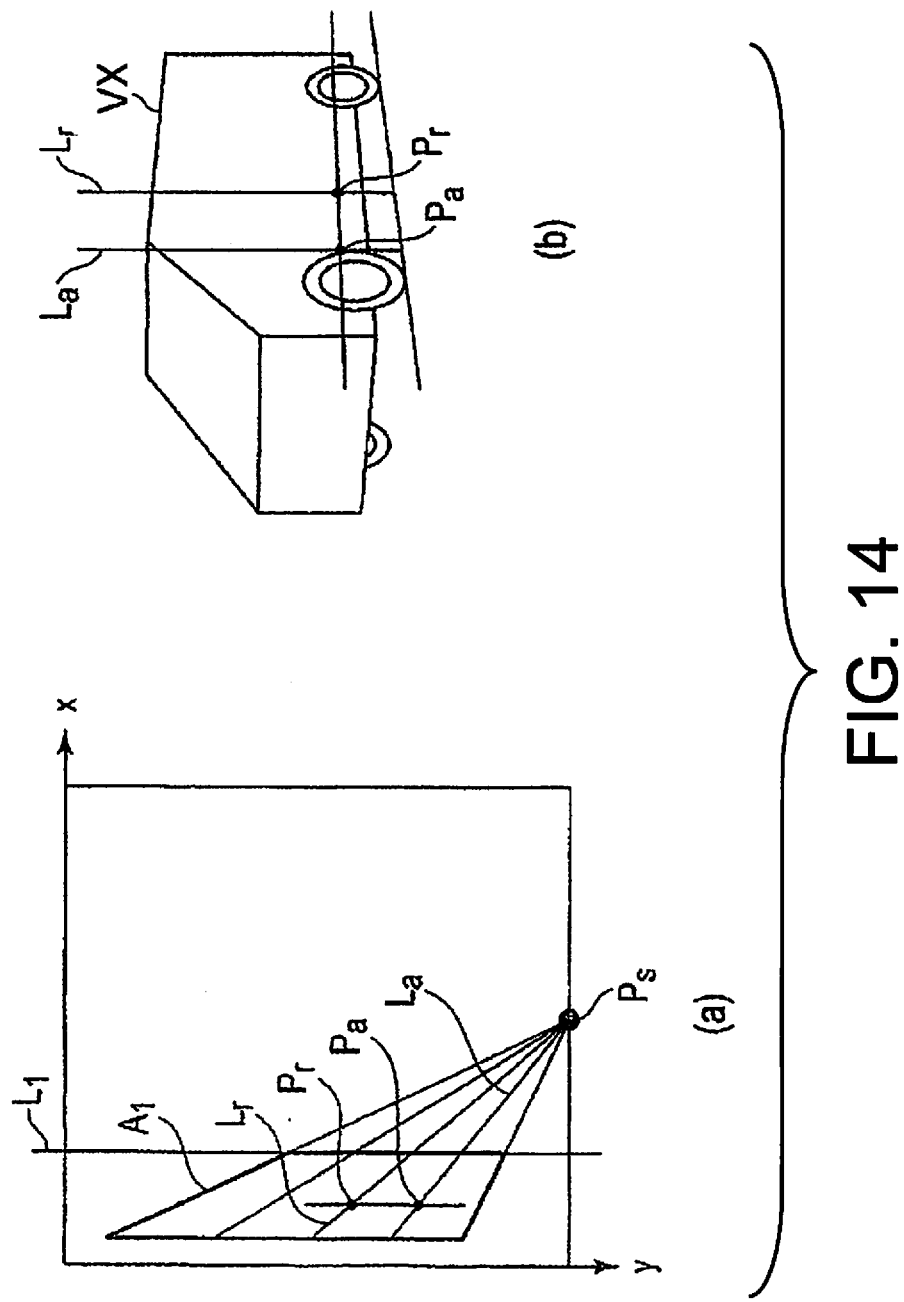
FIG. 14 is a view for describing the operation of the luminance difference calculation unit, with part (a) illustrating the positional relationship between the attention line, reference line, attention point, and reference point in the bird's-eye view image, and part (b) illustrating the positional relationship between the attention line, the reference line, the attention point, and the reference point in real space.

The luminance difference calculation unit 35 sets a first vertical imaginary line La (hereinbelow referred to as attention line La) that corresponds to a line segment extending in the vertical direction in real space and that passes through the detection area A1, as illustrated in part (a) of FIG. 14. The luminance difference calculation unit 35 sets a second vertical imaginary line Lr (hereinbelow referred to as reference line Lr) that is different from the attention line La, corresponds to a line segment extending in the vertical direction in real space, and passes through the detection area A1. Here, the reference line Lr is set at a position at a predetermined distance in real space from the attention line La. The lines that correspond to the line segments extending in the vertical direction in real space are lines that spread out in the radial direction from the position Ps of the camera 10 in a bird's-eye view image. These lines spreading out in the radial direction are lines that follow the collapsing direction of the three-dimensional object when converted to a bird's-eye view.

The luminance difference calculation unit 35 sets an attention point Pa on the attention line La (a point on the first vertical imaginary line). The luminance difference calculation unit 35 sets a reference point Pr on the reference line Lr (a point on the second vertical imaginary line). The attention line La, the attention point Pa, the reference line Lr, and the reference point Pr have the relationship in real space illustrated in part (b) of FIG. 14. It is apparent from part (b) of FIG. 14 that the attention line La and the reference line Lr are lines extending in the vertical direction in real space, and that the attention point Pa and the reference point Pr are points set at substantially the same height in real space. The attention point Pa and the reference point Pr are not necessarily required to be rigorously kept at the same height, and a certain amount of error enabling the attention point Pa and the reference point Pr to be deemed to be at the same height is allowed.

The luminance difference calculation unit 35 determines the luminance difference between the attention point Pa and the reference point Pr. If the luminance difference between the attention point Pa and the reference point Pr is great, it is possible that an edge is present between the attention point Pa and the reference point Pr. Accordingly, the edge line detection unit 36 illustrated in FIG. 3 detects an edge line based on the luminance difference between the attention point Pa and the reference point Pr.

Figure 15:
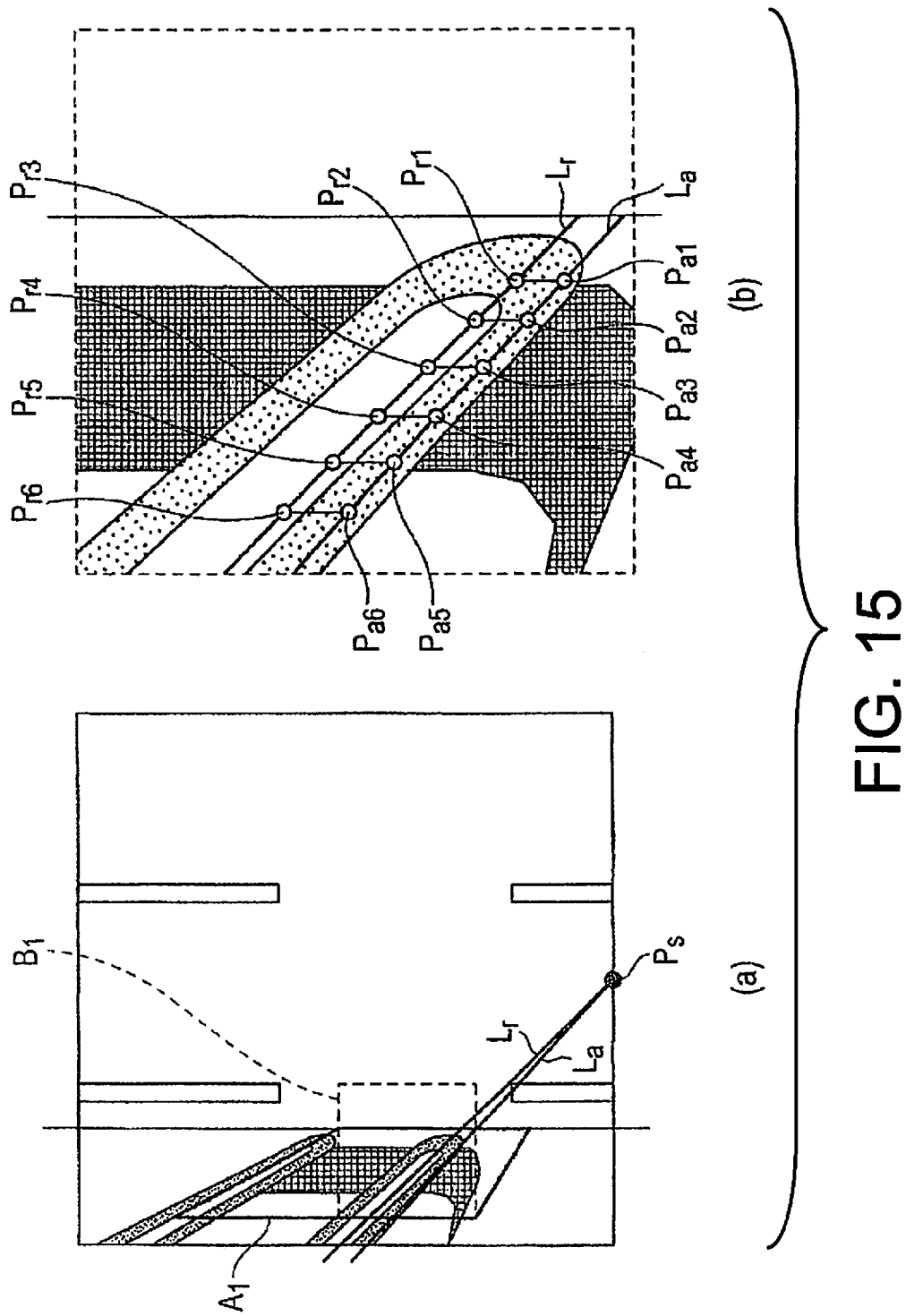
FIG. 15 is a view for describing the detailed operation of the luminance difference calculation unit, with part (a) illustrating the detection area in the bird's-eye view image, and part (b) illustrating the positional relationship between the attention line, the reference line, the attention point, and reference point in the bird's-eye view image.

This point will be described in greater detail. FIG. 15 is a view for describing the detailed operation of the luminance difference calculation unit 35. Part (a) of FIG. 15 illustrates a bird's-eye view image of the bird's-eye view state, and part (b) of FIG. 15 is an enlarged view of a portion B1 of the bird's-eye view image illustrated in part (a) of FIG. 15. In FIG. 15 also, only the detection area A1 is illustrated and described, but the luminance difference is calculated using the same procedure for the detection area A2.

When another vehicle VX is appearing in the captured image captured by the camera 10, the other vehicle VX appears in the detection area A1 in the bird's-eye view image, as illustrated in part (a) of FIG. 15. The attention line La is set on a rubber portion of a tire of the other vehicle VX in the bird's-eye view image in part (b) of FIG. 15, as illustrated in the enlarged view of area B1 in part (a) of FIG. 15. In this state, first, the luminance difference calculation unit 35 sets the reference line Lr. The reference line Lr is set along the vertical direction in a position set at a predetermined distance in real space from the attention line La. Specifically, in the three-dimensional object detection device 1 according to the present embodiment, the reference line Lr is set at a position at a distance of 10 cm away in real space from the attention line La. The reference line Lr is thereby set on the wheel of the tire of the other vehicle VX set, e.g., at a distance that corresponds to 10 cm from the rubber of the tire of the other vehicle VX in the bird's-eye view image.

Next, the luminance difference calculation unit 35 sets a plurality of attention points Pa1 to PaN on the attention line La. In part (b) of FIG. 15, six attention points Pa1 to Pa6 (hereinbelow referred to as attention point Pai when indicating an arbitrary point) are set for convenience of description. An arbitrary number of attention points Pa may be set on the attention line La. In the description below, N attention points Pa are set on the attention line La.

The luminance difference calculation unit 35 subsequently sets the reference points Pr1 to PrN so as to have the same height as the attention points Pa1 to PaN in real space. The luminance difference calculation unit 35 calculates the luminance difference between pairs of attention points Pa and reference points Pr at the same height. The luminance difference calculation unit 35 thereby calculates the luminance difference between two pixels for each of the plurality of positions (1–N) along the vertical imaginary line extending in the vertical direction in real space. The luminance difference calculation unit 35 calculates the luminance difference between, e.g., a first attention point Pa1 and a first reference point Pr1, and calculates the luminance difference between a second attention point Pa2 and a second reference point Pr2. The luminance difference calculation unit 35 thereby determines the luminance difference in continuous fashion along the attention line La and the reference line Lr. In other words, the luminance difference calculation unit 35 sequentially determines the luminance difference between the third to Nth attention points Pa3 to PaN and the third to Nth reference points Pr3 to PrN.

The luminance difference calculation unit 35 repeats the process of setting the above-described reference line Lr, setting the attention point Pa, setting the reference point Pr, and calculating the luminance difference while shifting the attention line La within the detection area A1. In other words, the luminance difference calculation unit 35 repeatedly executes the above-described process while changing the positions of the attention line La and the reference line Lr by the same distance in real space along the direction in which the ground line L1 extends. The luminance difference calculation unit 35, e.g., sets the line that was the reference line Lr in the previous process to be the attention line La, sets the reference line Lr in relation to the attention line La, and sequentially determines the luminance difference.

Returning to FIG. 3, the edge line detection unit 36 detects the edge line from the continuous luminance difference calculated by the luminance difference calculation unit 35. For example, in the case illustrated in part (b) of FIG. 15, the first attention point Pa1 and the first reference point Pr1 are positioned at the same tire portion, and the luminance difference is therefore small. On the other hand, the second to sixth attention points Pa2 to Pa6 are positioned at the rubber portion of the tire, and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 36 is capable of detecting that an edge is present between the second to sixth attention points Pa2 to Pa6 and the second to sixth reference points Pr2 to Pr6 where the luminance difference is high.

Specifically, when an edge line is to be detected, the edge line detection unit 36 first assigns an attribute to the ith attention point Pai from the luminance difference between the ith attention point Pai (coordinates (xi, yi)) and the ith reference point Pri (coordinates (xi', yi')) in accordance with formula 1 noted below.

$s(xi,yi)=1$ when $I(xi,yi)>I(xi',yi')+t$ $s(xi,yi)=-1$ when $I(xi,yi)<I(xi',yi')-t$ $s(xi,yi)=0$ when the above do not hold true.  Formula 1

In formula 1 above, t represents a threshold value, I(xi, yi) represents the luminance value of the ith attention point Pai, and I(xi', yi') represents the luminance value of the ith reference point Pri. In accordance with formula 1, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above. The threshold value t is set in advance, and can be changed according to a control command issued by the controller 39 illustrated in FIG. 3; details are described below.

Next, the edge line detection unit 36 determines whether the attention line La is an edge line from the continuity c(xi, yi) of the attribute s along the attention line La based on the following formula 2.

$c(xi,yi)=1$ when $s(xi,yi)=s(xi+1,yi+1)$(excluding when 0=0)

$c(xi,yi)=0$ when the above does not hold true.  Formula 2

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 36 determines the sum of the continuities c of all the attention points Pa on the attention line La. The edge line detection unit 36 divides the sum of the continuities c thus determined by the number N of attention points Pa to thereby normalize the continuity c. The edge line detection unit 36 determines the attention line La to be an edge line when the normalized value has exceeded a threshold value θ. The threshold value θ is set in advance by experimentation or other means. The threshold value θ may be set in advance, or may be changed according to a control command from the controller 39, described below.

In other words, the edge line detection unit 36 determines whether the attention line La is an edge line based on formula 3 noted below. The edge line detection unit 36 then determines whether all of the attention lines La drawn on the detection area A1 are edge lines.

$$\Sigma c(xi,yi)/N > \theta \qquad \text{Formula 3}$$

Returning to FIG. 3, the three-dimensional object detection unit 37 detects a three-dimensional object based on the quantity of edge lines detected by the edge line detection unit 36. As described above, the three-dimensional object detection device 1 according to the present embodiment detects an edge line extending in the vertical direction in real space. Detecting many edge lines extending in the vertical direction indicates that there is a high possibility that a three-dimensional object is present in the detection areas A1, A2. Accordingly, the three-dimensional object detection unit 37 detects a three-dimensional object based on the quantity of edge lines detected by the edge line detection unit 36. Further, prior to detecting a three-dimensional object, the three-dimensional object detection unit 37 determines whether edge lines detected by the edge line detection unit 36 are correct. The three-dimensional object detection unit 37 determines whether a change in luminance along the edge lines in the bird's-eye view image is equal to or greater than a predetermined threshold value. When the change in luminance on the edge lines in the bird's-eye view image is greater than the predetermined threshold value, the edge lines are assessed to have been detected by errant assessment. On the other hand, when the change in luminance on the edge lines in the bird's-eye view image is less than the predetermined threshold value, it is assessed that the edge lines are correct. The threshold value is set in advance by experimentation or other means.

Figure 16:
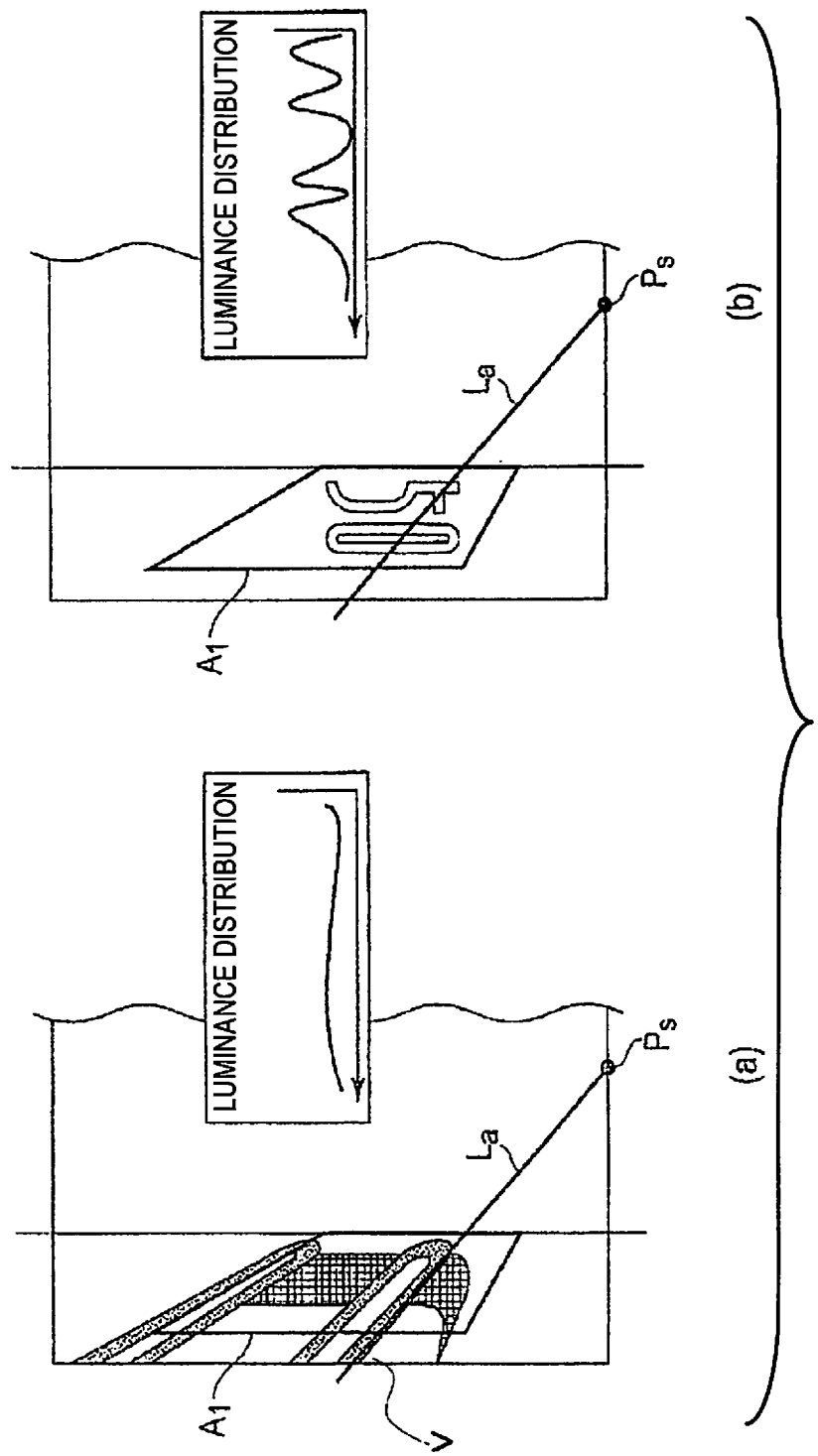
FIG. 16 is a view illustrating an edge line and the luminance distribution on the edge line, with part (a) illustrating the luminance distribution when a three-dimensional object (vehicle) is present in the detection area, and part (b) illustrating the luminance distribution when no three-dimensional object is present in the detection area.

FIG. 16 is a view illustrating the luminance distribution on the edge line, in which part (a) of FIG. 16 illustrates the edge line and the luminance distribution when another vehicle VX as a three-dimensional object is present in the detection area A1, and part (b) of FIG. 16 illustrates the edge line and the luminance distribution when a three-dimensional object is not present in the detection area A1.

As illustrated in part (a) of FIG. 16, it is assumed that it has been assessed that the attention line La set on the tire rubber portion of the other vehicle VX is an edge line in the bird's-eye view image. In this case, the change in luminance on the attention line La in the bird's-eye view image is gradual. This is due to the image captured by the camera 10 being converted in viewpoint to a bird's-eye view image, whereby the tire of the other vehicle VX is enlarged within the bird's-eye view image. On the other hand, the attention line La set in the white character portion "50" drawn on the road surface in the bird's-eye view image is assumed to have been errantly assessed to be an edge line, as illustrated in part (b) of FIG. 16. In this case, the change in luminance on the attention line La in the bird's-eye view image has considerable undulations. This is because portions of low luminance, such as the road and the like, are mixed with the portions of high luminance in the white characters on the edge line.

The three-dimensional object detection unit 37 determines whether an edge line has been detected by errant assessment based on differences in the luminance distribution on the attention line La as described above. The three-dimensional object detection unit 37 determines that the edge line has been detected by errant assessment when the change in luminance along the edge line is greater than the predetermined threshold value, and the edge line is not used in detection of a three-dimensional object. Consequently, a reduction in precision for detecting a three-dimensional object is thereby suppressed when white characters such as "50" on the road surface, roadside vegetation, and the like are assessed to be edge lines.

Specifically, the three-dimensional object detection unit 37 calculates the change in luminance of the edge line using formula 4 or 5 noted below. The change in luminance of the edge line corresponds to the evaluation value in real space in the vertical direction. Formula 4 evaluates the luminance distribution using the total value of the squares of the differences between the ith luminance value I(xi, yi) and the adjacent ith+1 luminance value I(xi+1, yi+1) on the attention line La. Formula 5 evaluates the luminance distribution using the total value of the absolute values of the differences between the ith luminance value I(xi, yi) and the adjacent ith+1 luminance value I(xi+1, yi+1) on the attention line La.

$$\text{Evaluation value in vertical equivalent direction} = \Sigma[\{I(xi,yi) - I(xi+1,yi+1)\}2] \qquad \text{Formula 4}$$

$$\text{Evaluation value in vertical equivalent direction} = \Sigma |I(xi,yi) - I(xi+1,yi+1)| \qquad \text{Formula 5}$$

No limitation is imposed in the use of formula 5, and it is also possible to binarize an attribute b of an adjacent luminance value using a threshold value t2, and then sum the binarized attribute b for all of the attention points Pa, as in formula 6 noted below.

$$\text{Evaluation value in vertical equivalent direction} = \Sigma b(xi,yi)$$

where $b(xi,yi) = 1$ when $|I(xi,yi) - I(xi+1,yi+1)| > t2$ and $b(xi,yi) = 0$ when the above does not hold true. $\qquad$ Formula 6

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or other means so that the attention line La is not assessed to be on the same three-dimensional object. The three-dimensional object detection unit 37 then sums the attribute b for all of the attention points Pa on the attention line La and determines the evaluation value in the vertical equivalent direction to thereby assess whether the edge line is correct.

Figure 17:
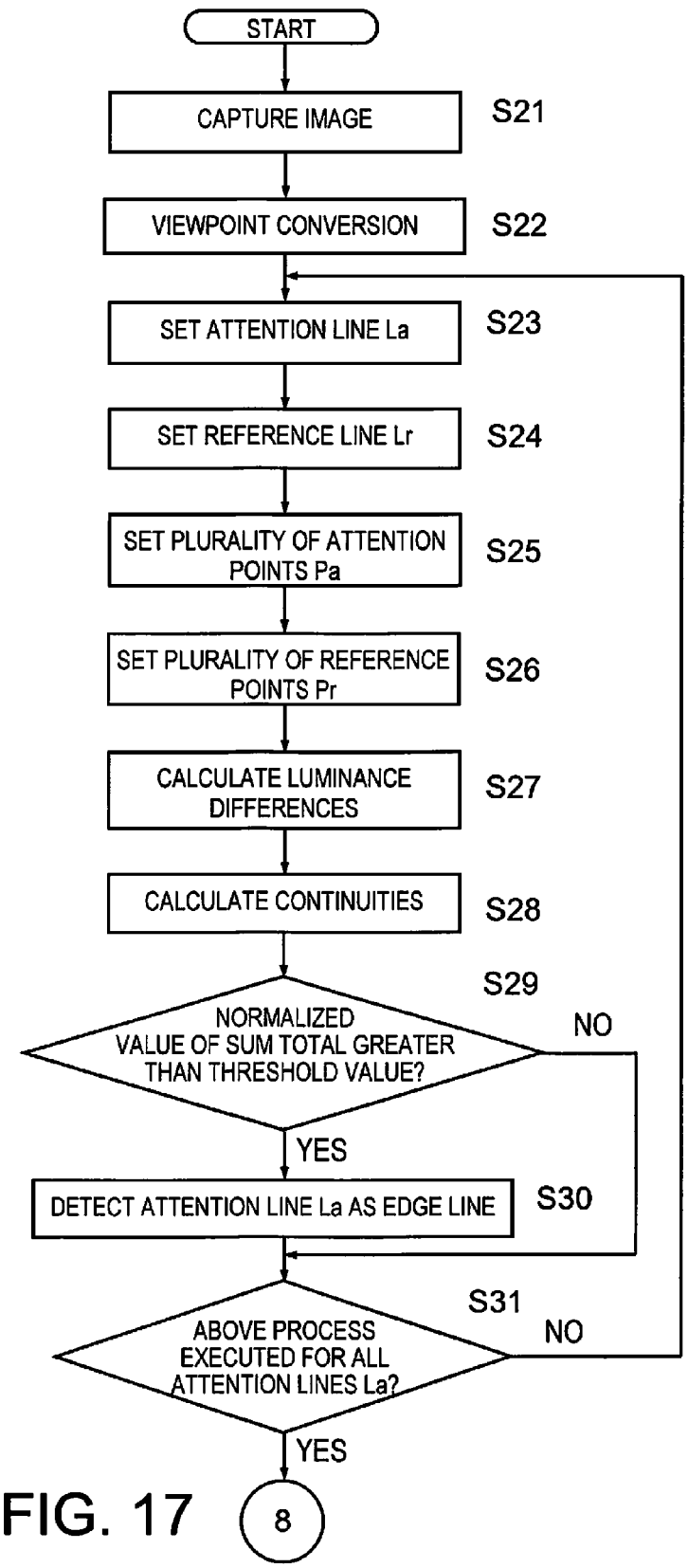
FIG. 17 is a first part of a flowchart illustrating the three-dimensional object detection method in which edge information is used, the method being executed by the viewpoint conversion unit, the luminance difference calculation unit, the edge line detection unit, and the three-dimensional object detection unit of FIG. 3.
Figure 18:
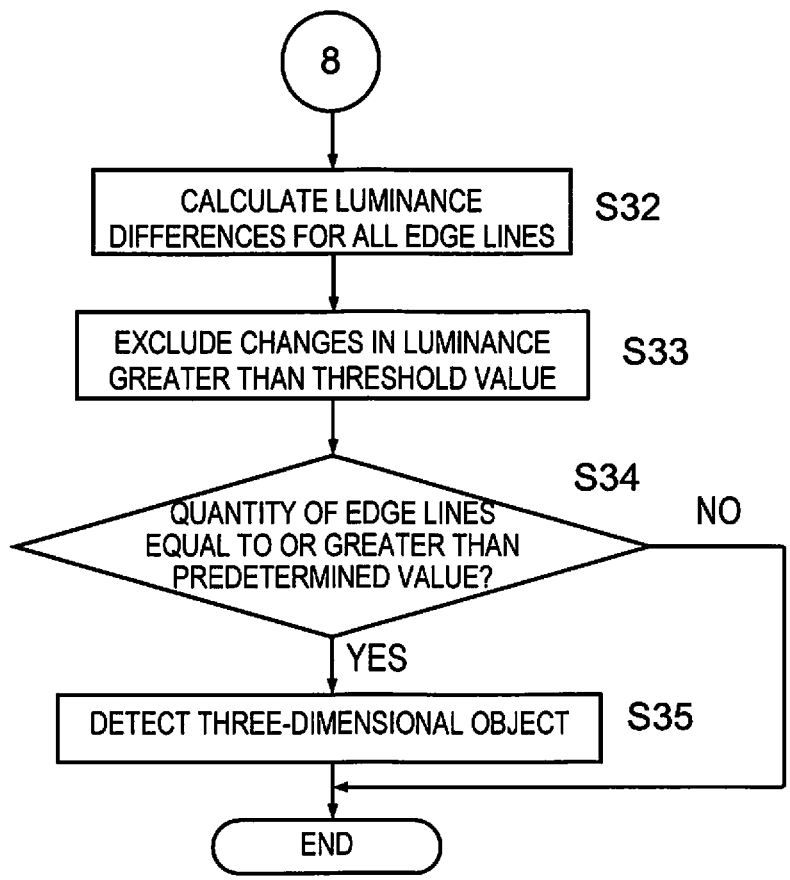
FIG. 18 is a second part of a flowchart illustrating the three-dimensional object detection method in which edge information is used, the method being executed by the viewpoint conversion unit, the luminance difference calculation unit, the edge line detection unit, and the three-dimensional object detection unit of FIG. 3.

Next, the three-dimensional object detection method using edge information of the present embodiment is described. FIG. 17 and FIG. 18 are flowcharts indicating details of the three-dimensional object detection method of the present embodiment. In FIG. 17 and FIG. 18, only processing of the detection area A1 is described for convenience of description, but the same processing is executed for detection area A2 as well.

As illustrated in FIG. 17, first, in step S21 the camera 10 captures a predetermined area specified by the view angle a and attachment position. Next, in step S22 the viewpoint conversion unit 31 receives as input the captured image data captured by the camera 10 in step S21, performs viewpoint conversion, and generates bird's-eye view image data.

Next, in step S23 the luminance difference calculation unit 35 sets an attention line La in the detection area A1. At this time, the luminance difference calculation unit 35 sets as the attention line La a line corresponding to a line extending in the vertical direction in real space. Next, in step S24 the luminance difference calculation unit 35 sets a reference line Lr in the detection area A1. At this time, the luminance difference calculation unit 35 sets as the reference line Lr a line corresponding to a line segment extending in the vertical direction in real space, and at a predetermined distance in real space from the attention line La.

Next, in step S25 the luminance difference calculation unit 35 sets a plurality of attention points Pa on the attention line La. At this time, the luminance difference calculation unit 35 sets a number of attention lines Pa sufficient so that problems do not occur during edge detection by the edge line detection unit 36. In step S26, the luminance difference calculation unit 35 sets reference points Pr such that the attention points Pa and the reference points Pr are at substantially the same height in real space, and consequently the pairs of attention points Pa and reference points Pr are lined up in substantially a horizontal direction, and detection of edge lines extending in the vertical direction in real space is facilitated.

Next, in step S27 the luminance difference calculation unit 35 calculates the luminance difference between the attention points Pa and the reference points Pr at the same height in real space. The edge line detection unit 36 then calculates the attribute s of the attention points Pa in accordance with formula 1 described above. In step S28, the edge line detection unit 36 then calculates the continuity c of the attribute s of the attention points Pa in accordance with formula 2. In step S29, the edge line detection unit 36 furthermore determines whether a value obtained by normalizing the sum of the continuity c is greater than a threshold value $\theta$ in accordance with formula 3. When it has been assessed that the normalized value is greater than the threshold value $\theta$ (step S29: YES), the edge line detection unit 36 detects the attention line La as the edge line in step S30. Processing then proceeds to step S31. When it has been assessed that the normalized value is not greater than the threshold value $\theta$ (step S29: NO), the edge line detection unit 36 does not detect that the attention line La is an edge line, and processing proceeds to step S31. The threshold value $\theta$ can be set in advance, or can be changed according to a control command by the controller 39.

In step S31, the computer 30 determines whether the processes of steps S23 to S30 have been executed for all the attention lines La that can be set in the detection area A1. When it has been assessed that the above processes have not been carried out for all the attention lines La (step S31: NO), the process returns to step S23, sets a new attention line La, and repeats the process through step S31. On the other hand, when it has been assessed that the processes have been carried out for all the attention lines La (step S31: YES), the process proceeds to step S32 of FIG. 18.

In step S32 of FIG. 18, the three-dimensional object detection unit 37 calculates the change in luminance along the edge line for each edge line detected in step S30 of FIG. 17. The three-dimensional object detection unit 37 calculates the change in luminance of edge lines in accordance with any of formulas 4, 5, and 6. Next, in step S33, the three-dimensional object detection unit 37 excludes, from among the edge lines, edge lines in which the change in luminance is greater than a predetermined threshold value. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value is determined by experimentation or other means in advance, and is set based on the change in luminance that occurs due to characters on the road surface, roadside vegetation, and the like.

Next, in step S34, the three-dimensional object detection unit 37 determines whether the quantity of edge lines is equal to or greater than a second threshold value $\beta$. Here, the second threshold value $\beta$ is set in advance to a value that is determined in advance by experimentation or the like, and can also be changed according to a control command issued by the controller 39 illustrated in FIG. 3; details are described below. For example, when a four-wheeled vehicle is set as a three-dimensional object to be detected, the second threshold value $\theta$ is set in advance, by experimentation or the like, based on the number of edge lines of a four-wheeled vehicle appearing in the detection area A1. When is has been assessed that the quantity of edge lines is equal to or greater than the second threshold value $\beta$ (S34: YES), the three-dimensional object detection unit 37 determines in step S35 that a three-dimensional object is present in the detection area A1. When, on the other hand, it is assessed that the quantity of edge lines is not equal to or greater than the second threshold value $\beta$ (S34: NO), the three-dimensional object detection unit 37 determines that a three-dimensional object is not present in the detection area A1. Thereafter, the processing illustrated in FIG. 17 and FIG. 18 ends. A detected three-dimensional object may be assessed to be another vehicle VX traveling in an adjacent lane adjacent to the lane in which the host vehicle V is traveling, or the speed of the detected three-dimensional object relative to the host vehicle V may be considered to assess whether the three-dimensional object is another vehicle VX traveling in an adjacent lane. The second threshold value $\beta$ can be set in advance, but the second threshold value $\beta$ can also be changed according to a control command by the controller 39.

As described above, according to the method for detecting a three-dimensional object using edge information of the present embodiment, a vertical imaginary line is set as a line segment extending in the vertical direction in real space in relation to the bird's-eye view image in order to detect a three-dimensional object present in the detection areas A1, A2. For each of a plurality of positions along the vertical imaginary line, the luminance difference between two pixels near each position is calculated, and the presence of a three-dimensional object can be assessed based on the continuity of the luminance difference.

Specifically, in the detection areas A1, A2 in the bird's-eye view image, an attention line La corresponding to a line segment that extends in the vertical direction in real space, and a reference line Lr different from the attention line La, are set. Then, the luminance differences between attention points Pa on the attention line La and reference points Pr on the reference line Lr are determined continuously along the attention line La and the reference line Lr. By thus continuously determining luminance differences of pairs, the luminance difference between the attention line La and the reference line Lr is determined. When the luminance difference between the attention line La and the reference line Lr is large, there is a high possibility that an edge of a three-dimensional object is present at the setting location of the attention line La. Thus a three-dimensional object can be detected based on the continuous luminance difference. In particular, luminances are compared between vertical imaginary lines extending in the vertical direction in real space, and therefore the three-dimensional object is enlarged, according to the height from the road surface, by converting into a bird's-eye view image.

Hence according to the method of the present example, the precision of detecting a three-dimensional object can be enhanced.

Further, in the present example the luminance difference between two points at substantially the same height near vertical imaginary lines is determined. Specifically, the luminance difference is determined between an attention point Pa on an attention line La and a reference point Pr on a reference line Lr, at substantially the same height in real space, and therefore the luminance difference can be clearly detected when an edge extending in the vertical direction is present.

Figure 19:
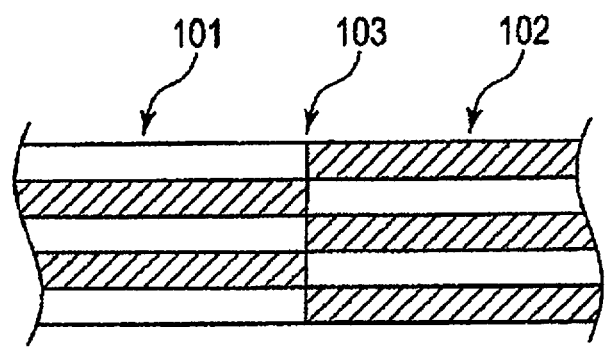
FIG. 19 is a view illustrating an image example for describing edge detection operation.

In the present example, an attribute is assigned to an attention point Pa based on the luminance difference between the attention point Pa on an attention line La and a reference point Pr on a reference line Lr, and whether the attention line La is an edge line is assessed based on the continuity c of attributes along the attention line La. Therefore, the boundary between an area having high luminance and an area having low luminance is detected as an edge line, and edge detection can be performed in conformance with the natural senses of humans. The effect of the above will be described in detail. FIG. 19 is a view illustrating an image example to describe processing by the edge line detection unit 36. This image example is an image in which a first stripe pattern 101 and a second stripe pattern 102 are adjacent to each other, the first stripe pattern 101 indicating a stripe pattern in which areas of high luminance and areas of low luminance are repeated, and the second stripe pattern 102 indicating a stripe pattern in which areas of low luminance and areas of high luminance are repeated. Also, in this image example, areas of the first stripe pattern 101 in which the luminance is high and areas of the second stripe pattern 102 in which the luminance is low are adjacent to each other, and areas of the first stripe pattern 101 in which the luminance is low and areas of the second stripe pattern 102 in which the luminance is high are adjacent to each other. The part 103 positioned on the boundary between the first stripe pattern 101 and the second stripe pattern 102 tends not to be perceived as an edge by human senses.

In contrast, because the areas of low luminance and the areas of high luminance are adjacent to each other, the part 103 is recognized as an edge when an edge is detected only by luminance difference. However, the edge line detection unit 36 determines the part 103 to be an edge line only when there is continuity in the attributes of the luminance difference, in addition to the luminance difference. Therefore, the edge line detection unit 36 is capable of suppressing errant assessment as an edge line of the part 103, which is not recognized as an edge line by human senses, and therefore edges can be detected in accordance with human senses.

In the present example, when the luminance change of an edge line detected by the edge line detection unit 36 is greater than a predetermined threshold value, it is assessed that the edge line was detected by an errant assessment. When converting a captured image acquired by the camera 10 into a bird's-eye view image, a three-dimensional object included in the captured image tends to appear in the bird's-eye view image in an enlarged state. For example, when a tire of another vehicle VX is enlarged as described above, one part, which is the tire, is enlarged, and therefore there is a tendency for the luminance change in the bird's-eye view image to be small in the direction of enlargement. However, when characters drawn on the road surface or the like are errantly assessed to be edge lines, areas of high luminance which are character portions and areas of low luminance which are road surface portions are included in the bird's-eye view image in an intermixed fashion. In this case, there is a tendency for luminance changes in the enlarged direction to become large. Therefore by assessing luminance changes in a bird's-eye view image along edge lines, as in the present example, edge lines detected by errant assessment can be recognized, and the precision of detecting three-dimensional objects can be raised.

Final Assessment of a Three-Dimensional Object

Returning to FIG. 3, the three-dimensional object detection device 1 of the present example is provided with the two above-described three-dimensional object detection units 33 (or the three-dimensional object detection units 37), the three-dimensional object assessment unit 34, the foreign matter detection unit 38, the rainfall state detection unit 41, and the controller 39. The three-dimensional object assessment unit 34 finally determines whether a detected three-dimensional object is another vehicle VX in the detection areas A1, A2 based on the detection results of the three-dimensional object detection unit 33 (or the three-dimensional object detection unit 37). The controller 39 of the three-dimensional object detection device 1 of the present embodiment controls the details of processing of the three-dimensional object detection unit 33 (or the three-dimensional object detection unit 37) and/or the three-dimensional object assessment unit 34 based on the detection results of the rainfall state detection unit 41.

The rainfall state detection unit 41 of the present embodiment detects whether a rainfall state exists at the position of travel of the host vehicle V. Specifically, the rainfall state detection unit 41 detects whether a rainfall state exists at the position of travel of the host vehicle V (including information as to whether rain is actually falling, the amount of rainfall when rain is falling, or whether a water film is formed on the road surface due to rainfall) based on information acquired from the raindrop sensor 50, wiper 60, and/or navigation device 70. More specifically, the rainfall state detection unit 41 detects whether raindrops have adhered to, or there is a high possibility that raindrops will adhere to, the outside of the body of the host vehicle V and in particular the lens 11 of the camera 10, or detects the amount of adhering raindrops (amount of rainfall).

The raindrop sensor 50 of the present embodiment is provided with a stage constituted of a translucent material such as glass or the like to which raindrops can adhere, a light emitting unit that irradiates the stage with infrared light, and a light receiving unit that receives reflected light that was irradiating light from the light emitting unit. One main surface of the stage is exposed to the outside of the host vehicle, and raindrops adhere thereto during rainfall. When raindrops are not adhering to the exposed surface of the stage, irradiating light from the light emitting unit undergoes total reflection at the surface of the stage (glass), and therefore the light receiving unit receives reflected light with substantially the same intensity as the irradiating light. However, when raindrops are adhering to the exposed surface of the stage, irradiating light from the light emitting unit is transmitted to the outside via raindrops adhering to the stage (glass), and therefore the light receiving part receives reflected light that is attenuated in intensity compared with the irradiating light. By comparing the irradiating light from the light emitting unit and the reflected light received by the light receiving unit, it can be assessed whether raindrops are adhering to the exposed surface (one main surface) of the stage. Further, the quantity of raindrops adhering to the exposed surface (one main surface) of the stage can be detected based on the value obtained by subtracting the intensity of irradiating light from the light emitting unit from the intensity of the reflected light received by the light receiving unit, that is, based on the amount of attenuation of the irradiating light. When there is a large quantity of raindrops adhering to the exposed surface of the stage, a large amount of irradiating light passes through to the outside, and therefore the amount of attenuation is large. However, when there is a small quantity of raindrops adhering to the exposed surface of the stage, a small amount of light passes through to the outside, and the amount of attenuation of the irradiating light is small. This can be used by the raindrop sensor 50 to assess that the quantity of raindrops adhering to the stage is larger (the amount of rainfall is larger) when the amount of attenuation of the irradiating light is larger, and that the quantity of raindrops adhering to the stage is smaller (the amount of rainfall is smaller) when the amount of attenuation of the irradiating light is smaller. Information relating to whether raindrops are present or absent and to the quantity of raindrops is transmitted to the rainfall state detection unit 41 of the computer 30, described below. No limitations are imposed on the configuration of the raindrop sensor 50, and another raindrop sensor 50 known at the time of filing can be used as appropriate. The rainfall state detection unit 41 detects whether raindrops are present or absent, the quantity of raindrops, and the amount of rainfall based on raindrop detection information acquired from the raindrop sensor 50, and transmits the detected results to the controller 39.

The wiper 60 is a device for removing raindrops adhering to the windshield and to the rear windshield of the host vehicle V. Regardless of a manual or automatic setting, the frequency of raindrop removal operation of the wiper 60 rises as the quantity of raindrops adhering increases. This relationship can be used to assess that the higher the frequency of driving (driving intensity) of the wiper 60, the greater is the quantity of raindrops (the greater the amount of rainfall), and the lower the frequency of driving (driving intensity) of the wiper 60, the lesser is the quantity of raindrops (the lesser the amount of rainfall). The detection result for whether raindrops are present or absent and the quantity of raindrops is transmitted to the rainfall state detection unit 41 of the computer 30, described below. No limitations in particular are placed on the specific configuration of the wiper 60 of the present embodiment, and a wiper 60 that was known at the time of filing can be used as appropriate. The rainfall state detection unit 41 detects the presence of raindrops, the quantity of raindrops, and the amount of rainfall based on the raindrop detection information acquired from the wiper 60, and transmits the detection results to the controller 39.

The navigation device 70 is provided with a communication device 71 for information exchange with an external device, and similarly to general navigation devices known at the time of filing, functions as a device not only for route searching but also for providing various information, including weather information which includes rainfall information associated with position information from an information provision server. Rainfall information that is acquired includes whether rainfall is present or absent and the extent of the amount of rainfall. The navigation device 70 uses the GPS device 72 to detect the current position of the host vehicle V, and acquires weather information including rainfall information at the current position, and thereby can acquire information from an outside device relating to the presence or absence of rainfall (raindrop adherence) and the extent of the amount of rainfall. The acquired rainfall information is transmitted to the rainfall state detection unit 41 of the computer 30, described below. Based on detection information acquired from the navigation device 70, the rainfall state detection unit 41 detects whether the travel site of the host vehicle V is in a rainfall state (whether rain is falling, or whether a state exists in which a water film is formed on the road surface after rainfall) and, if rain is falling, detects the amount of rainfall, and transmits the detected results to the controller 39.

Figure 20:
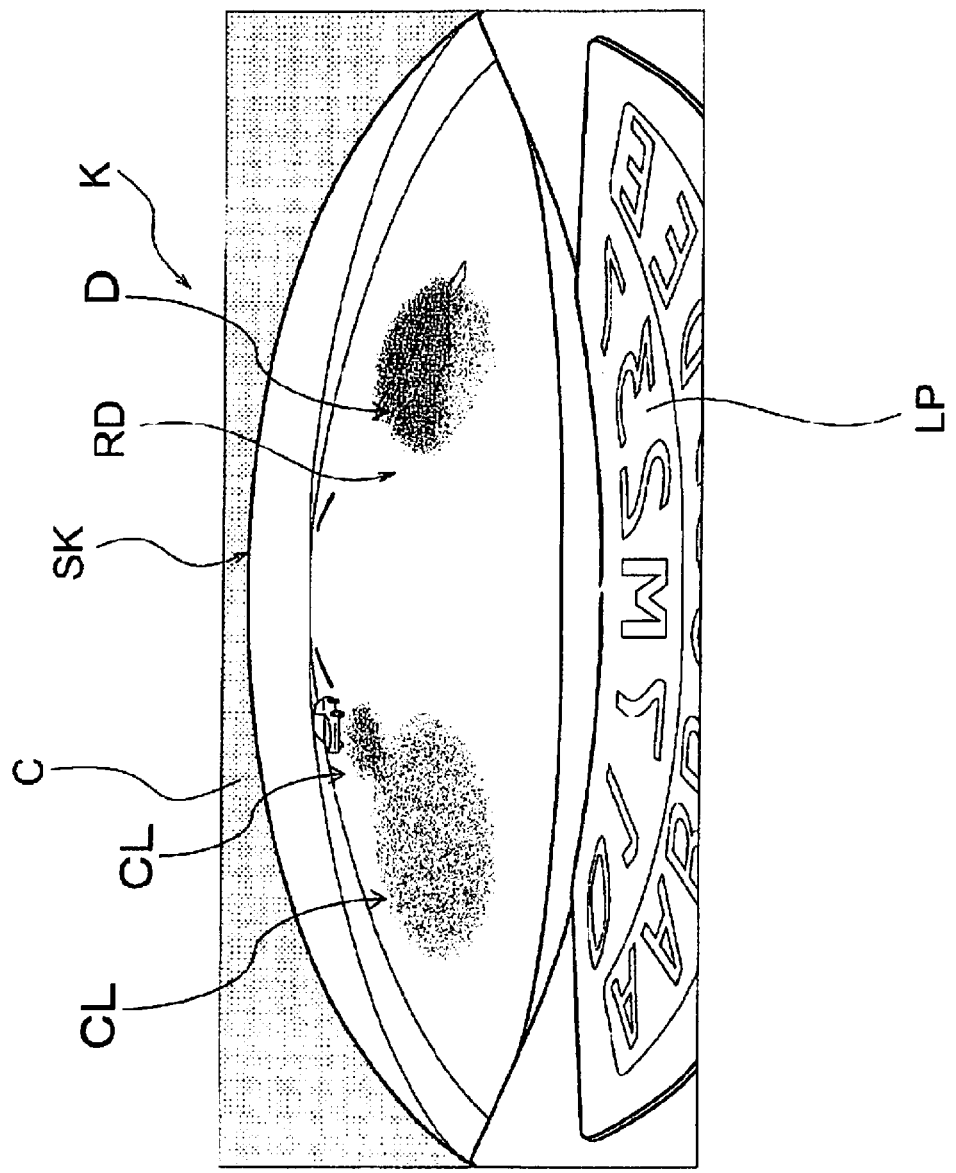
FIG. 20 is a view illustrating an example of image information captured during rainfall.

The three-dimensional object detection device 1 of the present embodiment detects a three-dimensional object based on an image captured by the camera 10 and determines whether a detected three-dimensional object is another vehicle VX. FIG. 20 illustrates an example of image information K acquired when raindrops are adhering to the lens 11 of the camera 10 attached to the host vehicle V, and in particular to the host vehicle V in a rainfall state. The image information illustrated in FIG. 20 is captured via the lens 11, to which raindrops or other foreign matter adheres. The image on the lower side in FIG. 20 is an image of a license plate LP, and the gray portion on the upper side is an image of the case C of the camera 10. The image in the area between the license plate LP and the case C changes from moment to moment with movement of the host vehicle V. As illustrated in FIG. 20, the image information K in the area between the license plate LP and the case C includes an image of the road surface RD of the road on which the host vehicle V is traveling and an image of the sky SK rearward and extending above the road surface RD. The image information K illustrated in FIG. 20 also includes images CL of foreign matter such as raindrops or the like adhering to the lens 11. Further, when there is a large amount of rainfall, water may accumulate on the road surface, and the image information K illustrated in FIG. 20 includes a reflected image D formed by a water film of water accumulated on the road surface. Thus during rainfall, phenomena may occur in which raindrops directly adhere to the lens 11, or water drops of rainwater splashed by the host vehicle adhere to the lens 11, or mud included in muddy water that has been splashed adheres to the lens 11.

Returning to FIG. 20, when image information captured via the lens 11 to which foreign matter such as raindrops or the like adheres during a rainfall state is used to perform image conversion, an image CL of the foreign matter such as raindrops or the like may be errantly recognized as the image of a three-dimensional object, or a traveling speed may be errantly detected. Hence there are cases in which an image CL may be errantly recognized as the image of another vehicle VX or may lead to errant assessment results. In particular, during rainfall, information of the outline (edge components, pixel compounds forming the outline) of a three-dimensional object may be inaccurate due to the presence of foreign matter such as raindrops or the like adhering to the lens 11 of the camera 10, and therefore accurate detection of the traveling speed of a three-dimensional object is difficult.

In the three-dimensional object detection device 1 of the present embodiment, the setting range of traveling speeds of a three-dimensional object, set in advance and applied when assessing whether a three-dimensional object is another vehicle VX, is adjusted in order to enhance the precision of assessment of another vehicle VX during rainfall. As described above, the three-dimensional object assessment unit 34 of the present embodiment determines a detected three-dimensional object to be another vehicle VX when the traveling speed of the three-dimensional object detected by the three-dimensional object detection units 33, 37 lies within the setting range. Specifically, the controller 39 of the present embodiment changes the "traveling speed setting range" for assessing whether a three-dimensional object is another vehicle VX to be narrower when the rainfall state detection unit 41 detects a rainfall state, in order to suppress assessment of a three-dimensional object as another vehicle VX.

It is thereby possible to prevent errant assessment of a three-dimensional object that is not another vehicle VX as another vehicle VX while in a rainfall state based on the relative speed of the three-dimensional object, which can easily be errantly calculated due to the presence of raindrops adhering to the lens 11 and reflection by a water film formed on the road surface. As a result, errant detection of foreign matter adhering to the lens 11 as another vehicle VX, and errant detection as another vehicle VX of a three-dimensional object that is not a vehicle but the image of which is distorted by raindrops adhering to the lens 11, can be suppressed, and therefore other vehicles VX can be detected accurately.

In particular, the above-described errant detection of the traveling speed occurs readily when a detected three-dimensional object is moving rearward, that is, when the relative speed of the detected three-dimensional object is a negative value. Hence the controller 39 of the present embodiment changes the "traveling speed setting range" to be narrower when the rainfall state detection unit 41 has detected a rainfall state and the traveling speed of a three-dimensional object calculated by the three-dimensional object detection units 33, 37 is a negative value, thereby suppressing assessment of a detected three-dimensional object as another vehicle VX.

It is thereby possible to suppress processing to detect another vehicle VX only during circumstances of rainfall in which the relative speed may be errantly detected, and therefore errant detection can be suppressed while securing the original precision of operation for detecting another vehicle VX. Circumstances in which a three-dimensional object moves rearward occur, e.g., when the host vehicle V passes another vehicle VX, and are cases in which the driver of the host vehicle V can easily discern the circumstances. By limiting processing to suppress detection of another vehicle VX to cases in which the traveling speed of the three-dimensional object is a negative value, the occurrence of problems due to suppression of operation to detect another vehicle VX can be suppressed.

In the above-described processing to suppress detection of another vehicle VX, the controller 39 of the present embodiment sets the "traveling speed setting range" to be narrower as the amount of rainfall (included in the rainfall state) detected by the rainfall state detection unit 41 is greater, and thereby suppresses assessment of a three-dimensional object as another vehicle VX. The greater the amount of rainfall, the more the precision of the three-dimensional object traveling speed tends to decline, and therefore by setting the "traveling speed setting range" to be narrower so as to suppress detection of another vehicle VX when there are greater amounts of rainfall, the precision of detection of another vehicle VX can be enhanced.

Figure 21A:
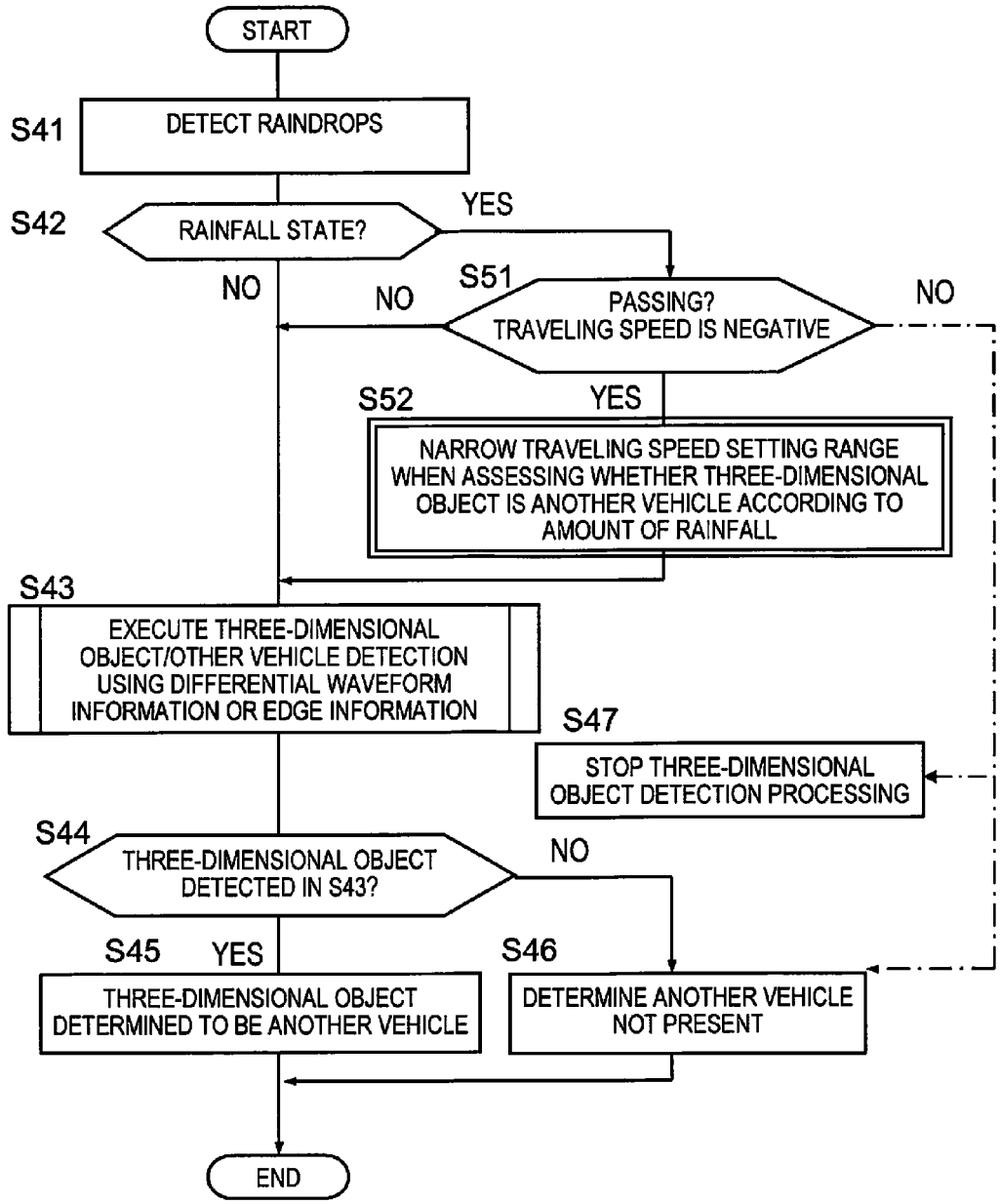
FIG. 21A is a first part of a flowchart illustrating the control procedure for three-dimensional object assessment that corresponds to the result of detection of the state of rainfall.

FIG. 21A is a flowchart illustrating the control procedure. As illustrated in FIG. 21A, in step S41 the rainfall state detection unit 41 performs processing based on the result of detection of raindrops by the raindrop sensor 50, driving information of the wiper 60, and rainfall information from the navigation device 70, to detect whether the position of travel of the host vehicle V is in a rainfall state. When in step S42 a rainfall state is detected by the rainfall state detection unit 41, processing proceeds to step S51.

Figure 21B:
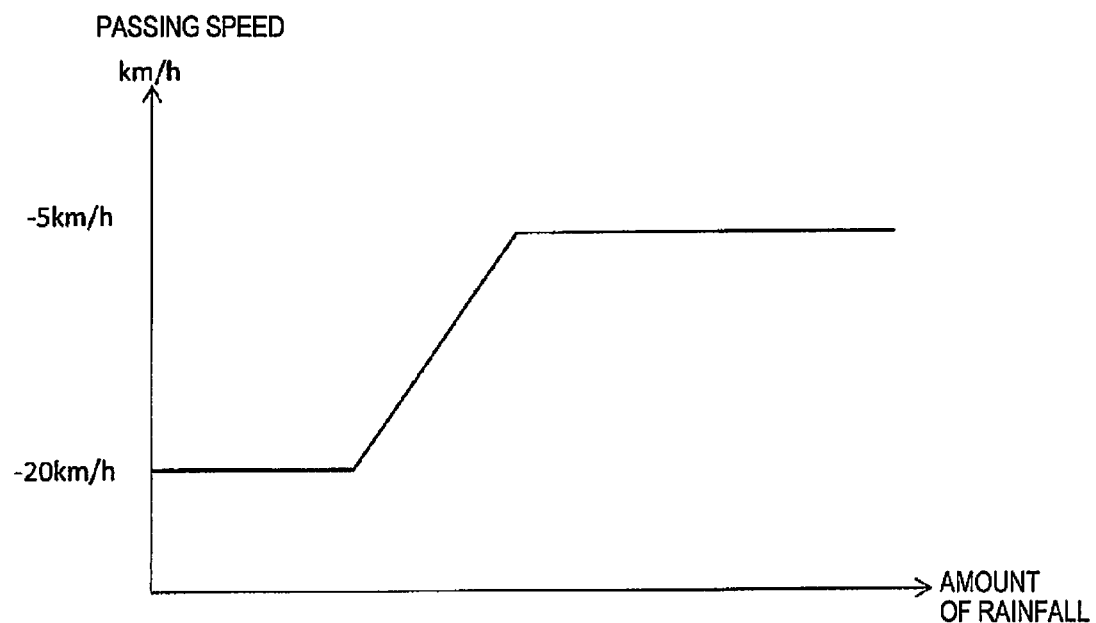
FIG. 21B is a view for describing the method for setting the "traveling speed threshold value."

In step S51, an assessment is made as to whether the traveling speed of a three-dimensional object detected by the three-dimensional object detection units 33, 37 is a negative value, and if the value is negative, processing proceeds to step S52. In step S52, the controller 39 changes the "traveling speed setting range" used when assessing whether a three-dimensional object is another vehicle to be narrower than the default setting range. When doing so, the controller 39 can decide the "traveling speed setting range" for resetting according to the amount of rainfall detected by the rainfall state detection unit 41. The controller 39 of the present embodiment makes the "traveling speed setting range" narrower for greater amounts of rainfall. FIG. 21B illustrates an example of the relationship between the "amount of rainfall" and the lower limit of the "traveling speed setting range." As illustrated in FIG. 21B, the greater the "amount of rainfall," the higher the lower limit is made and the narrower the "traveling speed setting range" becomes. Similarly, the greater the amount of rainfall, the more the upper limit of the "traveling speed setting range" can be lowered. Then processing proceeds to step S43, and three-dimensional object detection processing based on differential waveform information or edge information is executed. When a rainfall state has been detected in step S42, it is possible for processing to skip step S51 and proceed to step S52.

This processing to detect a three-dimensional object is performed according to the processing by the three-dimensional object detection unit 33 using differential waveform information illustrated in FIG. 11 and FIG. 12, or according to the processing by the three-dimensional object detection unit 37 using edge information illustrated in FIG. 17 and FIG. 18. In step S44, a three-dimensional object is detected in the detection areas A1, A2 by the three-dimensional object detection units 33, 37, and when the three-dimensional object is assessed as another vehicle VX by the three-dimensional object assessment unit 34, processing advances to step S45, and the detected three-dimensional object is assessed to be another vehicle VX. On the other hand, when a three-dimensional object is not detected in the detection areas A1, A2 by the three-dimensional object detection units 33, 37, or a three-dimensional object is assessed not to be another vehicle VX by the three-dimensional object assessment unit 34, processing advances to step S46, and it is assessed that another vehicle VX is not present in the detection areas A1, A2. When in step S42 a rainfall state is detected and the host vehicle V is passing another vehicle, processing may proceed to step S47 and processing to detect a three-dimensional object may be stopped, or processing may proceed to step S46 and an assessment may be made that another vehicle VX is not present in the detection areas A1, A2.

The three-dimensional object assessment unit 34 of the present embodiment determines a three-dimensional object to be another vehicle when the three-dimensional object, having traveling speed lying within the traveling speed setting range, has been detected a predetermined number of times or more within a predetermined time. When a three-dimensional object having a traveling speed lying within the predetermined setting range is detected only several times within the predetermined time, it is thought that some image has been errantly detected. If the three-dimensional object is detected as another vehicle VX based on such information, the precision of detection may be reduced. Hence the three-dimensional object assessment unit 34 of the present embodiment determines a three-dimensional object having a traveling speed lying within the predetermined range to be another vehicle VX only when detected the predetermined number of times or more within the predetermined time.

In relation to this processing by the three-dimensional object assessment unit 34, the controller 39 changes the "predetermined number of times a three-dimensional object having traveling speed lying in the predetermined range is detected within the predetermined time," which is a threshold value when assessing a three-dimensional object, to a high value when a rainfall state has been detected by the rainfall state detection unit 41, thereby suppressing assessment of a three-dimensional object as another vehicle VX.

Figure 21C:
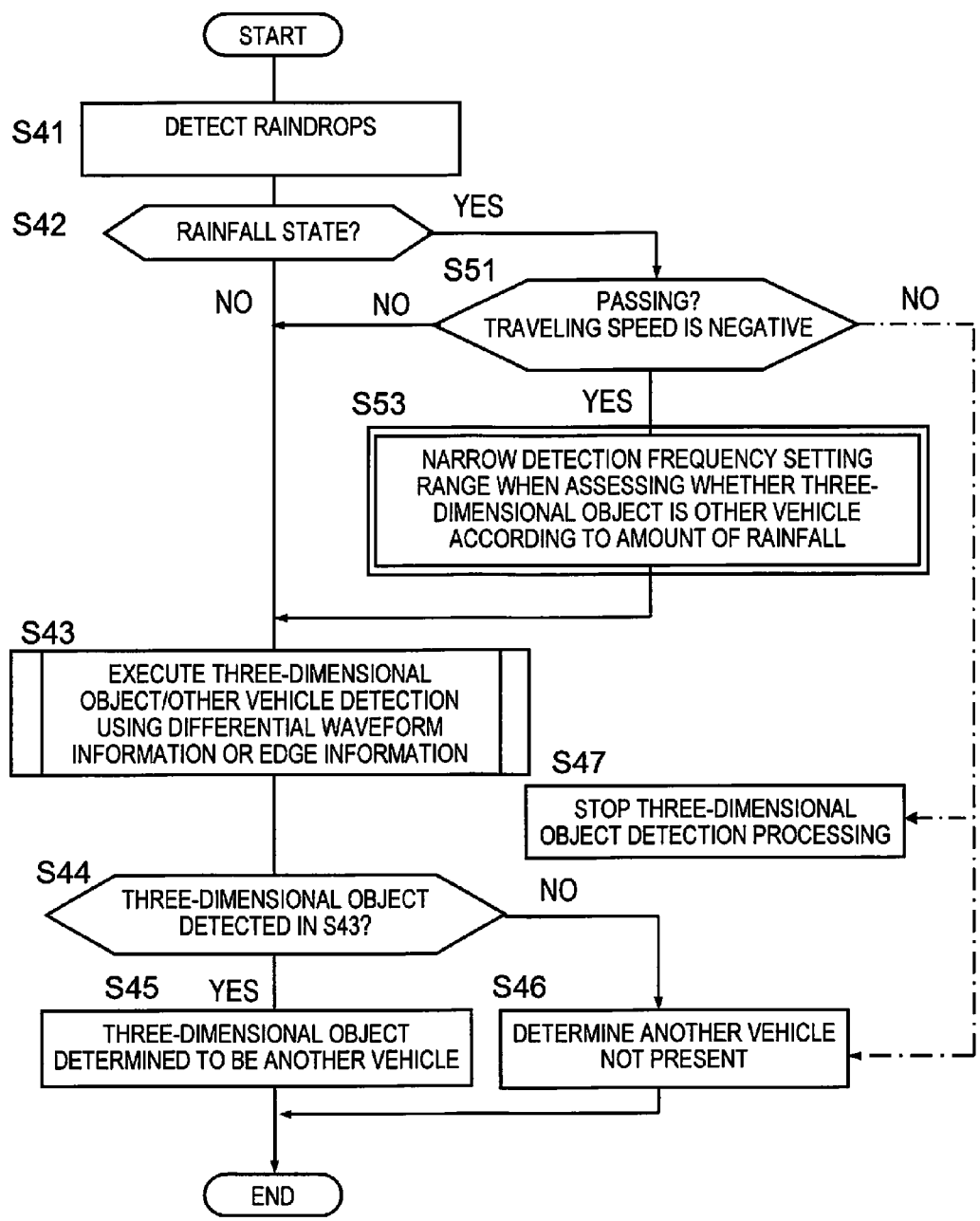
FIG. 21C is a second part of a flowchart illustrating the control procedure for three-dimensional object assessment that corresponds to the result of detection of the state of rainfall.
Figure 21D:
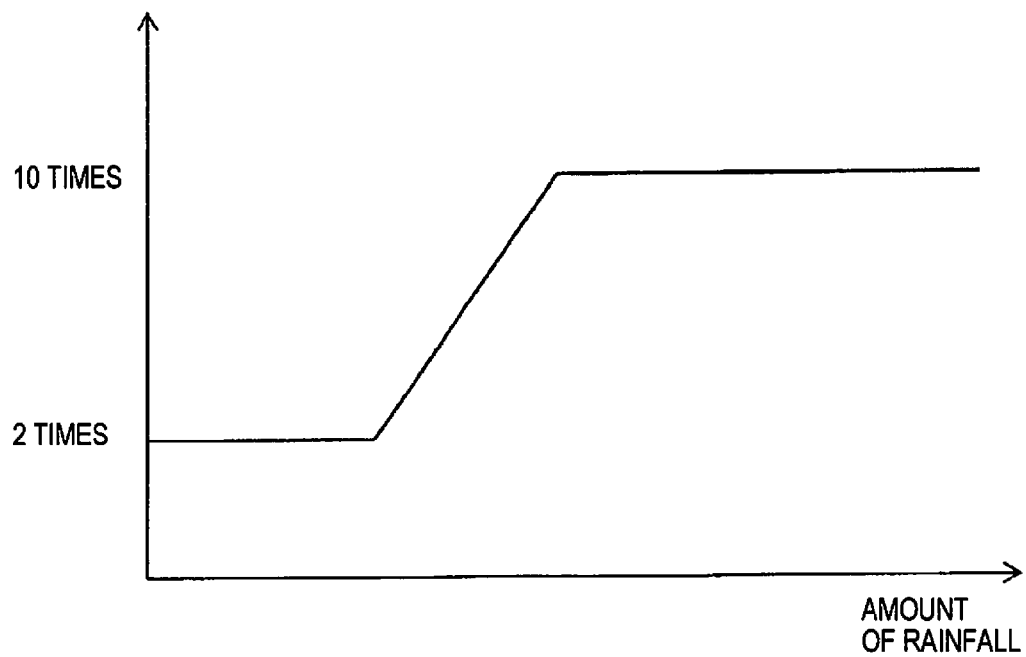
FIG. 21D is a view for describing the method for setting the "number of detections within a predetermined time."

FIG. 21C illustrates the control procedure for processing performed by the controller 39. The processing illustrated in FIG. 21C is in essence common to the processing illustrated in FIG. 21A. When in steps S41 and S42 a rainfall state is detected and in step S51 the traveling speed has a negative value, processing proceeds to step S53. In step S53, the controller 39 changes the "predetermined number of times a three-dimensional object having traveling speed lying in the predetermined range is detected within the predetermined time," which is a threshold value when assessing a three-dimensional object, to a high value. In this case, the controller 39 can change the "predetermined number of times a three-dimensional object having traveling speed lying in the predetermined range is detected within the predetermined time" to a higher value for larger amounts of rainfall. FIG. 21D illustrates an example of the relationship between the "amount of rainfall" and the "predetermined number of times a three-dimensional object having traveling speed lying in the predetermined range is detected within the predetermined time." As illustrated in FIG. 21D, the greater the amount of rainfall, the greater is the predetermined number of times. The processing of step S43 to step S47 is common to the control procedure illustrated in FIG. 21A.

Thus during rainfall when errant detection of the relative speed readily occurs, in addition to narrowing the "predetermined range of traveling speeds" for assessing whether a three-dimensional object is another vehicle VX, the "predetermined number of times" used to assess the frequency with which a three-dimensional object is detected having a traveling speed within the predetermined range is changed to a high value, and thereby the precision of assessing whether the three-dimensional object is another vehicle VX can be enhanced. Of course, only the processing to narrow the "traveling speed setting range," or only the processing to change the "predetermined number of times" to a high value, can be performed independently.

Further, when the rainfall state detection unit 41 has detected a rainfall state, the controller 39 generates a control command for changing the first threshold value α to be higher so that a three-dimensional object is not easily detected, and outputs the control command to the three-dimensional object detection unit 33. When the rainfall state detection unit 41 has detected a rainfall state, the controller 39 generates a control command for lowering the values obtained by counting the number of pixels indicating a predetermined difference in the difference image of the bird's-eye view image and forming a frequency distribution, and outputs the control command to the three-dimensional object detection unit 33. By thus raising the first threshold value α or lowering and outputting the frequency-distributed values, detection of three-dimensional objects is suppressed, and as a result errant detection of another vehicle VX can be prevented.

In this case, the controller 39 of the present embodiment lowers and outputs the frequency-distributed values of differential waveform information, and thereby the detection of three-dimensional objects is suppressed, and consequently errant detection of another vehicle VX can be prevented.

When the rainfall state detection unit 41 has detected a rainfall state, the controller 39 of the present embodiment generates a control command for changing the threshold value A to be high such that a three-dimensional object is not easily detected, and outputs the control command to the three-dimensional object detection unit 37. Further, when the rainfall state detection unit 41 has detected a rainfall state, the controller 39 reduces and outputs the quantity of edge information including detected edge lengths. By thus raising the threshold value θ or reducing the quantity of edge information, detection of three-dimensional objects is suppressed, and consequently errant detection of another vehicle VX can be prevented.

In this case, the controller 39 of the present embodiment reduces and outputs evaluated edge lengths, which are edge lengths of edge information for a portion corresponding to a predetermined area including pixels corresponding to the number of evaluation reversals, and thereby the detection of three-dimensional objects is suppressed, and consequently errant detection of other vehicles VX can be prevented.

When the rainfall state detection unit 41 has detected a rainfall state, the controller 39 may change to a high value the threshold value p relating to the difference in pixel values when generating differential waveform information, in addition to changing the first threshold value α used when assessing a three-dimensional object from differential waveform information. The controller 39 may change to a high value the second threshold value β used when assessing a three-dimensional object from edge information, in addition to changing the threshold value θ used for assessing edge lengths when generating edge information. The first threshold value α is used to assess peaks of the differential waveform DWt in step S7 of FIG. 11. The threshold value θ is a threshold value used to assess values (edge lengths) obtained by normalizing the sum of continuities c of attributes of attention points Pa in step S29 of FIG. 17, and the second threshold value β is a threshold value for evaluating the quantity of (number of) edge lines in step S34 of FIG. 18. Thus by changing threshold values for assessments to higher values, the detection sensitivity is adjusted such that another vehicle VX traveling adjacent to the lane of travel of the host vehicle V is not readily detected, and therefore errant detection of another vehicle VX can be prevented.

When the rainfall state detection unit 41 has detected a rainfall state, the controller 39 of the present embodiment outputs to the three-dimensional object detection unit 33 a control command for lowering the values obtained by counting the number of pixels indicating a predetermined difference in the difference image of the bird's-eye view image and forming a frequency distribution, and outputs the control command to the three-dimensional object detection unit 33. Values obtained by counting the number of pixels indicating a predetermined difference in a difference image of a bird's-eye view image and forming a frequency distribution are values along the vertical axis of the differential waveform DWt generated in step S5 of FIG. 11.

When the rainfall state detection unit 41 has detected a rainfall state, the controller 39 of the present embodiment outputs to the three-dimensional object detection unit 37 a control command to reduce and output detected edge information. Detected edge information is the length of an edge, which is the normalized value of the sum of continuities c of the attributes of attention points Pa in step S29 of FIG. 17, as well as the quantity of edge lines in step S34 of FIG. 18. When the rainfall state detection unit 41 has detected a rainfall state, the controller 39 changes the normalized value of the sum of continuities c of the attributes of attention lines Pa to be lower, or reduces the quantity of edge lines, such that three-dimensional objects are not readily detected. By thus reducing output values, the detection sensitivity can be adjusted such that other vehicles VX are not readily detected, and therefore errant detection of other vehicles VX can be prevented.

Figure 22:
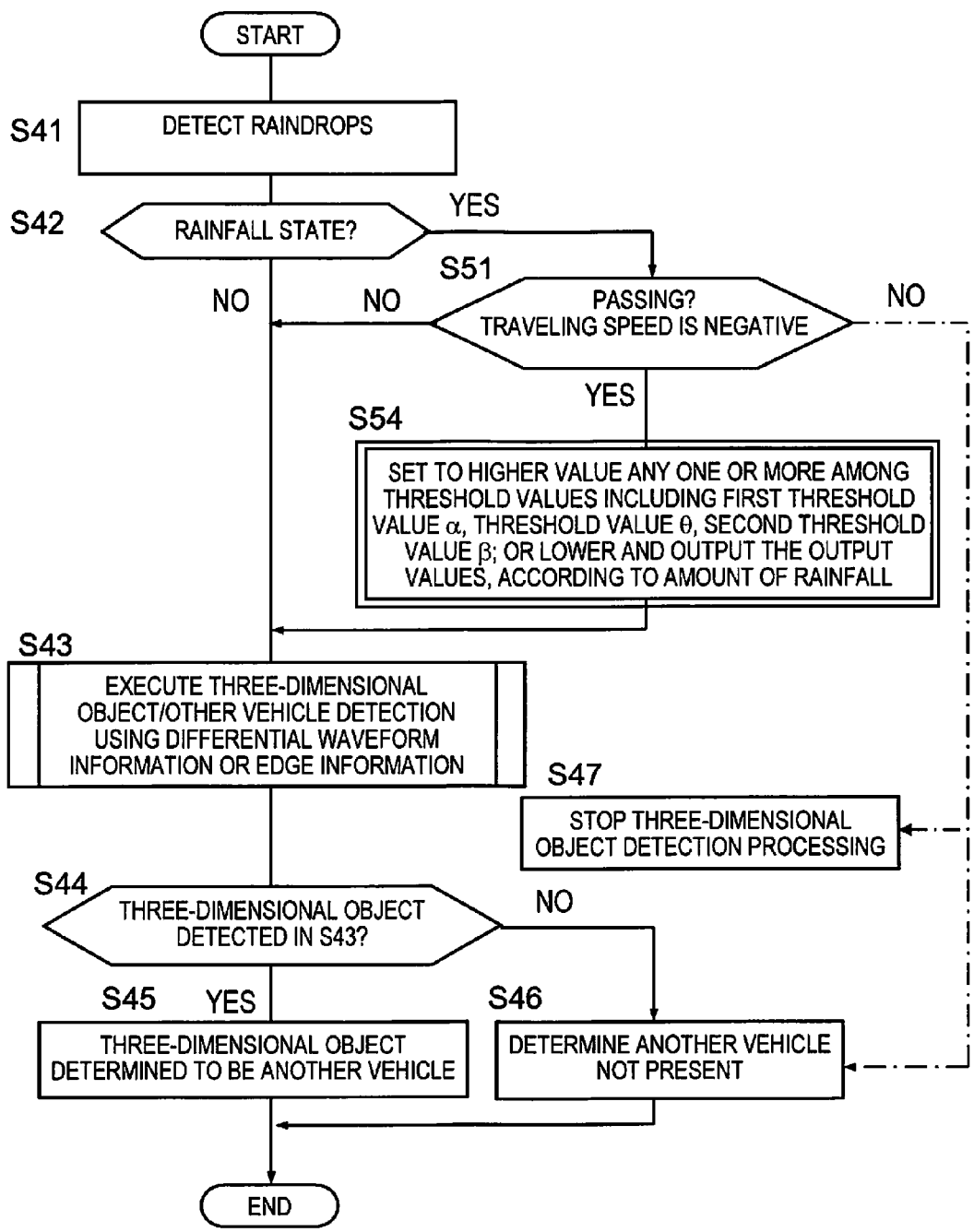
FIG. 22 is a third flowchart illustrating the control procedure for three-dimensional object assessment that corresponds to the result of detection of the state of rainfall.

The control procedure for processing performed by the controller 39 is illustrated in FIG. 22. The processing illustrated in FIG. 22 is in essence common to the processing illustrated in FIG. 21A. When a rainfall state is detected in steps S41 and S42 and the traveling speed has a negative value in step S51, processing proceeds to step S54. In step S54, the controller 39 changes any one or more of the threshold values used in assessing a three-dimensional object, which are the first threshold value α, the threshold value θ, and the second threshold value β, or lowers and outputs each of the output values. The processing of step S43 to step S47 is common to the control procedure illustrated in FIG. 21A.

It is thereby possible to suppress detection of three-dimensional objects during rainfall, and consequently errant detection of other vehicles VX can be prevented.

When the rainfall state detection unit 41 has detected a rainfall state, the controller 39 of the present embodiment suppresses assessment of a three-dimensional object as another vehicle VX in one partial area on the vehicle rearward side among the detection areas A1, A2. In this case, the controller 39 narrows the "traveling speed setting range" that serves as threshold values when assessing a three-dimensional object from an image in processing of the image (captured image or bird's-eye view image) corresponding to the one partial area on the vehicle rearward side among the detection areas A1, A2, and changes to a high value the "predetermined number of times" that is a threshold value for the number of times the three-dimensional object, having traveling speed lying in the setting range, is detected within the predetermined time.

In order to suppress detection of a three-dimensional object by the three-dimensional object detection units 33, 37 or assessment of a three-dimensional object as another vehicle by the three-dimensional object assessment unit 34, the controller 39 changes each of the threshold values used in the various processing to higher values (such that detection is less readily performed), and changes the output values compared with the threshold values to be lower (such that detection is less readily performed).

In order to suppress detection of a three-dimensional object by the three-dimensional object detection units 33, 37 or assessment of a three-dimensional object as another vehicle by the three-dimensional object assessment unit 34, the controller 39 changes the threshold values used in the processing to be higher than the initial values, reference values, or other settings (such that detection is less readily performed), or changes the output values compared with the threshold values to be lower (such that detection is less readily performed). When the controller 39 performs expediting processing, the expediting processing is suppression processing and control of assessment.

Specific details of the processing are as follows.

When the three-dimensional object detection unit 33, which detects three-dimensional objects using differential waveform information, detects a three-dimensional object when the differential waveform information is equal to or greater than the predetermined first threshold value α, when a rainfall state has been detected, the controller 39 generates a control command for changing the first threshold value α to be high such that a three-dimensional object is not readily detected, and outputs the control command to the three-dimensional object detection unit 33.

Similarly, when the three-dimensional object detection unit 33 detects a three-dimensional object with the differential waveform information equal to or greater than the predetermined first threshold value α, when a rainfall state has been detected, the controller 39 generates a control command for changing to lower values and output the values obtained by counting the number of pixels indicating a predetermined difference in the difference image of the bird's-eye view image and forming a frequency distribution, and outputs the control command to the three-dimensional object detection unit 33.

Further, when the three-dimensional object detection unit 33, which detects three-dimensional objects using differential waveform information, extracts a number of pixels indicating pixel values equal to or greater than the threshold value p as the number of pixels indicating the predetermined difference, when a rainfall state has been detected, the controller 39 generates a control command for changing the threshold value p to a higher value such that a three-dimensional object is not readily detected, and outputs the control command to the three-dimensional object detection unit 33.

Similarly, when the three-dimensional object detection unit 33 extracts a number of pixels indicating pixel values equal to or greater than the threshold value p as the number of pixels indicating the predetermined difference, when a rainfall state has been detected, the controller 39 generates a control command for changing to a lower value and output the number of pixels extracted in the difference image along the direction in which the three-dimensional object collapses when viewpoint conversion to the bird's-eye view image is performed, and outputs the control command to the three-dimensional object detection unit 33.

When the three-dimensional object detection unit 37, which detects three-dimensional objects using edge information, extracts edge lines based on pixels indicating a luminance difference equal to or greater than a predetermined threshold value t, when a rainfall state has been detected, the controller 39 generates a control command for changing the predetermined threshold value t to a higher value such that a three-dimensional object is not readily detected, and outputs the control command to the three-dimensional object detection unit 37.

Similarly, when the three-dimensional object detection unit 37, which detects three-dimensional objects using edge information, extracts edge lines based on pixels indicating a luminance difference equal to or greater than a predetermined threshold value t, when a rainfall state has been detected, the controller 39 generates a control command for changing the luminance values of pixels to lower values and output the values, and outputs the control command to the three-dimensional object detection unit 37.

When the three-dimensional object detection unit 37, which detects three-dimensional objects using edge information, detects a three-dimensional object based on edge lines included in edge information having lengths equal to or greater than the threshold value θ, when a rainfall state has been detected, the controller 39 generates a control command for changing the threshold value θ to a higher value such that a three-dimensional object is not readily detected, and outputs the control command to the three-dimensional object detection unit 37.

Similarly, when the three-dimensional object detection unit 37, which detects three-dimensional objects using edge information, detects a three-dimensional object based on edge lines included in edge information having lengths equal to or greater than the threshold value θ, when a rainfall state has been detected, the controller 39 generates a control command to lower values and output the length values of edge lines of the detected edge information, and outputs the control command to the three-dimensional object detection unit 37.

When the three-dimensional object detection unit 37, which detects three-dimensional objects using edge information, detects a three-dimensional object based on assessment of whether the number of edge lines of predetermined length or greater included in the edge information, for example, edge lines having a length equal to or greater than a threshold value θ, is greater than or equal to a second threshold value β, when a rainfall state has been detected, the controller 39 generates a control command for changing the second threshold value β to a higher value such that a three-dimensional object is not readily detected, and outputs the control command to the three-dimensional object detection unit 37.

When the three-dimensional object detection unit 37, which detects three-dimensional objects using edge information, detects a three-dimensional object based on assessment of whether the number of edge lines of predetermined length or greater included in the edge information, for example, edge lines having a length equal to or greater than a threshold value θ, is greater than or equal to a second threshold value β, when a rainfall state has been detected, the controller 39 generates a control command to reduce the number of detected edge lines of length equal to or greater than the predetermined length and output the number, and outputs the control command to the three-dimensional object detection unit 37.

Further, when the three-dimensional object assessment unit 34 determines a three-dimensional object as another vehicle and the traveling speed of the detected three-dimensional object is equal to or greater than the predetermined speed set in advance, when a rainfall state has been detected, the controller 39 generates a control command for changing to a higher value the predetermined speed that is the lower limit when assessing a three-dimensional object as another vehicle such that a three-dimensional object is not readily assessed as another vehicle, and outputs the control command to the three-dimensional object assessment unit 34.

Similarly, when the three-dimensional object assessment unit 34 determines a three-dimensional object as another vehicle and the traveling speed of the detected three-dimensional object is equal to or greater than the predetermined speed set in advance, when a rainfall state has been detected, the controller 39 generates a control command for changing to a lower value the traveling speed of the three-dimensional object compared with the predetermined speed that is the lower limit when assessing a three-dimensional object as another vehicle, and outputs the control command to the three-dimensional object assessment unit 34.

Further, when the three-dimensional object assessment unit 34 determines a three-dimensional object as another vehicle and the traveling speed of the detected three-dimensional object is less than the predetermined speed set in advance, when a rainfall state has been detected, the controller 39 generates a control command for changing to a lower value the predetermined speed that is the upper limit when assessing a three-dimensional object as another vehicle, and outputs the control command to the three-dimensional object assessment unit 34.

Similarly, when the three-dimensional object assessment unit 34 determines a three-dimensional object as another vehicle and the traveling speed of the detected three-dimensional object is less than the predetermined speed set in advance, when a rainfall state has been detected, the controller 39 generates a control command for changing to a higher value the traveling speed of the three-dimensional object compared with the predetermined speed that is the upper limit when assessing a three-dimensional object as another vehicle, and outputs the control command to the three-dimensional object assessment unit 34.

Here "traveling speed" includes the absolute speed of the three-dimensional object, and the speed of the three-dimensional object relative to the host vehicle. The absolute speed of the three-dimensional object may be calculated from the relative speed of the three-dimensional object, and the relative speed of the three-dimensional object may be calculated from the absolute speed of the three-dimensional object.

The first threshold value α is a threshold value for assessing a peak of the differential waveform DWt in step S7 of FIG. 11. The threshold value p is a threshold value for extracting pixels having a predetermined pixel value. The predetermined threshold value t is a threshold value for extracting pixels or edge components having a predetermined luminance difference. The threshold value θ is a threshold value for assessing the normalized value (edge length) of the sum of continuities c of attributes of attention points Pa in step S29 of FIG. 17, and the second threshold value β is a threshold value for evaluating the quantity of (number of) edge lines in step S34 of FIG. 18. Thus by changing to higher values the threshold values used in assessment, the detection sensitivity is adjusted such that another vehicle VX traveling adjacent to the lane of travel of the host vehicle V is not readily detected, and therefore errant detection of another vehicle VX can be prevented.

The controller 39 of the present embodiment outputs to the three-dimensional object detection unit 33 a control command for lowering the values obtained by counting the number of pixels indicating a predetermined difference in the difference image of the bird's-eye view image and forming a frequency distribution. Values obtained by counting the number of pixels indicating a predetermined difference in a difference image of a bird's-eye view image and forming a frequency distribution are values along the vertical axis of the differential waveform DWt generated in step S5 of FIG. 11. The controller 39 of the present embodiment outputs to the three-dimensional object detection unit 37 a control command to reduce and output detected edge information. Detected edge information is the length of an edge, which is the normalized value of the sum of continuities c of the attributes of attention points Pa in step S29 of FIG. 17, as well as the quantity of edge lines in step S34 of FIG. 18. The controller 39 changes the normalized value of the sum of continuities c of the attributes of attention lines Pa to be lower, or reduces the quantity of edge lines, such that in the next processing, a three-dimensional object is not readily detected. By thus reducing output values, the detection sensitivity can be adjusted such that another vehicle VX traveling adjacent to the lane of travel of the host vehicle V is not readily detected, and therefore errant detection of another vehicle VX traveling in an adjacent lane can be prevented.

Further, when the rainfall state detection unit 41 has detected a rainfall state, the controller 39 masks a partial area on the rearward side of the vehicle among the detection areas A1, A2, and thereby suppresses assessment of a three-dimensional object as another vehicle VX. The controller 39 designates position information (image coordinate information) of a portion of the detection areas A1, A2 on the vehicle rearward side, and generates a control command to not perform processing to detect a three-dimensional object in the masked area or to not assess whether a three-dimensional object is another vehicle VX, or a control command to cause output of a result that a three-dimensional object is not detected in the masked area or that a three-dimensional object in the masked area is not another vehicle VX, and transmits the control command to the three-dimensional object detection unit 33 (or three-dimensional object detection unit 37) or to the three-dimensional object assessment unit 34. The control command to cause output of a result that a three-dimensional object is not detected in the masked area or that a three-dimensional object is not another vehicle VX in the masked area includes a command to designate the image data of the masked area and a command to change each of the threshold values or each of the output values, as described above.

Figure 23:
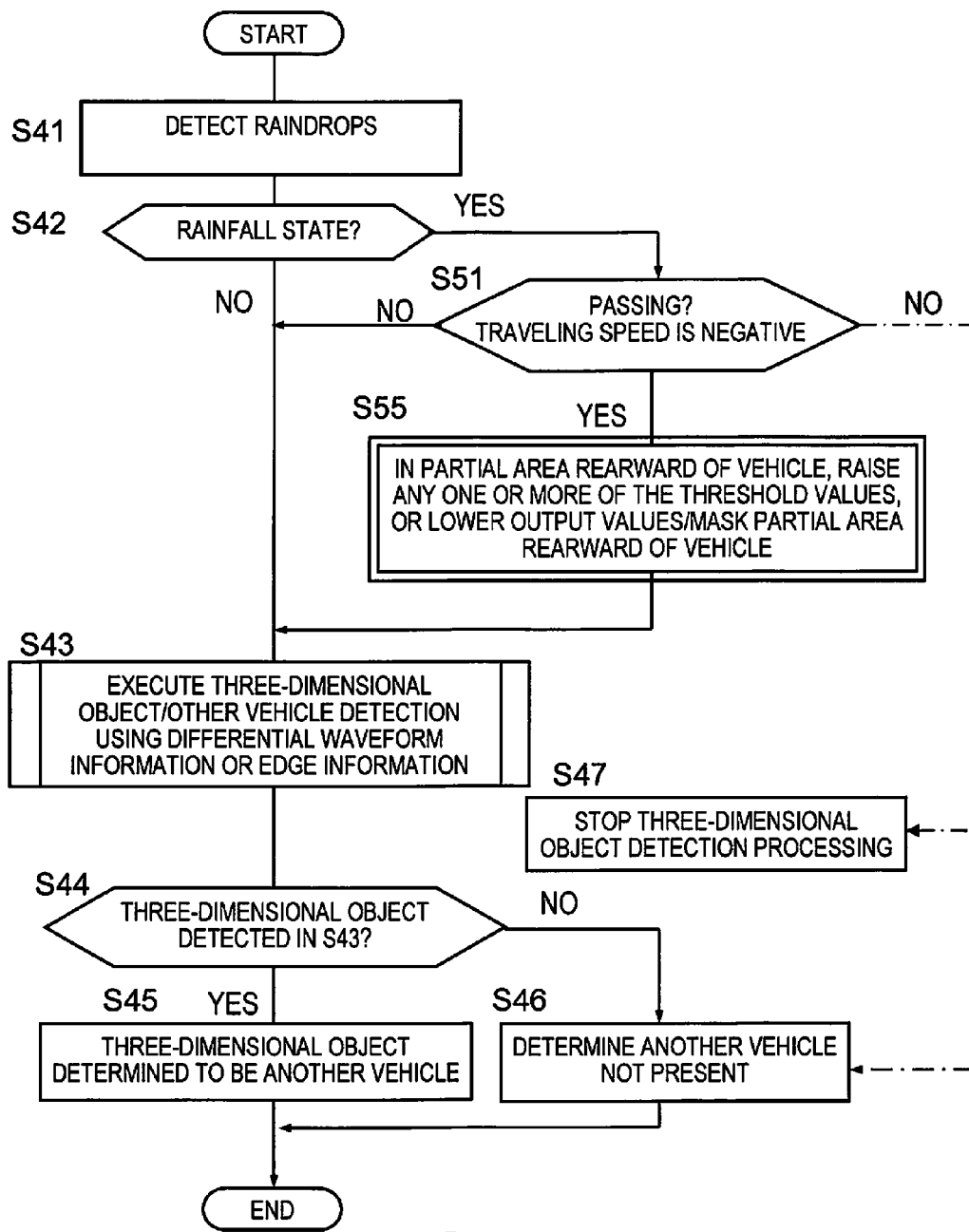
FIG. 23 is a fourth flowchart illustrating the control procedure for three-dimensional object assessment that corresponds to the result of detection of the state of rainfall.
Figure 24:
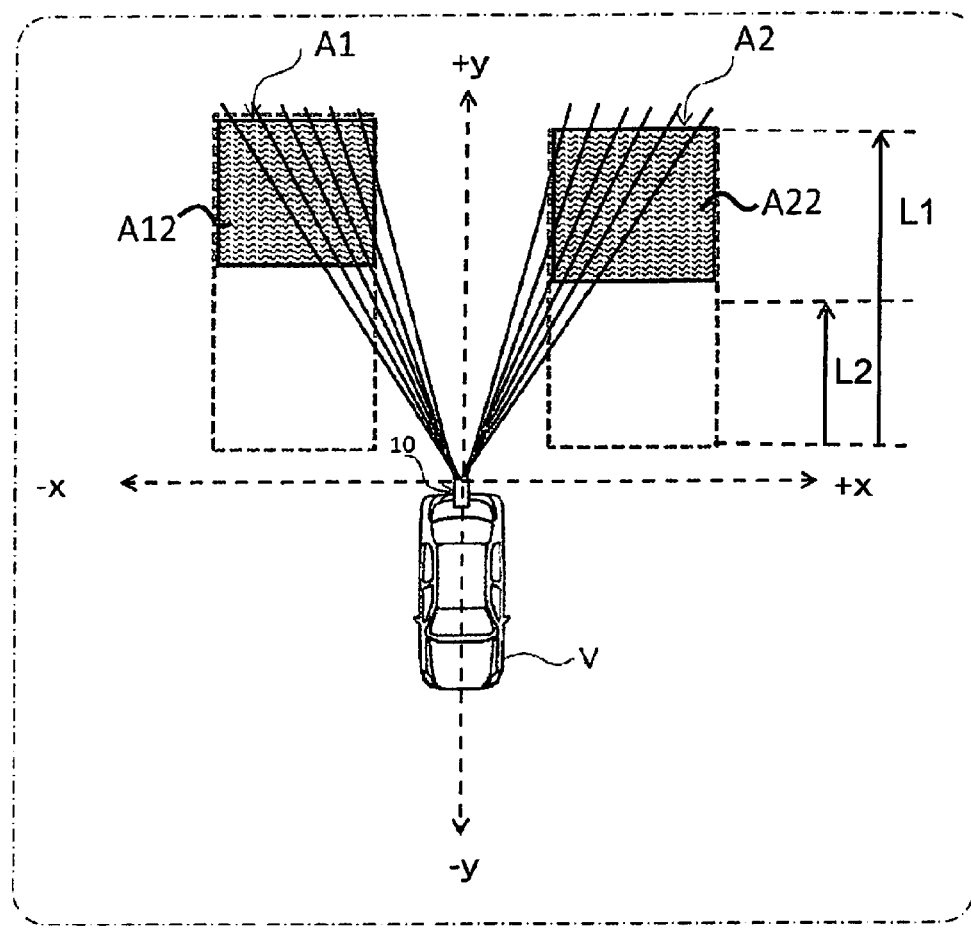
FIG. 24 is a view for describing processing to narrow a detection area.

The control procedure of the processing performed by the controller 39 is illustrated in FIG. 23. The processing illustrated in FIG. 23 is in essence common to the processing illustrated in FIG. 21A. In steps S41 and S42, a rainfall state is detected, and when in step S51 the traveling speed has a negative value, processing proceeds to step S54. In step S55 the controller 39 narrows the "traveling speed setting range" that serves as threshold values when processing the image of a partial area rearward of the vehicle, increases the "predetermined number of times," or raises at least one among the "first threshold value α, threshold value θ, and second threshold value β," or another threshold value. In step S55, the controller 39 may mask a partial area rearward of the vehicle. As illustrated in FIG. 24, of the detection areas A1, A2 illustrated by broken lines, the areas A12, A22 on the opposite side (in the +y direction in the drawing) of the direction of progress (the −y direction in the drawing) of the vehicle are masked. In other words, the detection areas A11, A12 of length L1 along the vehicle rearward direction (the +y direction in the drawing) are shortened to length L2.

During rainfall there is a tendency for the precision of the traveling speed of a three-dimensional object to be reduced in partial areas on the vehicle rearward side of the detection areas A1, A2. In the present embodiment, during rainfall the detection of a three-dimensional object and/or the detection of another vehicle VX from an image corresponding to a partial area on the vehicle rearward side is suppressed, and thereby the precision of detection of another vehicle VX can be maintained.

Further, the controller 39 adjusts the above-described threshold values based on detection results of the foreign matter detection unit 38 to further suppress detection of another vehicle VX. In the above-described processing, when the raindrop sensor 50 or the like mounted on the host vehicle V has detected raindrops, it is surmised that there is a high possibility of errant detection of another vehicle VX, and detection of another vehicle VX is suppressed. In the present embodiment, when the foreign matter detection unit 38 has actually detected foreign matter adhering to the lens 11, each of the above-described threshold values is adjusted, and detection of another vehicle VX is further suppressed.

Below, the foreign matter detection unit 38 is described. Based on differential waveform information or edge information, the foreign matter detection unit 38 detects whether foreign matter is adhering to the lens 11 of the camera 10 that captures images of the detection areas A1, A2. When the foreign matter detection unit 38 has detected foreign matter adhering to the lens, the controller 39 further suppresses assessment of a detected three-dimensional object as another vehicle VX. Specifically, the controller 39 outputs a control command to control each of the parts (including the controller 39) constituting the computer 30 such that assessment of an image corresponding to detected foreign matter as another vehicle VX present in the detection areas A1, A2 is suppressed. The controller 39 adjusts the threshold values and output values used in detection and assessment, or enlarges the masked area of the detection areas A1, A2, such that a result of detecting the presence of a three-dimensional object by the three-dimensional object detection unit 33 (or the three-dimensional object detection unit 37), or a result of finally assessing that a three-dimensional object is another vehicle VX by the three-dimensional object assessment unit 34, is suppressed. Further, the controller 39 generates a control command to stop three-dimensional object detection processing or assessment of whether a three-dimensional object is another vehicle VX, or a control command to cause output of a result that a three-dimensional object is not detected or that a three-dimensional object is not another vehicle VX, and transmits the control command to the three-dimensional object detection unit 33 (or three-dimensional object detection unit 37) or to the three-dimensional object assessment unit 34.

The three-dimensional object detection unit 33 (or three-dimensional object detection unit 37) of the present embodiment adjusts the threshold values or output values, performs detection of three-dimensional objects using strict criteria, executes processing to output a detection result indicating that a three-dimensional object was not detected, or stops the three-dimensional object detection processing itself, according to control commands from the controller 39. Similarly, the three-dimensional object assessment unit 38 adjusts threshold values or output values, determines whether a detected three-dimensional object is another vehicle VX using strict criteria, outputs an assessment that a three-dimensional object is not another vehicle VX, or stops the three-dimensional object assessment processing itself, according to control commands from the controller 39.

Figure 25:
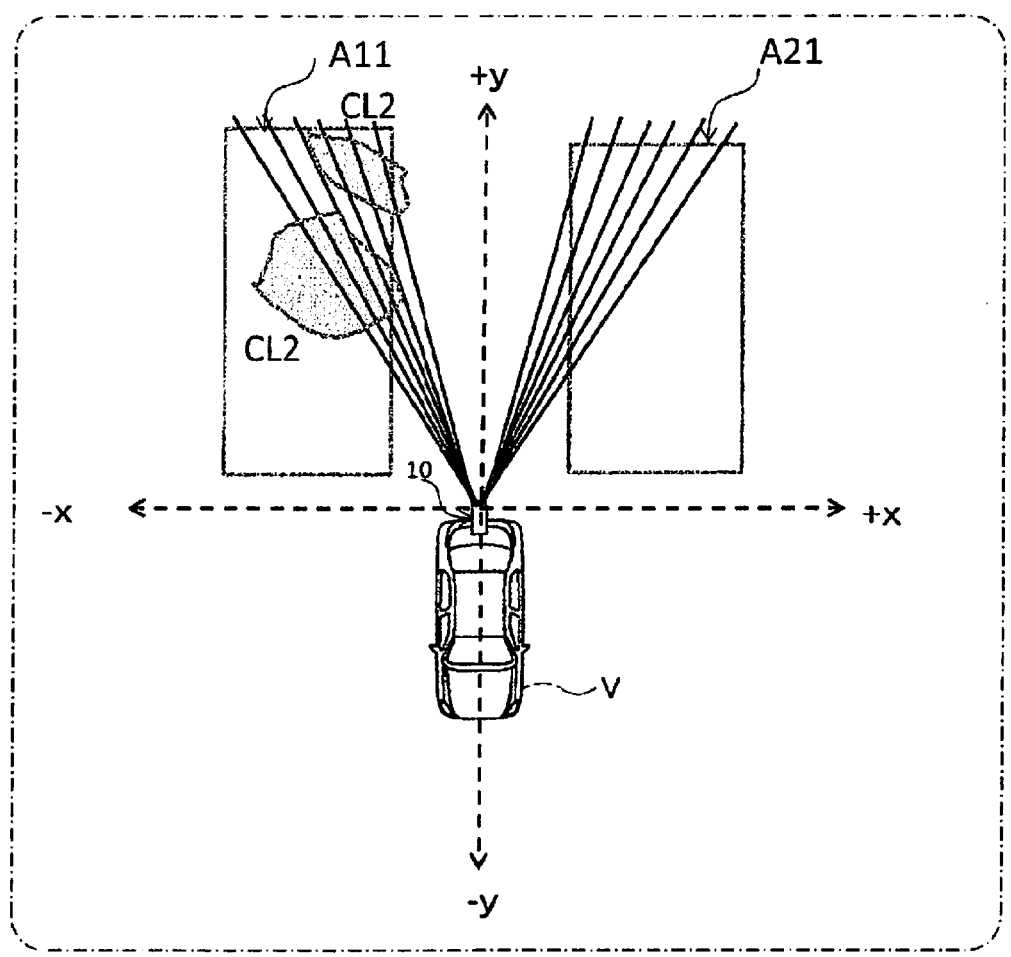
FIG. 25 is a view illustrating an example of the state of a detection area when dirt adheres to the lens.

Below, detection processing by the foreign matter detection unit 38 is described. The foreign matter detection unit 38 acquires image information captured rearward from the host vehicle V by the camera 10. FIG. 20, described above, is also an example of acquired image information K. When image conversion processing is performed using image information captured through the lens 11 to which foreign matter adheres, as illustrated in FIG. 20, an image CL2 that corresponds to the image CL of the foreign matter appears within the detection area A11, as illustrated in FIG. 25. When differential waveform information or edge information is calculated using the above-described methods based on such a bird's-eye view image and three-dimensional object detection processing is performed, there are cases in which the image CL2 is errantly recognized as the image of another vehicle VX.

Figure 26:
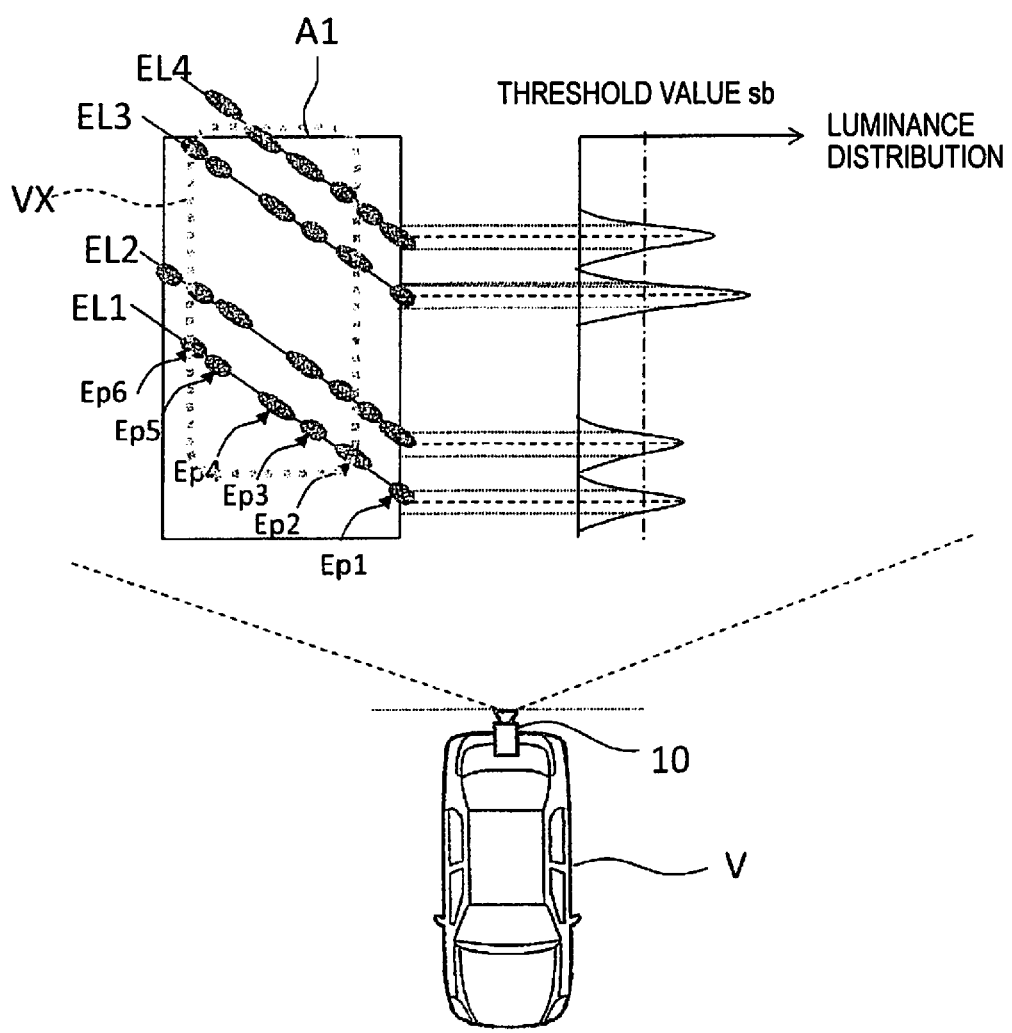
FIG. 26 is a view for describing an example of edge information when a vehicle is present in the detection area.
Figure 27:
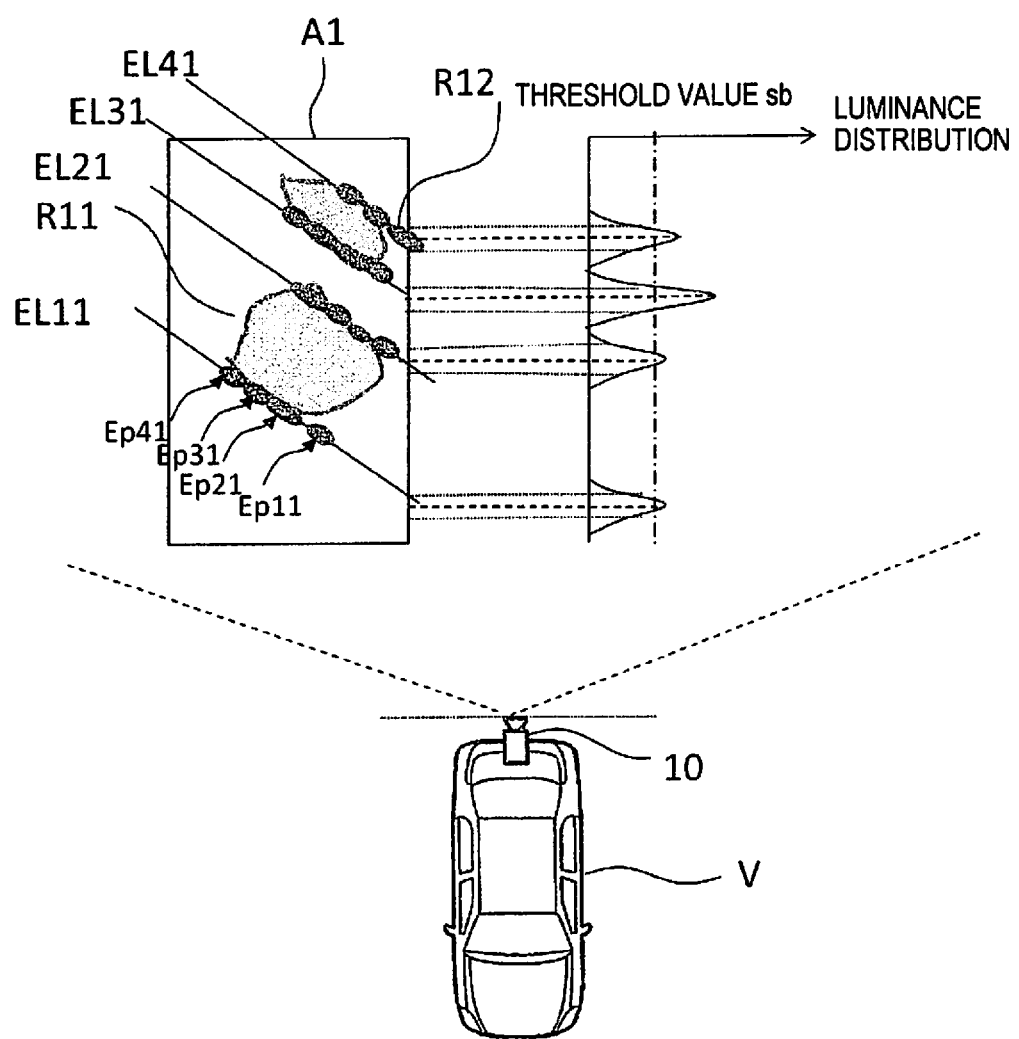
FIG. 27 is a view for describing an example of edge information when dirt adheres to the lens.

Specifically, as illustrated in FIG. 26, when foreign matter is not adhering to the lens 11, when another vehicle VX is present in the detection area A1, pixels for which differential waveform information (distribution) is equal to or greater than a predetermined threshold value, or edge quantities for which the luminance difference is equal to or greater than a predetermined value, are distributed in amounts equal to or greater than the threshold value sb along the directions EL1 to EL4 of collapsing of the three-dimensional object when viewpoint conversion to the bird's-eye view image is performed, the waveform distribution and the luminance difference corresponding to a characteristic of the other vehicle VX, e.g., the boundary between a tire and wheel. However, as illustrated in FIG. 27, when experiments are used to evaluate a case in which foreign matter CL is adhering to the lens 11, even when another vehicle VX or some other three-dimensional object is not present in the detection area A1, there is a tendency for a frequency distribution of differential waveform information or edge quantity having luminance difference equal to or greater than the predetermined value, exceeding the threshold value sb, to be detected along the directions EL1 to EL4 of collapsing of the three-dimensional object when performing viewpoint conversion of the bird's-eye view image. Pixel information corresponding to the image arising from foreign matter CL adhering to the lens 11 in this way induces errant detection of another vehicle VX or other three-dimensional object.

The foreign matter detection unit 38 of the present embodiment extracts a first maximum value from differential waveform information generated at one or a plurality of first timings by the three-dimensional object detection unit 33, and moreover acquires a reference value based on the first maximum value and extracts a second maximum value, corresponding to the position or time of the first maximum value in the bird's-eye view image, from the differential waveform information newly generated at one or a plurality of second timings later than the first timing, and moreover acquires a value for evaluation based on the second maximum value. The foreign matter detection unit 38 then detects whether foreign matter is adhering to the lens based on the change over time in the difference between the value for evaluation and the reference value.

The foreign matter detection unit 38 of the present embodiment extracts the first maximum value included in the differential waveform information generated at the first timing, acquires an x value (position or time) and a y value (count value) specifying the first maximum value, and obtains the reference value based on the first maximum value (y value). The reference value can be made a value equal to or less than the first maximum value (y value), or a value that is a predetermined fraction of the first maximum value (y value), or a value obtained by subtracting a predetermined value from the first maximum value (y value). A maximum value included in the differential waveform information generated at the second timing, the maximum value corresponding to the x value (position or time) of the first maximum value or having a difference in x value within a predetermined value, is extracted as the second maximum value. The value for evaluation is obtained based on the second maximum value (y value). The value for evaluation can be a value equal to or less than the second maximum value (y value), or a value that is a predetermined fraction of the second maximum value (y value), or a value obtained by subtracting a predetermined value from the second maximum value (y value). This method can be used in common with the method for deriving a reference value from a first maximum value.

The foreign matter detection unit 38 acquires over time the difference between the value for evaluation and the reference value, and calculates the change over time in the difference acquired at different timings. The foreign matter detection unit 38 of the present embodiment detects whether foreign matter is adhering to the lens based on the amount of change over time between the value for evaluation, corresponding to a position or time, and the reference value. As the change over time accompanying the passage of time, the foreign matter detection unit 38 determines the extent of the shift (variation) between the value for evaluation and the reference value. If the amount of change between the value for evaluation and the reference value is small even as time passes, it can be assessed that an object detected at the first timing and an object detected at the second timing are the same object, that is, an object (foreign matter) adhering to the lens 11.

When the foreign matter detection unit 38, in order to evaluate the change in the value for evaluation and the reference value accompanying the passage of time, determines that the extent of the change over time in the difference between the value for evaluation and the reference value is within a predetermined assessment range, the foreign matter detection unit 38 determines that an image including pixels corresponding to the value for evaluation is an image arising from foreign matter adhering to the lens, and detects that foreign matter is adhering to the lens 11. Specifically, when the state in which the difference between the value for evaluation and the reference value is within a predetermined value continues for a predetermined time, it is detected that foreign matter is adhering to the lens 11, and when the difference between the value for evaluation and the reference value exceeds a predetermined value, or when the state in which the difference between the two is within the predetermined value does not continue for the predetermined time, it is detected that foreign matter is not adhering to the lens 11.

The foreign matter detection unit 38 extracts a characteristic of the differential waveform information generated at one or a plurality of first timings by the three-dimensional object detection unit 33. Hence the three-dimensional object detection unit 33 performs signal processing using at least a band-pass filter on the generated differential waveform information. The band-pass filter blocks passage or attenuates signals in a designated frequency band, and allows passage of signals in a desired frequency band. The band-pass filter performs processing along a positional direction, for example, a receding direction from the camera 10 along the rearward direction of the host vehicle V (+y direction in FIG. 23), the time direction, or a space direction.

In the present embodiment, a low-pass filter (high-cut filter) that blocks or attenuates high-frequency components is used as the band-pass filter. By performing signal processing of differential waveform information using a low-pass filter, the differential waveform information can be subjected to smoothing, averaging, or blurring. When signal processing using a low-pass filter is performed, small maximum values that can be assessed to be noise are removed, maximum values indicating comparatively large changes can be made manifest, and characteristics of acquired image information can be extracted, and thereby the maximum values in differential waveform information or edge information arising from the presence of foreign matter adhering to the lens 11 can be made manifest, and characteristics of image information corresponding to foreign matter can be extracted.

Further, the foreign matter detection unit 38 can use two or more band-pass filters which block or attenuate two or more different frequencies. For example, the foreign matter detection unit 38 can use a low-pass filter having a relatively low pass frequency (for example, 0.3 Hz) and a low-pass filter having a relatively high pass frequency (for example, 1 Hz) to perform signal processing, and can compare values with the same positions, times, space, or other horizontal-axis positions and select the lower value (select-low processing). Thus while extracting maximum values that are characteristics of other three-dimensional objects such as other vehicles VX or the like, high-frequency components occurring due to noise or the light environment are blocked or attenuated, and therefore suppression of detection, occurring despite the presence of another vehicle VX to be detected, can be prevented, while suppressing errant detection due to the light environment.

The foreign matter detection unit 38 of the present embodiment executes signal processing using a change rate limiter, in addition to the above-described signal processing using a band-pass filter. By performing signal processing using a change rate limiter, the differential waveform information can be further smoothed, small maximum values that can be assessed to be noise can be removed, and characteristics of image information corresponding to maximum values indicating comparatively large changes can be extracted, and thereby characteristics of image information arising from the presence of foreign matter adhering to the lens 11 can be extracted.

A "reference value" is obtained based on "maximum values of reference waveform information" obtained by performing signal processing using a band-pass filter. A "predetermined assessment range" for assessing foreign matter based on the obtained "reference value" is defined. For example, taking the "reference value" as the center value, the "predetermined assessment range" is defined based on the value obtained by adding a margin value to the reference value, and a value obtained by subtracting the margin value from the reference value.

The foreign matter detection unit 38 of the present embodiment acquires a "value for evaluation" based on maximum values of the differential waveform information generated newly at one or a plurality of second timings later than the first timing, and increments the number of times the difference between the "value for evaluation" and the "reference value" common to a position on the bird's-eye view image is within the "predetermined assessment range." The incrementing can be performed within a predetermined evaluation time, which is defined in advance. When the incremented number becomes equal to or greater than a predetermined value, the foreign matter detection unit 38 determines that the image including pixels that correspond to the values of evaluation derived from the incremented results is due to foreign matter adhering to the lens 11.

The above-described processing of the foreign matter detection unit 38 can be performed based on edge information. The foreign matter detection unit 38 extracts a first maximum value from edge information including information of edge lines generated by the three-dimensional object detection unit 37 at one or a plurality of first timings, and moreover acquires a reference edge length based on the first maximum value. The edge line information includes information (including the number of pixels) concerning the lengths of edges having a predetermined continuity, and indicating luminance differences equal to or greater than a predetermined threshold value. The foreign matter detection unit 38 extracts a second maximum value corresponding to the first maximum value in the bird's-eye view image from edge information generated newly at one or a plurality of second timings later than the first timing, and moreover acquires the evaluation edge length based on the second maximum value. Based on the change over time in the difference between the evaluation edge length and the reference edge length, whether foreign matter is adhering to the lens is detected. The significance of "change over" corresponds to the significance of "change over" in processing based on differential waveform information.

Specifically, the foreign matter detection unit 38 performs signal processing of edge information including information of edge lines generated at a first timing, using at least a band-pass filter, and after the signal processing, acquires a "reference edge length" based on the "maximum value of reference edge information." Then, based on the maximum value of edge information generated newly at one or a plurality of second timings later than the first timing, a "reference edge length" is acquired, and based on the number of times it is assessed that the difference between the evaluation edge length and the reference edge length common to a position on the bird's-eye view image is within the "predetermined assessment range," the image containing pixels corresponding to the evaluation edge length is assessed to be due to foreign matter adhering to the lens 11. This assessment can be performed within a predetermined evaluation time, which is defined in advance. The fact that a low-pass filter can be used as the band-pass filter and the action and effects thereof, and the fact that the blocking/attenuation frequency band of the band-pass filter can be changed according to the foreign matter detection state and the action and effects thereof, are common to the description thereof, which is here invoked. The "reference edge information" in foreign matter detection processing based on edge information corresponds to the above-described "reference differential waveform information," the "reference edge length" corresponds to the above-described "reference value," the "evaluation edge length" corresponds to the above-described "value for evaluation," and the "predetermined assessment range" for evaluating the "evaluation edge length" corresponds to the "predetermined assessment range" for evaluating the "value for evaluation" in the above-described processing using reference waveform information. In order to avoid duplicate descriptions, descriptions in the present specification should be invoked and inferred to as appropriate based on the above correspondence relations.

The other vehicle VX and the like which are the original objects for detection move independently of the present device 1, and therefore the value (magnitude) and position (position in the detection areas A1, A2) of the maximum value of the differential waveform information or edge information that correspond to characteristics of the other vehicle VX change from moment to moment. However, foreign matter adhering to the lens 11 moves together with the present device 1, and therefore compared with a case in which another vehicle VX is present in the detection areas A1, A2, the change over time in the value (magnitude) and position (position in the detection areas A1, A2) of the maximum value of the differential waveform information or edge information, corresponding to characteristics of the foreign matter, tends to be small.

Considering characteristics of the foreign matter CL adhering to the lens 11, when a "value for evaluation"/"evaluation edge length" in which the difference with the "reference value"/"reference edge length" is accommodated within the assessment range is detected the predetermined number of times or more at the same position as the maximum value of the differential waveform information or edge information generated at the first timing (the same position in the detection areas A1, A2), or when detection occurs with predetermined frequency or greater within a predetermined evaluation time, the maximum value of the differential waveform information or edge information at a second timing can be assessed not to be a maximum value corresponding to a characteristic of a moving three-dimensional object. In other words, the maximum value of differential waveform information or edge information at a second timing does not have a clear outline (edge) such as in a three-dimensional object, and can be assessed to be foreign matter adhering to the lens 11 which moves together with the present device 1. Hence in the above, information (differential waveform information, edge information) detected as foreign matter can be assessed not to be information (differential waveform information, edge information) indicating the image of another vehicle VX traveling in a lane adjacent to the host vehicle V.

The three-dimensional object detection device 1 of the present embodiment extracts characteristics distinctive of foreign matter adhering to the lens 11 from image information actually captured through the lens 11, and based on the extracted characteristics, determines that foreign matter adheres to the lens 11, and therefore the state of the lens 11 can be accurately assessed. As a result, the errant detection of foreign matter adhering to the lens 11 as another vehicle VX can be suppressed, and therefore other vehicles VX can be detected accurately.

Further, when detecting foreign matter adhering to the lens 11 using differential waveform information in the present embodiment, the maximum value of values obtained by counting the number of pixels indicating a predetermined difference in a difference image and forming the frequency distribution is used, but in place of this value, a plurality of pixel groups within which the difference with the pixel values of adjacent pixels is less than a predetermined value among pixels constituting the maximum value can be extracted, and the maximum value of the number of reversal points among the pixel groups can be used. A pixel group the pixel values of adjacent pixels of which are less than a predetermined value is a portion that is bright (or dark) according to a characteristic point (difference, edge, or the like) of an object for detection, and between these pixel groups are dark (or bright) portions which reverse from bright to dark (or from dark to bright). The number of reversals of pixel groups having pixel values different by a predetermined value or greater corresponds with characteristics of the object for detection, and similar processing can be performed, with similar precision, as when using the results of counting the number of pixels indicating a predetermined difference.

Specifically, when detecting foreign matter based on difference image information, the three-dimensional object detection unit 33 aligns, in a bird's-eye view, the positions of bird's-eye view images at different points in time, and extracts a plurality of pixel groups within which the difference with the pixel values of adjacent pixels is less than a predetermined value among pixels indicating a predetermined difference in the difference image of the aligned bird's-eye view images, along the direction of collapsing of the three-dimensional object when viewpoint conversion to the bird's-eye view image is performed. When pluralities of pixels with common pixel values are grouped, there are pixels having less than a predetermined value between the pixel groups. That is, there are pixels having low pixel values between one pixel group and another pixel group, and here there are bright/dark reversals. Intervals between pixel groups are taken to be reversal points, and by counting the number thereof and forming a frequency distribution, "reversal waveform information" is generated. This "reversal waveform information" corresponds to the above-described "differential waveform information" in the foreign matter detection processing of the present embodiment.

The foreign matter detection unit 38 of the present embodiment acquires from the three-dimensional object detection unit 33 reversal waveform information, obtained by aligning the positions of bird's-eye view images at different points in time in a bird's-eye view, and in the difference image of the aligned bird's-eye view image, extracting a plurality of pixel groups in which the difference with the pixel values of adjacent pixels is less than a predetermined value among pixels indicating a predetermined difference in the difference image along the direction in which the three-dimensional object collapses when viewpoint conversion is performed, counting the reversal points between pixel groups, and forming a frequency distribution. This reversal waveform information may also be generated by the foreign matter detection unit 38 based on information acquired from the three-dimensional object detection unit 33.

The foreign matter detection unit 38 extracts a first maximum value from reversal waveform information generated at one or a plurality of first timings, and moreover acquires a reference number of reversals based on the first maximum value, and extracts a second maximum value corresponding to the first maximum value in the bird's-eye view image from reversal waveform information newly generated at the one or plurality of second timings later than the first timing. Then, based on the second maximum value, the evaluation number of reversals is acquired, and based on the change over time in the difference between the evaluation number of reversals and the reference number of reversals, whether foreign matter is adhering to the lens 11 is detected.

The foreign matter detection unit 38 extracts the first maximum value included in the reversal waveform information generated at the first timing, acquires the x value (position or time) and y value (number of reversals) specifying the first maximum value, and based on the first maximum value (y value) obtains a reference value. The reference number of reversals can be made a value equal to or less than the first maximum value (y value), a value that is a predetermined fraction of the first maximum value (y value), or a value obtained by subtracting a predetermined value from the first maximum value (y value). Then, the second maximum value is extracted as the maximum value included in the reversal waveform information generated at the second timing, the maximum value corresponding to the x value (position or time) of the first maximum value or having the difference in x value within a predetermined value. Based on the second maximum value (y value), the evaluation number of reversals is obtained. The evaluation number of reversals can be made a value equal to or less than the second maximum value (y value), a value that is a predetermined fraction of the second maximum value (y value), or a value obtained by subtracting a predetermined value from the second maximum value (y value). This method can be used in common with the method for deriving a reference number of reversals from a first maximum value.

The foreign matter detection unit 38 acquires, over time, the difference between the evaluation number of reversals and the reference number of reversals, and calculates the change over time in the difference acquired at different timings. The foreign matter detection unit 38 of the present embodiment detects whether foreign matter is adhering to the lens based on the amount of change over time in the evaluation number of reversals and the reference number of reversals that correspond in position or time. The foreign matter detection unit 38 determines the extent of the shift (variation) between the value for evaluation and the reference number of reversals as the change over time accompanying the passage of time. If the amount of change in the evaluation number of reversals and the reference number of reversals is small even as time passes, it can be assessed that an object detected at the first timing and an object detected at the second timing are the same object, that is, an object (foreign matter) adhering to the lens 11.

When, in order to evaluate the change in the evaluation number of reversals and the reference number of reversals accompanying the passage of time, the foreign matter detection unit 38 has assessed that the extent of the change over time in the difference between the evaluation number of reversals and the reference number of reversals is within the predetermined assessment range, the foreign matter detection unit 38 determines that the image including pixels corresponding to the evaluation number of reversals is an image arising from foreign matter adhering to the lens, and detects that foreign matter is adhering to the lens 11. Specifically, when a state in which the difference between the evaluation number of reversals and the reference number of reversals is within a predetermined value has continued for a predetermined time, the adhesion of foreign matter to the lens 11 is detected, and when the difference between the evaluation number of reversals and the reference number of reversals exceeds the predetermined value, or when the state in which the difference between the two is within the predetermined value does not continue for the predetermined time, non-adhesion of foreign matter to the lens 11 is detected.

Specifically, the foreign matter detection unit 38 performs signal processing using at least a band-pass filter with the "reversal waveform information" at the first timing, acquired from the three-dimensional object detection unit 33, and obtains a "reference number of reversals" based on the maximum value of the "reference reversal waveform information"

resulting from the signal processing. Further, an "evaluation number of reversals" is acquired based on the "maximum value of the reversal waveform information" generated newly at one or a plurality of second timings later than the first timing. Then, based on the number of times that the difference between the "evaluation number of reversals" and the "reference number of reversals" having a position on the bird's-eye view in common is within the "predetermined assessment range," it is assessed that an image including pixels corresponding to the "evaluation number of reversals" generated at the second timing is due to foreign matter adhering to the lens 11. Processing to detect foreign matter adhering to the lens 11 using reversal waveform information exhibits actions and effects similar to the above-described processing to detect foreign matter adhering to the lens 11 using differential waveform information, and a similar modified mode can be applied. The "reversal waveform information" in the present processing example corresponds to the above-described "differential waveform information," the "reference number of reversals" corresponds to the above-described "reference value," the "evaluation number of reversals" corresponds to the above-described "value for evaluation," and the "predetermined assessment range" corresponds to the "predetermined assessment range" in the above-described processing using reference waveform information. In order to avoid duplicate descriptions, descriptions in the present specification should be invoked and inferred to as appropriate based on the above correspondence relations.

Moreover, even when edge information is used, processing similar to the above-described processing can be performed. In this case, the three-dimensional object detection unit 33 extracts a plurality of pixel groups in which the luminance difference of adjacent pixels is less than a predetermined value from among edge components having continuity that are pixels of image areas that are adjacent along the direction of collapsing of a three-dimensional object when viewpoint conversion to a bird's-eye view image is performed, and that have a luminance difference greater than or equal to a predetermined value t. When pluralities of pixels having common pixel values are grouped, there are pixels between the grouped pixel groups the luminance difference of which is less than a predetermined value. In other words, there are pixels having low luminance between one pixel group and another pixel group, and here there are bright/dark reversals. Intervals between pixel groups are taken to be reversal points, and by counting the number thereof and forming a frequency distribution, "reversal edge information" is generated. This "reversal edge information" corresponds to the above-described "reversal waveform information" in the foreign matter detection processing of the present embodiment.

The foreign matter detection unit 38 of the present embodiment performs signal processing, using at least a band-pass filter, of "reversal edge information" at a first timing generated by the three-dimensional object detection unit 33, and based on the maximum value of the "reference reversal edge information" resulting from the signal processing, acquires a "reference number of reversals." Then, based on the "maximum value of reversal edge information" generated newly at one or a plurality of second timings later than the first timing, the "evaluation number of reversals" is acquired, and based on the number of assessments that the difference between the "evaluation number of reversals" and the "reference number of reversals" having a position on the bird's-eye view in common is within the "predetermined assessment range," it is assessed that an image including pixels corresponding to the "evaluation number of reversals" generated at the second timing is due to foreign matter adhering to the lens 11. Processing to detect foreign matter adhering to the lens 11 using reversal edge information exhibits actions and effects similar to the above-described processing to detect foreign matter adhering to the lens 11 using reversal waveform information, and a similar modified mode can be applied. The "reversal edge information" obtained from "edge information" in the present processing example corresponds to the above-described "reversal waveform information" obtained from "differential waveform information," the "reference number of reversals" in the "reference reversal edge information" corresponds to the "reference number of reversals" in the above-described "reference reversal waveform information," the "evaluation number of reversals" in the "reversal edge information" corresponds to the "evaluation number of reversals" in the above-described "reversal waveform information," and the "predetermined assessment range" for evaluating the "evaluation number of reversals" in the "reversal edge information" corresponds to the "predetermined assessment range". In order to avoid duplicate descriptions, descriptions in the present specification should be invoked and inferred to as appropriate based on the above correspondence relations.

Based on the number of times it is assessed that a "value for evaluation" is equal to or greater than a predetermined fraction of a threshold value $\alpha$ set for assessing other vehicles VX, the foreign matter detection unit 38 determines that an image including pixels corresponding to values for evaluation of the differential waveform information generated at the second timing is due to foreign matter adhering to the lens 11. Even when the "value for evaluation" cannot be assessed to be within the assessment range, the possibility that an object corresponding to extremely low pixel values is foreign matter is low. When a "value for evaluation" is detected that is equal to or greater than the predetermined fraction of the first threshold value $\alpha$, set to assess another vehicle VX, there is the possibility that foreign matter has been errantly detected to be another vehicle VX. Hence in the present embodiment, when the "value for evaluation" is equal to or greater than the predetermined fraction of the first threshold value $\alpha$, foreign matter detection processing is expedited so as to result in assessment as foreign matter, and thereby the probability of errantly assessing foreign matter as another vehicle VX can be lowered.

Similarly, based on the number of times the "evaluation edge length" is assessed to be a value equal to or greater than a predetermined fraction of a threshold value $\theta$, set for assessing other vehicles VX, the foreign matter detection unit 38 determines that an image including pixels corresponding to evaluation edge lengths of edge information generated at the second timing is due to foreign matter adhering to the lens 11. Even when the "evaluation edge length" cannot be assessed to be within the assessment range, the possibility that an object corresponding to extremely short evaluation edge lengths is foreign matter is low. When an "evaluation edge length" is detected that is equal to or greater than the predetermined fraction of the threshold value $\theta$, set to assess another vehicle VX, there is the possibility that foreign matter has been errantly detected to be another vehicle VX. Hence in the present embodiment, when the "evaluation edge length" is equal to or greater than the predetermined fraction of the threshold value $\theta$, foreign matter detection processing is expedited so as to result in assessment as foreign matter, and thereby the probability of errantly assessing foreign matter as another vehicle VX can be lowered.

Figure 28:
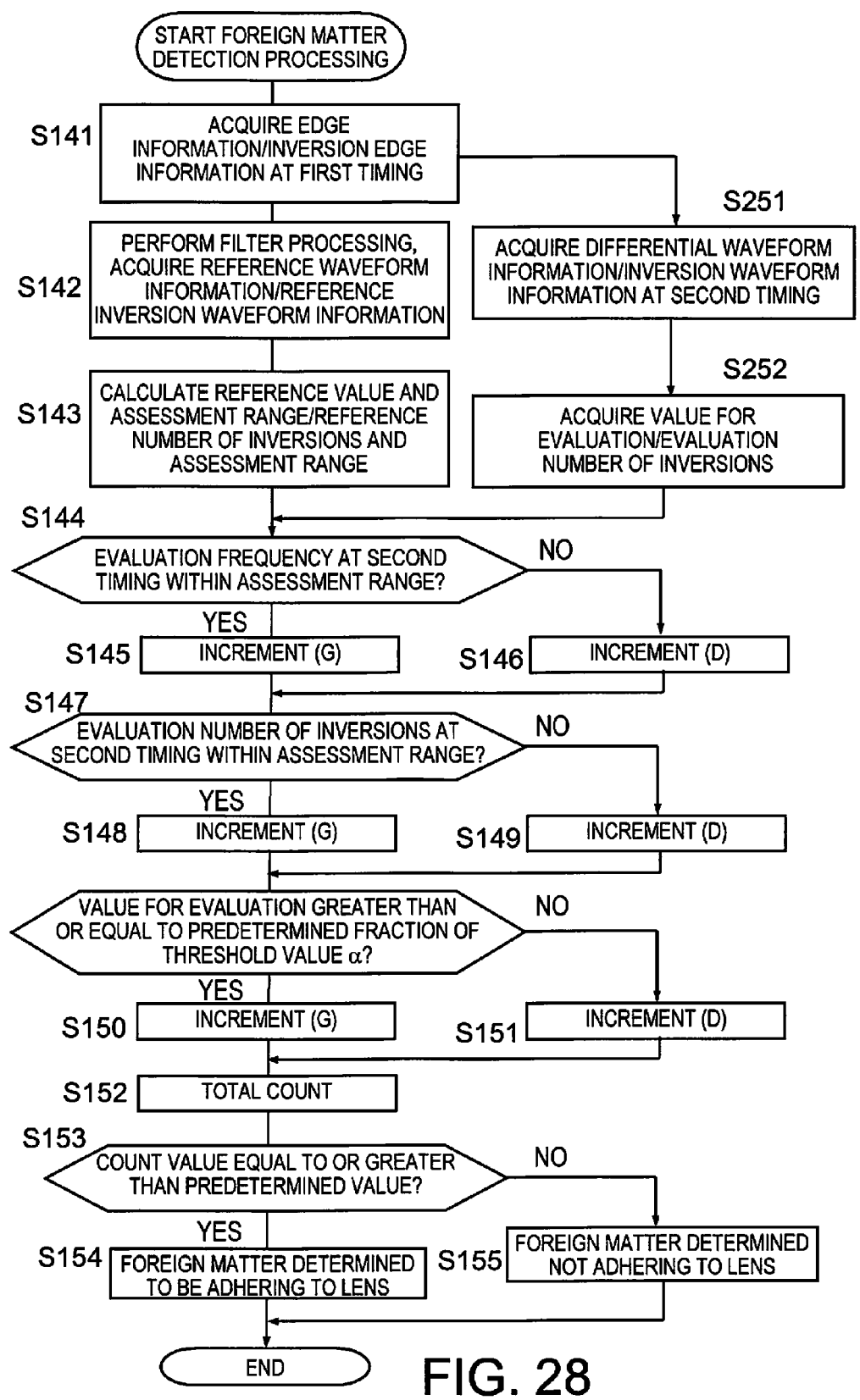
FIG. 28 is a first flowchart illustrating the control procedure when assessing whether dirt is adhering to the lens.

FIG. 28 is a flowchart illustrating the control procedure for foreign matter detection processing when edge information is used.

Figure 29A:
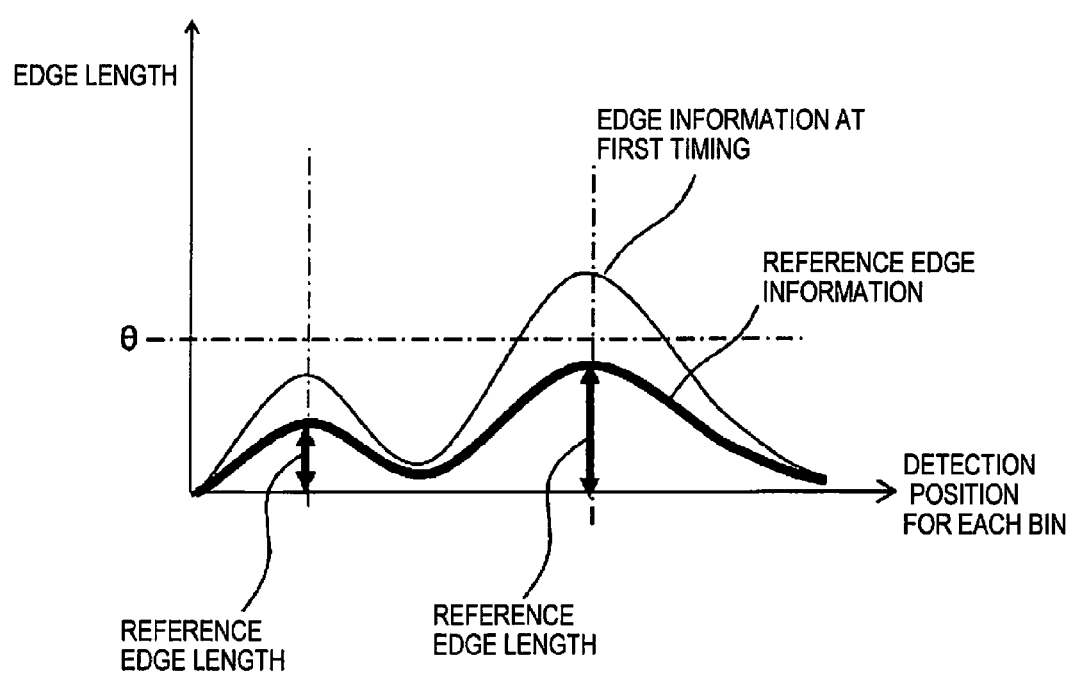
FIG. 29A is a first view for describing the method for assessing whether dirt is adhering to the lens based on edge lengths.

In step S141, the foreign matter detection unit 38 acquires "edge information" and/or "reversal edge information" at a first timing generated by the three-dimensional object detection unit 37. In step S142, the foreign matter detection unit 38 performs signal processing of the "edge information" and/or "reversal edge information" using a low-pass filter, and acquires "reference edge information" and/or "reference reversal edge information." FIG. 29A illustrates a model of "edge information" at the first timing and "reference edge information" to which low-pass filter processing has been applied. "Edge information" is the edge length, as an edge component quantity, along the collapsing direction of each three-dimensional object for each detection position (positions in the detection areas R1, R2 along directions receding from the camera 10) in the direction of collapse of each three-dimensional object (bin). The detection positions of maximum values of "edge information" and the detection positions of maximum values of "reference edge information" illustrated in the drawing are common. In step S43, the foreign matter detection unit 38 acquires maximum values of the "reference edge information" as "reference edge lengths." A "reference edge length" may be a maximum value multiplied by a predetermined coefficient, or may be a maximum value from which a predetermined value has been subtracted.

Figure 29B:
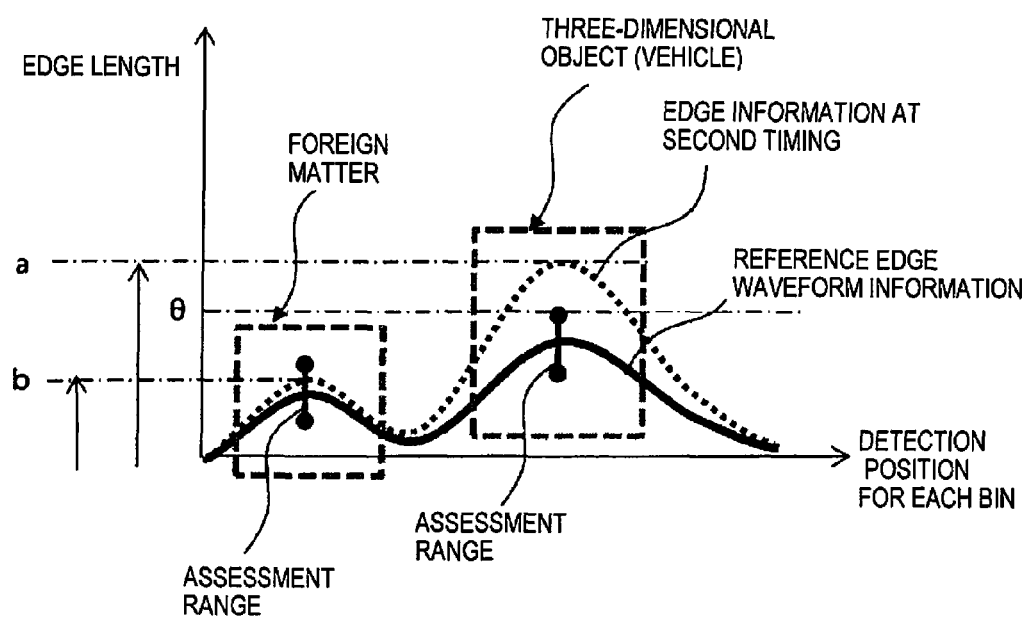
FIG. 29B is a second view for describing the method for assessing whether dirt is adhering to the lens based on edge lengths.
Figure 30A:
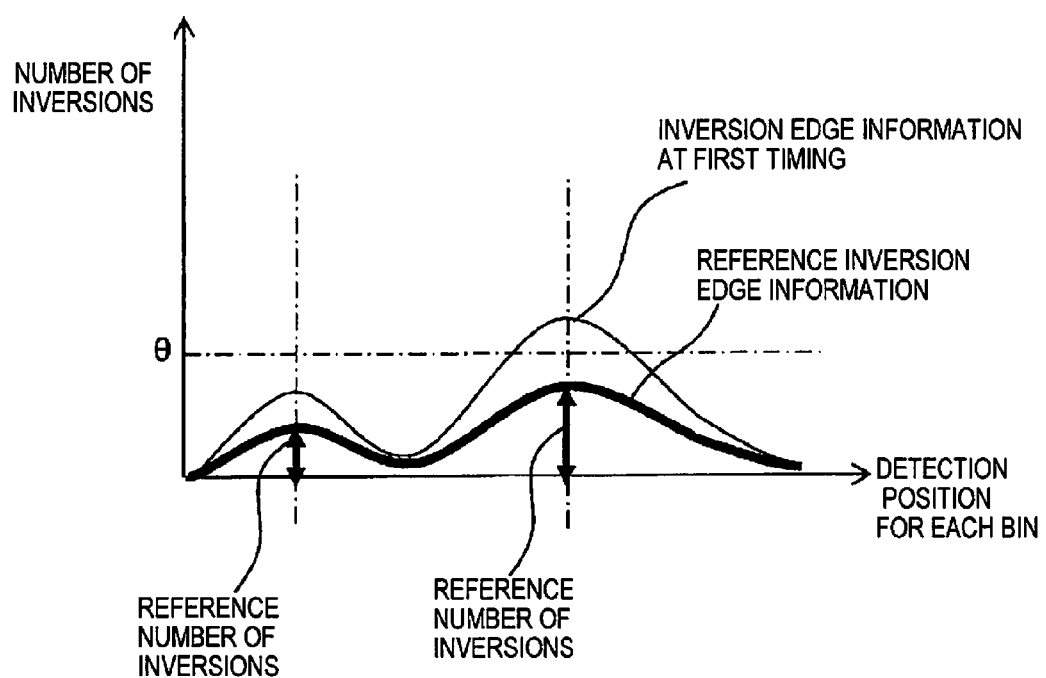
FIG. 30A is a first view for describing the method for assessing whether dirt is adhering to the lens based on the number of edge reversals.
Figure 30B:
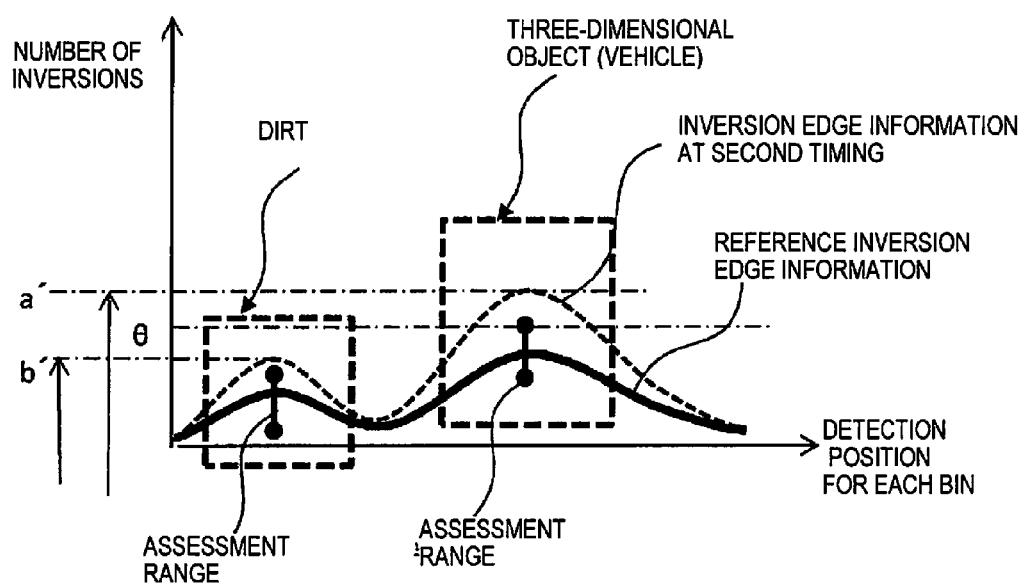
FIG. 30B is a second view for describing the method for assessing whether dirt is adhering to the lens based on the number of edge reversals.

In this step, the foreign matter detection unit 38 defines an "assessment range" with the "reference edge length" as the center value. FIG. 29B illustrates an example of an "assessment range." Similarly, the foreign matter detection unit 38 acquires the maximum value of the "reference reversal edge information" as the "reference number of reversals," and defines an "assessment range" with the "reference number of reversals" as the center value. FIG. 30A illustrates a model of "reversal edge information" at the first timing, "reference reversal edge information" subjected to low-pass filter processing, and a "reference number of reversals" corresponding to the maximum values of the reference reversal edge information. FIG. 30B illustrates "reversal edge information" and an "assessment range" at the second timing.

In parallel, in step S251 the foreign matter detection unit 38 acquires edge information/reversal edge information at the second timing, later than the first timing. The second timing is one or a plurality of timings later than the first timing. The second timing can be set within an "evaluation time," which is set as the time required to perform foreign matter detection. Edge information/reversal edge information at the second timing is illustrated by a broken line in FIG. 30B. In step S252, the foreign matter detection unit 38 acquires the maximum values a, b of edge lengths included in the edge information as "evaluation edge lengths."

Proceeding to step S144, the foreign matter detection unit 38 determines whether the "evaluation edge lengths" a, b at the second timing are within the assessment range. In the example illustrated in FIG. 30B, the "evaluation edge length" a corresponding to the right-side peak is outside the predetermined range, and therefore the possibility of being foreign matter is low, and the possibility of being a three-dimensional object or other vehicle VX is high. On the other hand, the "evaluation edge length" b corresponding to the left-side peak is within the predetermined range, and therefore the possibility of being foreign matter can be assessed as high. If the "evaluation edge lengths" a, b are within the assessment range, then the possibility of being foreign matter is high and processing proceeds to step S145, and a first score G is incremented (added). If, on the other hand, the lengths are outside the assessment range, the possibility of being foreign matter is low, processing proceeds to step S146, and a second score D is decremented (subtracted).

In the present embodiment, the absolute value of the first score is set higher than the absolute value of the second score. Thus when the "evaluation edge length" is within the predetermined range, a large value is added, and when the "evaluation edge length" is outside the predetermined range, a small value is subtracted, and thereby a high weighting is imparted to the fact that the "evaluation edge length" is assessed to be within the predetermined range. The result of detection of another vehicle VX in the present embodiment is readily influenced by light such as the sun, streetlights, the headlights of a following vehicle, and the like. Even when light having high luminance that influences the detection result is incident on the lens 11 and the "evaluation edge length" is assessed to be outside the "predetermined range," the possibility of foreign matter adhering to the lens 11 cannot be denied. Therefore even if the "evaluation edge length" is assessed to be outside the "predetermined range," the value subtracted is made a relatively small value in order to suppress the influence on the result of detection of another vehicle VX. As a result, the presence of foreign matter adhering to the lens 11 can be accurately assessed.

No particular limitations are imposed on the relationship between the absolute value G of the first score and the absolute value D of the second score, and the relationship can be set appropriately by experimentation or the like. As one example, the relationship can be set such that G(8 to 12): D(1 to 3), so that, for example, D=1 when G=10. The relationship between the absolute value G of the first score and the absolute value D of the second score can be set appropriately according to factors of the environment, such as the time, the location of travel, climate, and the like.

Next, in step S147, an assessment is made as to whether or not the evaluation number of reversals based on the reversal edge information at the second timing acquired in step S151 is within the assessment range. The assessment method is common to that of step S144, and the description thereof is invoked as appropriate. If the "evaluation numbers of reversals" a', b' are within the assessment range, the possibility of being foreign matter is high, processing proceeds to step S148, and the first score G is incremented (added). On the other hand, if the numbers are outside the assessment range, the possibility of being foreign matter is low, processing proceeds to step S149, and the second score D is decremented (subtracted).

In the following step S148, the foreign matter detection unit 38 determines whether the "evaluation edge length" acquired in step S152 is equal to or greater than a predetermined fraction of the threshold value θ set for assessing another vehicle VX, and when the "evaluation edge length" is greater than or equal to the predetermined fraction of the threshold value θ, processing proceeds to step S150, and the first score G is incremented (added). On the other hand, if the length is outside the assessment range, processing proceeds to step S151, and the second score D is decremented (subtracted).

The first score G in steps S145, S148, and S150, and the second score D in steps S146, S149, and S151 may be the same values, or may be different values. In the present embodiment, the first score G of step S148, which satisfies the two conditions that are the condition relating to edge length of step S144 and the condition relating to number of reversals of step S147, is set to be higher than the first score G of step S145.

In step S152, the foreign matter detection unit 38 totals the count value. In step S153, when the totaled count value is equal to or greater than a predetermined value set in advance, processing proceeds to step S154m, and it is assessed that foreign matter is adhering to the lens 11, whereas when the totaled count value is less than the predetermined value set in advance, processing proceeds to step S155, and it is assessed that foreign matter is not adhering to the lens 11. The assessment result is transmitted to the three-dimensional object assessment unit 34 and the controller 39.

Figure 31:
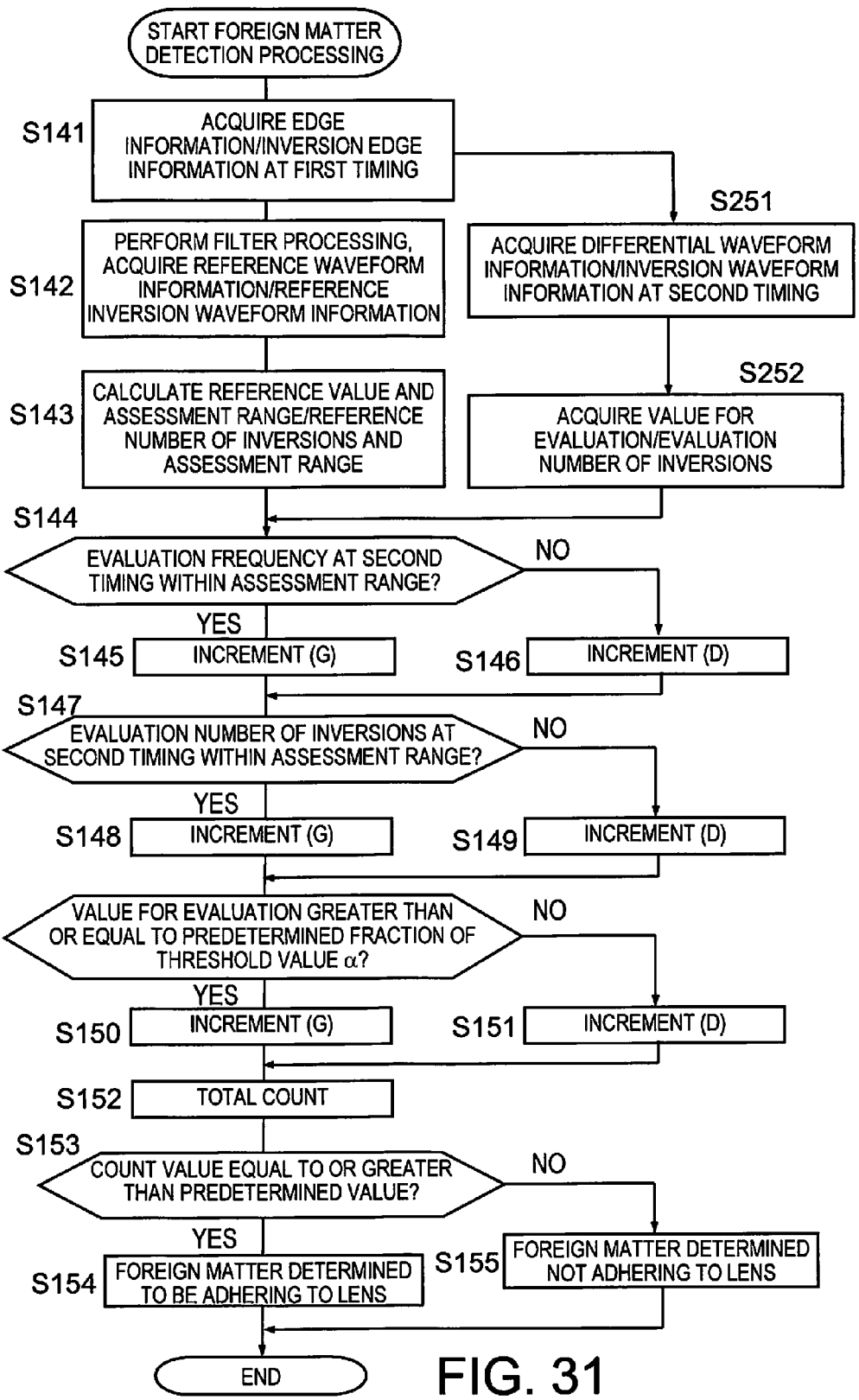
FIG. 31 is a second flowchart illustrating the control procedure when assessing whether dirt is adhering to the lens.

FIG. 31 is a flowchart illustrating the control procedure for assessing whether foreign matter is adhering to the lens 11 using differential waveform information. The processing of FIG. 31 is common to the processing of FIG. 28, and therefore in order to omit duplicate descriptions, the description of the control procedure of FIG. 28 is invoked as appropriate.

When the foreign matter detection unit 38 determines that "foreign matter adhering to the lens is detected," the controller 39 of the present embodiment generates a control command to suppress assessment of a three-dimensional object detected from a captured image as another vehicle VX. When the foreign matter detection unit 38 has assessed that foreign matter adhering to the lens 11 has been detected, the controller 39 of the present embodiment further narrows the "traveling speed setting range" for assessing whether another vehicle VX is present, and further suppresses assessment of a three-dimensional object as another vehicle VX.

When rainfall has been detected, the controller 39 narrows the "traveling speed setting range" such that a three-dimensional object is not readily detected as another vehicle VX, regardless of whether foreign matter is actually adhering to the lens 11, and when it is detected that foreign matter is actually adhering to the lens 11, further narrows the "traveling speed setting range" such that detection suppression appropriate to the circumstances can be executed. As a result, the precision of detection of another vehicle VX can be enhanced.

Further, when the foreign matter detection unit 38 determines that foreign matter is adhering to the lens 11, the controller 39 of the present embodiment changes the "predetermined number of times a three-dimensional object having a traveling speed within the predetermined range is detected within the predetermined time," which is a threshold value for assessing a three-dimensional object, to a still higher value, and further suppresses assessment of a three-dimensional object as another vehicle VX.

When rainfall has been detected, regardless of whether foreign matter is actually adhering to the lens 11, the controller 39 narrows the "predetermined number of times a three-dimensional object having traveling speed lying within the predetermined range is detected within the predetermined time," such that a three-dimensional object is not readily detected as another vehicle VX, and when actual adherence of foreign matter to the lens 11 is detected, the controller 39 further increases the "predetermined number of times," such that detection is suppressed appropriately according to the circumstances. As a result, the precision of detection of another vehicle VX can be enhanced.

In addition, when the foreign matter detection unit 38 determines that foreign matter is adhering to the lens 11, the controller 39 adjusts the threshold values used in three-dimensional object detection processing and further suppresses assessment that a three-dimensional object is another vehicle VX. The threshold values include the first threshold value α used when assessing a three-dimensional object from differential waveform information, the threshold value θ when generating edge information, and the second threshold value β used when assessing a three-dimensional object from edge information.

Figure 32A:
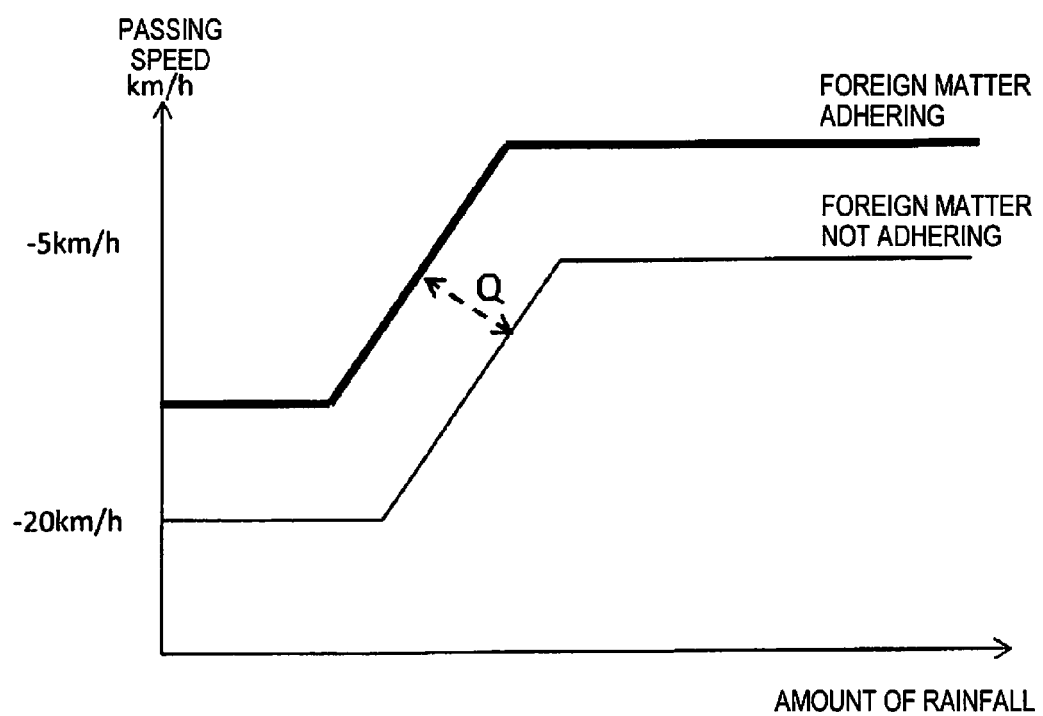
FIG. 32A is a view for describing the method for setting the "traveling speed threshold value."
Figure 32B:
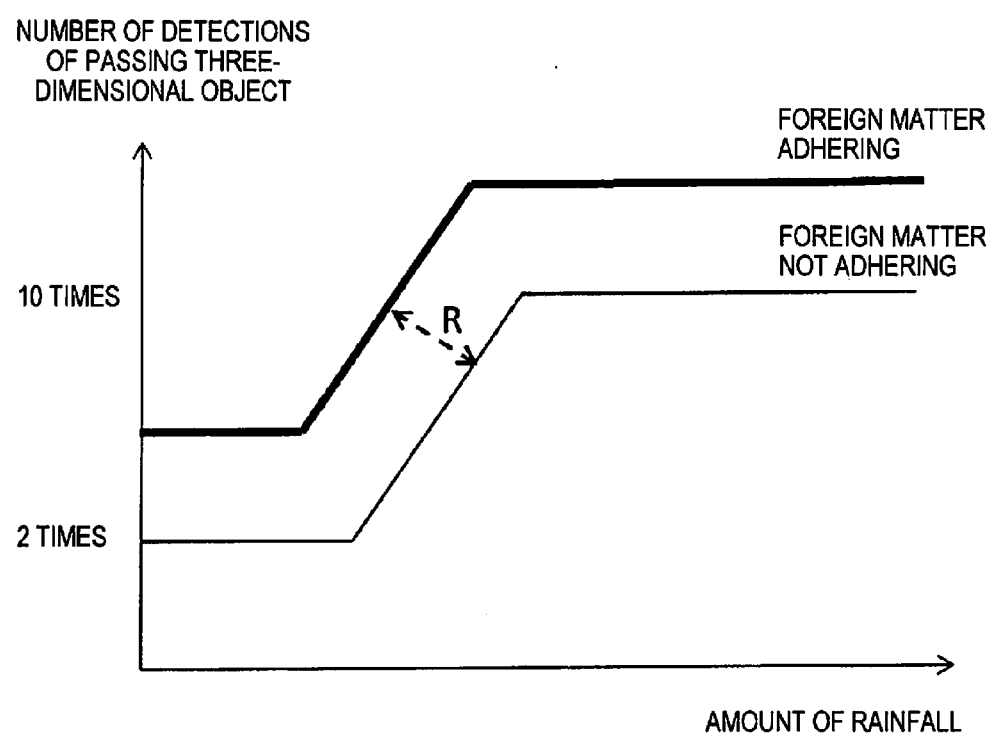
FIG. 32B is a view for describing the method for setting the "number detections within a predetermined time."

When foreign matter is adhering to the lens 11, the controller 39 adjusts threshold values such that assessment of a three-dimensional object as another vehicle VX is further suppressed, compared with when foreign matter is not adhering to the lens 11. Specifically, as illustrated in FIG. 32A, the relationship according to which the lower limit value of the "traveling speed setting range" is set to a higher value for a greater "amount of rainfall" is shifted such that the threshold value is higher still. Similarly, as illustrated in FIG. 32B, the relationship according to which the "predetermined number of times a three-dimensional object having traveling speed lying in the predetermined range is detected within the predetermined time" is set to be higher for a greater "amount of rainfall" is shifted such that the threshold value is higher still.

Figure 33:
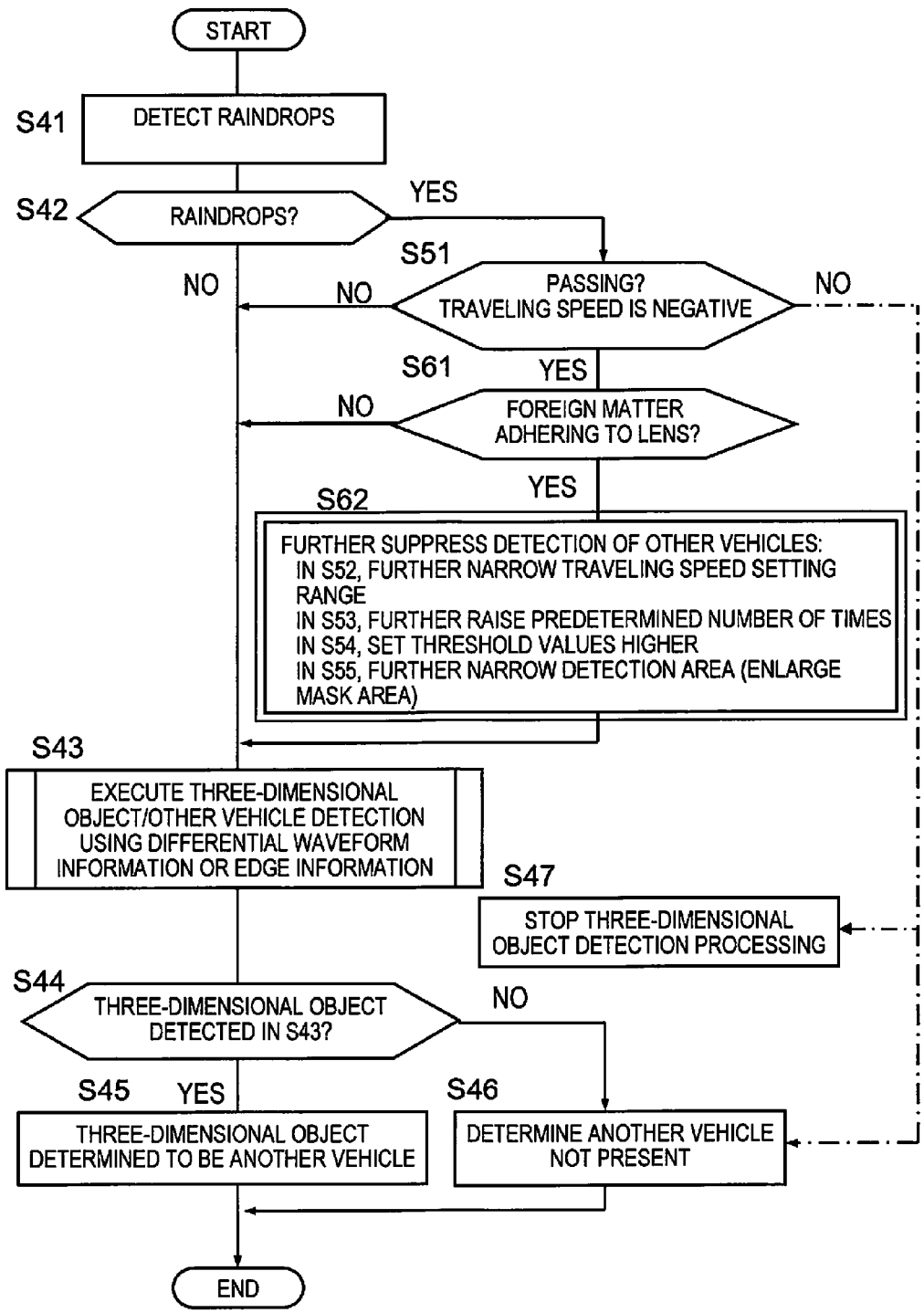
FIG. 33 is a flowchart illustrating the control procedure for three-dimensional object assessment when matter adheres firmly to the lens.

In the following, operation of the three-dimensional object detection device 1 of the present embodiment is described based on the flowchart of FIG. 33. The control procedure illustrated in FIG. 33 is in essence common to the control procedure illustrated in FIG. 21A. In steps S41 and S42, if the rainfall state detection unit 41 has detected a rainfall state, processing proceeds to step S51, and whether the traveling speed has a negative value is assessed. Then, in step S61 the foreign matter detection unit 38 detects "whether foreign matter is adhering to the lens 11" based on differential waveform information for the left and right detection areas A1, A2 generated by the three-dimensional object detection unit 37 or on edge information for the left and right detection areas A1, A2 generated by the three-dimensional object detection unit 37.

When the foreign matter detection unit 38 has assessed that "foreign matter is adhering to the lens 11," processing proceeds to step S62. In step S62, the controller 39 generates the above-described control commands to suppress assessment of a three-dimensional object detected from a captured image as another vehicle VX. Specifically, the controller 39 generates control commands to further narrow the "traveling speed setting range" of step S52 in FIG. 21A, to change to a higher value the "predetermined number of times" of step S53 in FIG. 21C, to set high threshold values or to lower the output value in step S54 of FIG. 22, or to enlarge the masking area of step S55 in FIG. 23. Thereafter, the processing of step S43 and later is performed. The processing of step S43 and later is common to the processing of, e.g., FIG. 21A, the description of which is invoked and is here omitted.

The three-dimensional object detection device 1 of the present embodiment of the present invention, configured and acting as described above, exhibits the following advantageous effects.

(1) According to the three-dimensional object detection device 1 of the present embodiment, when a rainfall state has been detected, it is possible to prevent errant assessment of a three-dimensional object that is not another vehicle VX as another vehicle VX based on the traveling speed of the three-dimensional object, which is readily calculated errantly due to the presence of raindrops adhering to the lens 11 and reflection of water film formed on the road surface. As a result, errant detection of foreign matter adhering to the lens 11 as another vehicle VX, and errant detection as another vehicle VX of a three-dimensional object that is not a vehicle but the image of which is distorted by raindrops adhering to the lens 11, can be suppressed, and therefore other vehicles VX can be detected accurately. Further, the three-dimensional object detection device 1 of the present embodiment secures detection precision using the traveling speed of the three-dimensional object, and therefore detection processing is not interrupted because of rainfall, and therefore non-detection time is not created. Consequently high detection precision can be maintained. The actions and effects thereof are similar in cases when another vehicle VX is detected using differential waveform information and in cases where another vehicle VX is detected using edge information.

(2) According to the three-dimensional object detection device 1 of the present embodiment, during rainfall, processing to detect another vehicle VX is suppressed only during circumstances in which the relative speed is readily detected errantly, and therefore errant detection can be suppressed while securing the original precision of operation for detection of another vehicle VX. Circumstances in which a three-dimensional object moves rearward occur, e.g., when the host vehicle V passes another vehicle VX, and are cases in which the driver of the host vehicle V can easily discern the circumstances. By limiting processing to suppress detection of another vehicle VX to cases in which the traveling speed of the three-dimensional object is a negative value, the occurrence of problems due to suppression of operation to detect another vehicle VX can be suppressed.

(3) According to the three-dimensional object detection device 1 of the present embodiment, as the amount of rainfall detected by the rainfall state detection unit 41 increases, the "traveling speed setting range" is set to be narrow, and assessment of a three-dimensional object as another vehicle VX is suppressed. The greater the amount of rainfall, the more the precision of the three-dimensional object traveling speed tends to decline, and therefore by setting the "traveling speed setting range" to be narrower so as to suppress detection of another vehicle VX when there are greater amounts of rainfall, the precision of detection of another vehicle VX can be enhanced.

(4) According to the three-dimensional object detection device 1 of the present embodiment, during rainfall when errant detection of the relative speed readily occurs, in addition to narrowing the "predetermined range of traveling speeds" for assessing whether a three-dimensional object is another vehicle VX, the "predetermined number of times" used to assess the frequency with which a three-dimensional object is detected with a traveling speed within the predetermined range is changed to a high value, and thereby the precision of assessing whether the three-dimensional object is another vehicle VX can be enhanced.

(5) According to the three-dimensional object detection device 1 of the present embodiment, during rainfall there is a tendency for the precision of the traveling speed of a three-dimensional object to be reduced in partial areas on the vehicle rearward side of the detection areas A1, A2. In the present embodiment, during rainfall the detection of a three-dimensional object and/or the detection of another vehicle VX from an image corresponding to a partial area on the vehicle rearward side is suppressed, and thereby the precision of detection of another vehicle VX can be maintained.

(6) According to the three-dimensional object detection device 1 of the present embodiment, when a rainfall state has been detected, by changing the first threshold value α to be high, the detection sensitivity can be adjusted such that another vehicle VX traveling adjacent to the lane of travel of the host vehicle V is not readily detected. Consequently, even during rainfall, errant detection of an image of an object other than another vehicle VX as another vehicle VX traveling in an adjacent lane can be prevented.

(7) According to the three-dimensional object detection device 1 of the present embodiment, when a rainfall state has been detected, by lowering output values when generating differential waveform information, the detection sensitivity can be adjusted such that another vehicle VX traveling adjacent to the lane of travel of the host vehicle V is not readily detected. Consequently, even during rainfall, errant detection of an image of an object other than another vehicle VX as another vehicle VX can be prevented.

(8) According to the three-dimensional object detection device 1 of the present embodiment, when a rainfall state has been detected, by changing the threshold values for assessment when generating edge information to higher values, the detection sensitivity can be adjusted such that another vehicle VX traveling adjacent to the lane of travel of the host vehicle V is not readily detected. Consequently, even during rainfall, errant detection of an image of an object other than another vehicle VX as another vehicle VX traveling in an adjacent lane can be prevented.

(9) According to the three-dimensional object detection device 1 of the present embodiment, when a rainfall state has been detected, by lowering output values when generating edge information, the detection sensitivity can be adjusted such that another vehicle VX traveling adjacent to the lane of travel of the host vehicle V is not readily detected. Consequently, even during rainfall, errant detection of an image of an object other than another vehicle VX as another vehicle VX traveling in an adjacent lane can be prevented.

(10) According to the three-dimensional object detection device 1 of the present embodiment, when rainfall has been detected, in addition to narrowing the "traveling speed setting range" or the "predetermined range of traveling speeds" such that a three-dimensional object is not readily detected as another vehicle VX, when actual adherence of foreign matter to the lens 11 is detected, the "traveling speed setting range" is narrowed or the "predetermined number of times" is further increased, such that detection is suppressed appropriately according to the circumstances. As a result, the precision of detection of another vehicle VX can be enhanced.

The three-dimensional object detection device 1 of the present embodiment exhibits similar actions and effects when another vehicle VX is detected by processing based on differential waveform information, and when another vehicle VX is detected by processing based on edge information.

The above-described camera 10 corresponds to the image capturing means of the present invention, the lens 11 corresponds to the lens of the present invention, the above-described viewpoint conversion unit 31 corresponds to the image conversion means of the present invention, the above-described alignment unit 32 and three-dimensional object detection unit 33 correspond to the three-dimensional object detection means of the present invention, the above-described luminance difference calculation unit 35, edge line detection unit 36, and three-dimensional object detection unit 37 correspond to the three-dimensional object detection means of the present invention, the above-described three-dimensional object assessment unit 34 corresponds to the three-dimensional object assessment means, the above-described foreign matter detection unit 38 corresponds to the foreign matter detection means, the rainfall state detection unit 41 corresponds to the rainfall state detection means, and the above-described controller 39 corresponds to the control means.

The present specification describes an example of detecting foreign matter adhering to the lens 11 based on differential waveform information when detecting a three-dimensional object based on differential waveform information, and an example of detecting foreign matter adhering to the lens 11 based on edge information when detecting a three-dimensional object based on edge information. However, foreign matter adhering to the lens 11 may be detected based on edge information when detecting a three-dimensional object based on differential waveform information, and foreign matter adhering to the lens 11 may be detected based on differential waveform information when detecting a three-dimensional object based on edge information.

The invention claimed is:

1. A three-dimensional object detection device comprising:
   an image capturing device configured to capture an area rearward of a vehicle; and
   a computer, the computer including
      a three-dimensional object detection unit programmed to detect a three-dimensional object rearward of the vehicle and calculating a traveling speed of the three-dimensional object, based on images obtained by the image capturing device,
      a rainfall state detection unit programmed to detect a state of rainfall including cases of rainfall or formation of a water film on a road surface due to rainfall,
      a three-dimensional object assessment unit programmed to assess the three-dimensional object to be another vehicle when the traveling speed of the three-dimensional object detected by the three-dimensional object detection unit lies within a preset setting range, and
      a controller programmed to change the traveling speed setting range to be narrower when the rainfall state detection unit has detected a rainfall state.

2. The three-dimensional object detection device according to claim 1, wherein
   the computer further includes an image conversion unit programmed to perform viewpoint conversion of images obtained by the image capturing device into bird's-eye view images,
   the three-dimensional object detection unit being further programmed to detect a presence of the three-dimensional object in a detection area set on each of a right side and a left side rearward of the vehicle based on differential waveform information in which the differential waveform information is generated by aligning positions of bird's-eye view images captured at different points in time obtained by the image conversion unit, and counting a number of pixels indicating a predetermined difference in a difference image of aligned bird's-eye view images along a direction in which the three-dimensional object collapses when viewpoint conversion of the bird's-eye view images is performed to form a frequency distribution to detect the presence of the three-dimensional object present in the detection area and the three-dimensional object detection unit being programmed to calculate a traveling speed of the three-dimensional object from a change over time in the waveform of the differential waveform information.

3. The three-dimensional object detection device according to claim 2, wherein
   when the rainfall state detection unit has detected the rainfall state, the controller is programmed to suppress assessment of the three-dimensional object as the other vehicle in a partial area of the detection area on the rearward side of the vehicle.

4. The three-dimensional object detection device according to claim 2, wherein
   when the rainfall state detection unit has detected the rainfall state, the controller is programmed to mask a partial area of the detection area on the rearward side of the vehicle and suppress assessment of the three-dimensional object as the other vehicle.

5. The three-dimensional object detection device according to claim 2, wherein
   the image capturing device comprises a lens for forming the images of rearward of the vehicle; and
   further comprises a foreign matter detection unit that is programmed to extract a first maximum value from differential waveform information generated at one or a plurality of first timings by the three-dimensional object detection unit, acquire a reference value based on the extracted first maximum value, extract a second maximum value corresponding to the first maximum value in the bird's-eye view images from differential waveform information newly generated at one or a plurality of second timings later than the first timing, acquire a value for evaluation based on the second maximum value, and detect whether foreign matter is adhering to the lens based on a change over time in the difference between the value for evaluation and the reference value; and
   when the foreign matter detection unit has detected foreign matter adhering to the lens, the controller is programmed to further narrow the traveling speed setting range and further suppress assessment of the three-dimensional object as the other vehicle.

6. The three-dimensional object detection device according to claim 2, wherein
   the three-dimensional object detection unit is programmed to detect a three-dimensional object based on the differential waveform information and a first threshold value $\alpha$; and
   when the rainfall state detection unit has detected the rainfall state, the controller is programmed to output to the three-dimensional object detection unit a control command for upwardly adjusting the first threshold value $\alpha$ such that the three-dimensional object is less readily detected and suppresses assessment of the three-dimensional object as the other vehicle.

7. The three-dimensional object detection device according to claim 2, wherein
   the three-dimensional object detection unit is programmed to detect a three-dimensional object based on the differential waveform information and a first threshold value; and
   when the rainfall state detection unit has detected the rainfall state, the controller is programmed to generate a control command for lowering a value obtained by counting the number of pixels that indicate a predetermined difference in a difference image of the bird's-eye view images and forming a frequency distribution, output the control command to the three-dimensional object detection unit, and suppress assessment of the three-dimensional object as the other vehicle.

8. The three-dimensional object detection device according to claim 1, wherein
   the computer further includes an image conversion unit programmed to perform viewpoint conversion of images obtained by the image capturing device into bird's-eye view images,
   the three-dimensional object detection unit being further programmed to generate edge information, including information of an edge line detected based on an edge component which has continuity and for which a luminance difference of image areas that are mutually adjacent along a direction of collapsing of the three-dimensional object, when viewpoint conversion to the bird's-eye view images is performed, is a predetermined threshold value or greater, in the bird's-eye view image obtained by the image conversion unit,
   the three-dimensional object detection unit is programmed to detect a presence of the three-dimensional object based on the edge information, the three-dimensional object present in a detection area set on each of a right side and a left side rearward of the vehicle; and the three-dimensional object detection unit being programmed to calculate a traveling speed of the three-dimensional object from a change over time in the edge information.

9. The three-dimensional object detection device according to claim 8, wherein
the image capturing device comprises a lens for forming the images of rearward of the vehicle; and
further comprises a foreign matter detection unit that is programmed to extract a first maximum value from edge information including information of the edge line generated by the three-dimensional object detection unit at one or a plurality of first timings, acquire a reference edge length based on the first maximum value, extract a second maximum value corresponding to the first maximum value in the bird's-eye view image from edge information newly generated at one or a plurality of second timings later than the first timing, acquire an evaluation edge length based on the second maximum value, and detect whether foreign matter is adhering to the lens based on a change over time in the difference between the evaluation edge length and the reference edge length; and
when the foreign matter detection unit has detected foreign matter adhering to the lens, the controller is programmed to further narrow the traveling speed setting range and further suppress assessment of the three-dimensional object as the other vehicle.

10. The three-dimensional object detection device according to claim 8, wherein
the three-dimensional object detection unit is programmed to detect a three-dimensional object based on the edge information and a second threshold value $\beta$; and
when the rainfall state detection unit has detected the rainfall state, the controller is programmed to output to the three-dimensional object detection unit a control command for upwardly adjusting the second threshold value $\beta$ such that the three-dimensional object is less readily detected, and suppress assessment of the three-dimensional object as the other vehicle.

11. The three-dimensional object detection device according to claim 8, wherein
the three-dimensional object detection unit is programmed to detect a three-dimensional object based on the edge information and a second threshold value $\beta$; and
when the rainfall state detection unit has detected the rainfall state, the controller is programmed to output to the three-dimensional object detection unit a control command for lowering and outputting the detected quantity of edge information, and suppress assessment of the three-dimensional object as the other vehicle.

12. The three-dimensional object detection device according to claim 8, wherein
when the rainfall state detection unit has detected the rainfall state, the controller is programmed to suppress assessment of the three-dimensional object as the other vehicle in a partial area of the detection area on the rearward side of the vehicle.

13. The three-dimensional object detection device according to claim 8, wherein
when the rainfall state detection unit has detected the rainfall state, the controller is programmed to mask a partial area of the detection area on the rearward side of the vehicle and suppress assessment of the three-dimensional object as the other vehicle.

14. The three-dimensional object detection device according to claim 1, wherein
when the rainfall state detection unit has detected the rainfall state, and the traveling speed of the three-dimensional object calculated by the three-dimensional object detection unit is a negative value, the controller is programmed to change the traveling speed setting range to be narrower and suppresses assessment of the three-dimensional object as the other vehicle.

15. The three-dimensional object detection device according to claim 1, wherein
the rainfall state detection unit is also programmed to detect an amount of rainfall; and the controller is programmed such that the traveling speed setting range is set narrower with increased amount of rainfall detected by the rainfall state detection unit, and assessment of the three-dimensional object as the other vehicle by three-dimensional object assessment unit is suppressed.

16. The three-dimensional object detection device according to claim 1, wherein
the three-dimensional object assessment unit is also programmed to determine a three-dimensional object having a traveling speed within the traveling speed setting range to be another vehicle when the three-dimensional object has been detected a predetermined number of times or more within a predetermined time, and
when the rainfall state detection unit has detected the rainfall state, the control means changes the predetermined number of times, which is a threshold value when assessing the three-dimensional object, to a higher number and suppresses assessment of the three-dimensional object as the other vehicle.

17. A three-dimensional object detection method comprising the steps of:
performing viewpoint conversion to bird's-eye view images of images obtained by a vehicle-mounted image capturing device of an area including a detection area set on each of a right side and a left side rearward of the vehicle;
aligning, in a bird's-eye view, positions of the bird's-eye view images obtained at different points in time, generating differential waveform information in a difference image of the bird's-eye view images that were aligned by forming a frequency distribution upon counting a number of pixels indicating a predetermined difference in the difference image along a direction in which the three-dimensional object collapses when viewpoint conversion of the bird's-eye view images is performed;
detecting a three-dimensional object present in a detection area set on each of the right side and the left side rearward of the vehicle based on the differential waveform information, and calculating a traveling speed of the three-dimensional object from a change over time in the waveform of the differential waveform information;
assessing the three-dimensional object as another vehicle when the traveling speed of the detected three-dimensional object lies within a preset setting range;
detecting a rainfall state, with respect to the vehicle, which includes cases of rainfall and cases in which a water film is formed on a road surface due to rainfall; and
changing the traveling speed setting range to be narrower when the rainfall state has been detected.

18. A three-dimensional object detection method comprising the steps of:
performing viewpoint conversion to bird's-eye view images of images obtained by a vehicle-mounted image capturing device of an area including a detection area set on each of a right side and a left side rearward of the vehicle;

generating edge information, including information of an edge line detected based on an edge component which has continuity and for which a luminance difference of image areas that are mutually adjacent along a direction of collapsing of the three-dimensional object when viewpoint conversion to the bird's-eye view images is performed is a predetermined threshold value or greater, in the obtained bird's-eye view images;

detecting, based on the edge information, a three-dimensional object present in a detection area set on each of the right side and the left side rearward of the vehicle, and calculating a traveling speed of the three-dimensional object from a change over time in the edge information;

assessing the three-dimensional object as another vehicle when the traveling speeds of the detected three-dimensional object lies within a preset setting range;

detecting a rainfall state, with respect to the vehicle, which includes cases of rainfall and cases in which a water film is formed on a road surface due to rainfall; and changing the traveling speed setting range to be narrower when the rainfall state has been detected.

* * * * *